US012812617B2

(12) United States Patent
Yu et al.

(10) Patent No.: US 12,812,617 B2
(45) Date of Patent: Nov. 24, 2026

(54) PHYSICAL LAYER PROTOCOL DATA UNIT TRANSMISSION METHOD AND RELATED APPARATUS

(71) Applicant: HUAWEI TECHNOLOGIES CO., LTD., Shenzhen (CN)

(72) Inventors: Jian Yu, Shenzhen (CN); Mengshi Hu, Shenzhen (CN); Ming Gan, Shenzhen (CN); Yuxin Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 306 days.

(21) Appl. No.: 18/592,738

(22) Filed: Mar. 1, 2024

(65) Prior Publication Data

US 2024/0205903 A1 Jun. 20, 2024

Related U.S. Application Data

(63) Continuation of application No. PCT/CN2022/116679, filed on Sep. 2, 2022.

(30) Foreign Application Priority Data

Sep. 3, 2021 (CN) ......................... 202111034562.4

(51) Int. Cl.

*H04W 72/0453* (2023.01)
*H04B 7/0452* (2017.01)
*H04W 72/12* (2023.01)

(52) U.S. Cl.

CPC ...... *H04W 72/0453* (2013.01); *H04B 7/0452* (2013.01); *H04W 72/12* (2013.01)

(58) Field of Classification Search

None

See application file for complete search history.

(56) References Cited

U.S. PATENT DOCUMENTS

| | | | | |
|---|---|---|---|---|
| 10,904,920 | B1 * | 1/2021 | Noh ...................... | H04W 72/04 |
| 2019/0082461 | A1 | 3/2019 | Guo et al. | |
| 2021/0274507 | A1 | 9/2021 | Porat et al. | |
| 2021/0352663 | A1 * | 11/2021 | Hedayat ............ | H04W 72/0446 |

(Continued)

OTHER PUBLICATIONS

Extended European Search Report issued in EP22863615.5, dated Nov. 4, 2024, 11 pages.

(Continued)

*Primary Examiner* — Anh Vu H Ly

(57) ABSTRACT

A physical layer protocol data unit (PPDU) transmission method and a related apparatus for improving spectral utilization are disclosed. The method includes: A first device receives a trigger frame from a second device, where the trigger frame indicates a first resource allocated to the first device, the first resource includes N resource subunits, the trigger frame includes first indication information, the first indication information separately indicates whether the first device is allowed to perform trigger-based physical layer protocol data unit (TB PPDU) transmission on each of the N resource subunits when the first device performs TB PPDU transmission by using some of the N resource subunits, and N is a positive integer; and the first device sends a TB PPDU to the second device on some of the N resource subunits based on the first indication information.

18 Claims, 19 Drawing Sheets

(56) References Cited

U.S. PATENT DOCUMENTS

2024/0097842 A1* 3/2024 Lu ........................ H04L 5/0007
2024/0137080 A1* 4/2024 Seok ................ H04W 74/0816

OTHER PUBLICATIONS

Insun Jang et al:"Discussion on EHT Trigger based UL MU." doc.: IEEE 802.11-20/0413r1. Mar. 16, 2020. total 13 pages.
Steve Shellhammer et al:"Proposed Draft Specification for Trigger frame for EHT." doc. : IEEE 802.11-21/0259r4. Mar. 2021. total 42 pages.
LAN/MAN Standards Committee of the IEEE Computer Society:"IEEE P802.11be™/D1.0 Draft Standard forInformation technology—Telecommunications and information exchange between systems Local and metropolitan area networks—Specific requirements Part 11: Wireless LAN Medium Access Control (MAC) and Physical Layer (PHY) Specifications Amendment 8: Enhancements for extremely high throughput (EHT)." IEEE P802.11be™/D1.0, May 2021. total 635 pages.
Office Action issued in TW11121263560, dated Dec. 27, 2022, with English translation, 24 pages.
International Search Report and Written Opinion issued in PCT/CN2022/116679, dated Dec. 1, 2022, 9 pages.

* cited by examiner

PHYSICAL LAYER PROTOCOL DATA UNIT TRANSMISSION METHOD AND RELATED APPARATUS

CROSS-REFERENCE TO RELATED APPLICATIONS

This application is a continuation of International Application No. PCT/CN2022/116679, filed on Sep. 2, 2022, which claims priority to Chinese Patent Application No. 202111034562.4, filed on Sep. 3, 2021. The disclosures of the aforementioned applications are hereby incorporated by reference in their entireties.

TECHNICAL FIELD

This application relates to the field of wireless communication technologies, and in particular, to a physical layer protocol data unit (PPDU) transmission method and a related apparatus.

BACKGROUND

A wireless local area network (WLAN) has undergone a plurality of generations of development, including 802.11a/b/g, 802.11n, 802.11ac, 802.11ax, and 802.11be that is currently under discussion. The 802.11ax standard is referred to as a high efficiency (HE) standard, and the 802.11be standard is referred to as an extremely high throughput (EHT) standard or a Wi-Fi 7 standard.

In 802.11be, an access point (AP) schedules, by using a sent trigger frame (trigger frame), one or more stations (STAs) to perform uplink data transmission; and allocates a resource unit (RU) to each of the one or more stations by using the trigger frame, where the trigger frame carries an indication indicating that the one or more stations need to perform carrier sensing. When performing extremely high throughput trigger-based physical layer protocol data unit (EHT TB PPDU) transmission, the STA performs, in a unit of 20 MHz subchannels, carrier sensing on one or more 20 MHz subchannels corresponding to a resource allocated to the station, to detect whether sensed energy exceeds a predetermined threshold. If detecting that energy on a specific 20 MHz subchannel exceeds the predetermined threshold, the STA determines that the 20 MHz subchannel is busy; or if detecting that energy on a specific 20 MHz subchannel does not exceed the predetermined threshold, the STA determines that the 20 MHz subchannel is idle. For the station, when one of the 20 MHz subchannels of the resource allocated to the station is busy, the station cannot perform transmission on the resource allocated to the station, to prevent interference to other transmission.

It can be learned that, if one of the 20 MHz subchannels of the resource allocated to the station is busy, the STA cannot perform transmission on the resource, resulting in relatively low spectral utilization.

SUMMARY

This application provides a PPDU transmission method and a related apparatus, so that a first device sends a trigger-based physical layer protocol data unit (TB PPDU) to a second device on some of N resource subunits based on first indication information, thereby improving spectral utilization.

According to a first aspect, this application provides a PPDU transmission method, including:

A first device receives a trigger frame from a second device, where the trigger frame indicates a first resource allocated to the first device, the first resource includes N resource subunits, the trigger frame includes first indication information, the first indication information separately indicates whether the first device is allowed to perform trigger-based physical layer protocol data unit (TB PPDU) transmission on each of the N resource subunits when the first device performs TB PPDU transmission by using some of the N resource subunits, and N is an integer greater than or equal to 1, that is, the first indication information indicates, for each of the N resource subunits, whether the resource subunit can serve as a part of resource subunits for the first device to perform TB PPDU transmission; and the first device sends a TB PPDU to the second device on some of the N resource subunits based on the first indication information.

In the foregoing technical solution, the first device may send the TB PPDU to the second device on the some of the N resource subunits based on the first indication information. In other words, the second device indicates that the first device is allowed to perform TB PPDU transmission on a resource subunit; and when the resource subunit is idle, the second device may perform transmission of the TB PPDU on the resource subunit. In this way, the first device performs transmission on the some of the N resource subunits, thereby improving spectral utilization. For example, a resource subunit in the N resource subunits is an RU smaller than 996 subcarriers (tones) or an MRU smaller than 996 subcarriers, and the first indication information indicates that the second device is allowed to perform TB PPDU transmission on the resource subunit; and when the resource subunit is idle, the second device may perform transmission on the resource subunit. In this way, the first device performs transmission on the some of the N resource subunits, thereby improving spectral utilization. For example, there is no MU-MIMO transmission on the N resource subunits, and the first indication information separately indicates that the first device is allowed to perform TB PPDU transmission on each of the N resource subunits when the first device performs TB PPDU transmission by using some of the N resource subunits. In this case, when any resource subunit in the N resource subunits is idle, the second device may perform TB PPDU transmission on the any resource subunit. In this way, the first device performs transmission on the some of the N resource subunits, thereby improving spectral utilization.

According to a second aspect, this application provides a PPDU transmission method, including:

A second device sends a trigger frame to a first device, where the trigger frame indicates a first resource allocated to the first device, the first resource includes N resource subunits, the trigger frame includes first indication information, the first indication information separately indicates whether the first device is allowed to perform TB PPDU transmission on each of the N resource subunits when the first device performs transmission by using some of the N resource subunits, and N is an integer greater than or equal to 1; and the second device receives, from the first device, a TB PPDU sent on some of the N resource subunits.

In the foregoing technical solution, the second device may indicate, to the first device by using the first indication information, whether the first device is allowed to perform TB PPDU transmission on each of the N resource subunits when the first device performs transmission by using some of the N resource subunits. In other words, the second device indicates that the first device is allowed to perform TB PPDU transmission on a resource subunit when the first device performs transmission by using some of the N resource subunits; and when the resource subunit is idle, the second device may perform TB PPDU transmission on the resource subunit. In this way, the first device performs transmission on the some of the N resource subunits, thereby improving spectral utilization. For example, a resource subunit in the N resource subunits is a resource unit (resource allocation, RU) or multiple-resource unit (MRU) smaller than 996 subcarriers, and the first indication information indicates that the second device is allowed to perform TB PPDU transmission on the resource unit; and when the resource subunit is idle, the second device may perform transmission on the resource subunit. In this way, the first device performs transmission on the some of the N resource subunits, thereby improving spectral utilization. For example, there is no MU-MIMO transmission on the N resource subunits, and the first indication information separately indicates that the first device is allowed to perform TB PPDU transmission on each of the N resource subunits when the first device performs TB PPDU transmission by using some of the N resource subunits. In this case, when any resource subunit in the N resource subunits is idle, the second device may perform TB PPDU transmission on the any resource subunit. In this way, the first device performs transmission on the some of the N resource subunits, thereby improving spectral utilization.

Based on the first aspect or the second aspect, in a first implementation of this application, a resource subunit in the N resource subunits is located in a first frequency-domain subblock, and the first frequency-domain subblock includes at least one second frequency-domain subblock.

In the foregoing implementation, a specific division manner of the N resource subunits is provided. The N resource subunits are divided at a division granularity of a first frequency-domain subblock, and the first frequency-domain subblock includes the at least one second frequency-domain subblock. This facilitates the implementation of the solution. The second device may indicate whether transmission is allowed on each resource subunit, so that the first device determines, when performing transmission by using some of the N resource subunits, which resource subunits can be used for transmission. In this way, the first device performs transmission on the some of the N resource subunits, thereby improving spectral utilization.

Based on the first aspect, the second aspect, and the first implementation, in a second implementation of this application, if a first condition is met, the first indication information indicates that the first device is not allowed to perform TB PPDU transmission on the resource subunit when the first device performs transmission by using the some of the N resource subunits; and the first condition includes at least one of the following:
- more than one device is scheduled in at least one second frequency-domain subblock in the first frequency-domain subblock to perform TB PPDU transmission; or
- when the first device performs transmission by using the some of the N resource subunits, the second device does not support transmission on an RU smaller than 996 subcarriers or an MRU smaller than 996 subcarriers.

In this possible implementation, some specific conditions are provided, under which the first indication information indicates that transmission is not allowed on one of the N resource subunits, thereby facilitating implementation of the solution. For example, when more than one device is scheduled in at least one second frequency-domain subblock in the first frequency-domain subblock to perform TB PPDU transmission, the first indication information indicates that the first device is not allowed to perform transmission on the resource subunit, thereby avoiding a reception processing error on the side of the second device. Alternatively, when the first device performs transmission by using the some of the N resource subunits, the second device does not support transmission on an RU smaller than 996 subcarriers or an MRU smaller than 996 subcarriers, and the first indication information indicates that the first device is not allowed to perform transmission on the resource subunit, thereby avoiding a reception processing error that would otherwise be caused because the second device cannot receive data sent by the first device.

Based on the first aspect, the second aspect, the first implementation, and the second implementation, in a third implementation of this application, that more than one device is scheduled in at least one second frequency-domain subblock in the first frequency-domain subblock to perform TB PPDU transmission includes:
- more than one device is scheduled in at least one second frequency-domain subblock in the first frequency-domain subblock, to perform multiple user-multiple input multiple output (MU-MIMO) transmission by using an RU or MRU larger than or equal to 996 subcarriers; or
- more than one device is scheduled in at least one second frequency-domain subblock in the first frequency-domain subblock, to perform MU-MIMO transmission by using an RU or MRU smaller than 996 subcarriers.

In this possible implementation, some possible scenarios are provided in which more than one device is scheduled in the second frequency-domain subblock for transmission. For example, a same RU or MRU in the second frequency-domain subblock is allocated to a plurality of devices.

Based on the first aspect, the second aspect, and the first implementation to the third implementation, in a fourth implementation of this application, the first resource includes at least one RU or MRU smaller than 996 subcarriers.

In this possible implementation, the first resource includes the at least one RU or MRU smaller than 996 subcarriers. In this way, the second device may indicate, by using the first indication information, whether the first device is allowed to perform transmission on a resource subunit (including the at least one RU or MRU smaller than 996 subcarriers) when the first device performs transmission by using some of the N resource subunits. When the first indication information indicates allowing and the at least one RU or MRU smaller than 996 subcarriers is idle, the first device may perform transmission on the at least one RU or MRU smaller than 996 subcarriers. In this way, the first device performs transmission on an RU or MRU smaller than 996 subcarriers, thereby improving spectral utilization.

Based on the first aspect, the second aspect, and the first implementation to the fourth implementation, in a fifth implementation of this application, the first resource includes at least one RU or MRU, the at least one RU or MRU is an RU or MRU allocated to the first device in M second frequency-domain subblocks, and M is an integer greater than or equal to 1; and the TB PPDU includes second indication information, the second indication information separately indicates whether the first device has performed transmission on an RU or MRU allocated to the first device in each of the M second frequency-domain subblocks, and M is an integer greater than or equal to 1.

In the foregoing implementation, the TB PPDU may further include the second indication information, and the second indication information separately indicates whether the first device has performed transmission on the RU or MRU allocated to the first device in each of the M second frequency-domain subblocks. The first device indicates, at a granularity of a second frequency-domain subblock, whether the first device has performed transmission on the RU or MRU allocated to the first device in each second frequency-domain subblock. In this way, the second device determines RUs or MRUs on which the first device has performed transmission, thereby reducing complexity of reception processing to be performed by the second device.

Based on the first aspect, the second aspect, and the first implementation to the fifth implementation, in a sixth implementation of this application, if the first device has performed transmission on an RU or MRU allocated to the first device in a second frequency-domain subblock, a bit corresponding to the second frequency-domain subblock in the second indication information is duplication of a bit corresponding to the second frequency-domain subblock in a universal signal (U-SIG) Disregard and Validate field in the trigger frame; or

- if the first device does not perform transmission on an RU or MRU allocated to the first device in a second frequency-domain subblock, a bit corresponding to the second frequency-domain subblock in the second indication information is negation of a bit corresponding to the second frequency-domain subblock in a U-SIG Disregard and Validate field in the trigger frame; or
- if the first resource is not located in a third frequency-domain subblock, a bit corresponding to the third frequency-domain subblock in the second indication information is duplication of a bit corresponding to the third frequency-domain subblock in a U-SIG Disregard and Validate field in the trigger frame, the third frequency-domain subblock and the M second frequency-domain subblocks are frequency-domain subblocks included in a TB PPDU bandwidth, and the TB PPDU bandwidth is a bandwidth used by the second device to schedule the first device; or
- if a preset maximum TB PPDU bandwidth includes a fourth frequency-domain subblock and a TB PPDU bandwidth does not include the fourth frequency-domain subblock, a bit corresponding to the fourth frequency-domain subblock in the second indication information is duplication of a bit corresponding to the fourth frequency-domain subblock in a U-SIG Disregard and Validate field in the trigger frame, the TB PPDU bandwidth is a bandwidth used by the second device to schedule the first device, and the TB PPDU bandwidth is less than the preset maximum TB PPDU bandwidth.

In this possible implementation, relationships between the bits in the second indication information and the bits in the U-SIG Disregard and Validate field in the trigger frame are shown, so that the second device quickly parses the second indication information and determines RUs or MRUs on which the first device has performed transmission. It can be learned from the foregoing implementation that, a bit in the second indication information is either duplication of a corresponding bit in the U-SIG Disregard and Validate field in the trigger frame or negation of the corresponding bit in the U-SIG Disregard and Validate field in the trigger frame, so that the implementation logic of the solution is simpler.

Based on the first aspect, the second aspect, and the first implementation to the sixth implementation, in a seventh implementation of this application, the first resource includes at least one resource unit (RU); and

- the TB PPDU includes third indication information, and the third indication information separately indicates whether the first device has performed TB PPDU transmission on each of the at least one RU.

In the foregoing implementation, the TB PPDU may further include the third indication information, and the third indication information separately indicates whether the first device has performed TB PPDU transmission on each of the at least one RU. The first device indicates, at a granularity of an RU, whether the first device has performed transmission on each RU. In this way, the second device determines RUs on which the first device has performed transmission, thereby reducing complexity of reception processing to be performed by the second device. Particularly, when the first resource includes a 996+484+242-tone MRU and a 484+242-tone MRU, the first device may perform transmission more efficiently by using some RUs or MRUs, thereby further improving spectral utilization.

Based on the first aspect, the second aspect, and the first implementation to the seventh implementation, in an eighth implementation of this application, if the first device has performed transmission on an RU in the first resource, a bit corresponding to the RU in the third indication information is duplication of a bit corresponding to the RU in the U-SIG Disregard and Validate field in the trigger frame; or

- if the first device does not perform transmission on an RU in the first resource, a bit corresponding to the RU in the third indication information is negation of a bit corresponding to the RU in the U-SIG Disregard and Validate field in the trigger frame; or
- if a bit corresponding to an RU in the first resource in the third indication information is duplication or negation of a bit of the RU in the first resource in the U-SIG Disregard and Validate field in the trigger frame, bits other than the bit corresponding to the RU in the first resource in the second indication information are duplication of bits other than the bit of the RU in the first resource in the U-SIG Disregard and Validate field in the trigger frame.

In this possible implementation, relationships between the bits in the third indication information and the bits in the U-SIG Disregard and Validate field in the trigger frame are shown, so that the second device quickly parses the third indication information and determines RUs or MRUs on which the first device has performed transmission. It can be learned from the foregoing implementation that, a bit in the third indication information is either duplication of a corresponding bit in the U-SIG Disregard and Validate field in the trigger frame or negation of the corresponding bit in the U-SIG Disregard and Validate field in the trigger frame, so that the implementation logic of the solution is simpler.

Based on the first aspect, the second aspect, and the first implementation to the eighth implementation, in a ninth implementation of this application, the first indication information is located in at least one of the following: a common field of the trigger frame, a user-specific field of the trigger frame, or a special user-specific field of the trigger frame.

In this implementation, some possible locations of the first indication information in the trigger frame are provided, to facilitate the implementation of the solution.

According to a third aspect, this application provides a PPDU transmission method, including:

- A first device receives a trigger frame from a second device, where the trigger frame indicates a first resource allocated to the first device, the first resource includes N resource subunits, N is an integer greater than or equal to 1, the trigger frame includes a user-specific field corresponding to the first device, the user-specific field corresponding to the first device includes fourth indication information, and the fourth indication information indicates whether the first device is allowed to perform TB PPDU transmission on some of the N resource subunits, and/or indicates whether the first device is allowed to use an RU smaller than 996 subcarriers or an MRU smaller than 996 subcarriers for transmission when the first device performs transmission by using some of the N resource subunits; and the first device sends a TB PPDU to the second device on some of the N resource subunits based on the fourth indication information.

It can be learned from the foregoing technical solution that, the first device sends the TB PPDU to the second device on some of the N resource subunits based on the fourth indication information. In other words, the second device indicates, by using the fourth indication information, that the first device is allowed to perform TB PPDU transmission on some of the N resource subunits, and/or that the first device is allowed to use an RU smaller than 996 subcarriers or an MRU smaller than 996 subcarriers for transmission when the first device performs transmission by using some of the N resource subunits. In this way, the first device may perform transmission on some of the N resource subunits, thereby improving spectral utilization. If the fourth indication information indicates that the first device is allowed to use an RU smaller than 996 subcarriers or an MRU smaller than 996 subcarriers for transmission when the first device performs transmission by using some of the N resource subunits, the first device may alternatively perform transmission by using the RU smaller than 996 subcarriers or the MRU smaller than 996 subcarriers, thereby further improving spectral utilization.

According to a fourth aspect, this application provides a PPDU transmission method, including:

A second device sends a trigger frame to a first device, where the trigger frame indicates a first resource allocated to the first device, the first resource includes N resource subunits, the trigger frame includes a user-specific field corresponding to the first device, the user-specific field corresponding to the first device includes fourth indication information, and the fourth indication information indicates whether the first device is allowed to perform TB PPDU transmission on some of the N resource subunits, and/or indicates whether the first device is allowed to use an RU smaller than 996 subcarriers or an MRU smaller than 996 subcarriers for transmission when the first device performs transmission by using some of the N resource subunits; and the second device receives, from the first device, a TB PPDU sent on some of the N resource subunits.

It can be learned from the foregoing technical solution that, the second device receives, from the first device, the TB PPDU sent on some of the N resource subunits. In other words, the second device indicates, by using the fourth indication information, that the first device is allowed to perform TB PPDU transmission on some of the N resource subunits, and/or that the first device is allowed to use an RU smaller than 996 subcarriers or an MRU smaller than 996 subcarriers for transmission when the first device performs transmission by using some of the N resource subunits. In this way, the first device may perform transmission on some of the N resource subunits, thereby improving spectral utilization. If the fourth indication information indicates that the first device is allowed to use an RU smaller than 996 subcarriers or an MRU smaller than 996 subcarriers for transmission when the first device performs transmission by using some of the N resource subunits, the first device may alternatively perform transmission by using the RU smaller than 996 subcarriers or the MRU smaller than 996 subcarriers, thereby further improving spectral utilization.

Based on the third aspect and the fourth aspect, in a first implementation of this application, the fourth indication information includes a first bit and a second bit, the first bit indicates whether the first device is allowed to perform TB PPDU transmission on some of the N resource subunits, and the second bit indicates whether the first device is allowed to use an RU smaller than 996 subcarriers or an MRU smaller than 996 subcarriers for transmission when the first device performs transmission by using some of the N resource subunits.

In this implementation, the second device may separately indicate, by using two bits in each user-specific field in the trigger frame, whether the first device is allowed to perform TB PPDU transmission on some of the N resource subunits and whether the first device is allowed to use an RU smaller than 996 subcarriers or an MRU smaller than 996 subcarriers for transmission when the first device performs transmission by using some of the N resource subunits. In this way, the first device may determine, based on the fourth indication information, whether transmission can be performed on some of the resource subunits. When allowed, the first device may perform transmission on some of the N resource subunits, thereby improving spectral utilization. If the fourth indication information indicates that the first device is allowed to use an RU smaller than 996 subcarriers or an MRU smaller than 996 subcarriers for transmission when the first device performs transmission by using some of the N resource subunits, the first device may alternatively perform transmission by using the RU smaller than 996 subcarriers or the MRU smaller than 996 subcarriers, thereby further improving spectral utilization.

Based on the third aspect, the fourth aspect, and the first implementation, in a second implementation of this application, the fourth indication information includes a first bit sequence, and the first bit sequence indicates any one of the following:

the first device is not allowed to perform TB PPDU transmission on some of the N resource subunits; or the first device is allowed to perform TB PPDU transmission on some of the N resource subunits, but the first device is not allowed to use an RU smaller than 996 subcarriers or an MRU smaller than 996 subcarriers for transmission when the first device performs transmission by using some of the N resource subunits; or the first device is allowed to perform TB PPDU transmission on some of the N resource subunits, and the first device is allowed to use an RU smaller than 996 subcarriers or an MRU smaller than 996 subcarriers for transmission when the first device performs transmission by using some of the N resource subunits.

In this possible implementation, the second device indicates any one of the foregoing shown cases by using a plurality of possible values of the first bit sequence, so that the first device determines whether transmission can be performed on some of the resource subunits. When allowed, the first device may perform transmission on some of the N resource subunits, thereby improving spectral utilization. If the fourth indication information indicates that the first device is allowed to use an RU smaller than 996 subcarriers or an MRU smaller than 996 subcarriers for transmission when the first device performs transmission by using some of the N resource subunits, the first device may alternatively perform transmission by using the RU smaller than 996 subcarriers or the MRU smaller than 996 subcarriers, thereby further improving spectral utilization.

Based on the third aspect, the fourth aspect, and the first implementation to the second implementation, in a third implementation of this application, if the first device is not allowed to use an RU smaller than 996 subcarriers or an MRU smaller than 996 subcarriers for transmission when the first device performs transmission by using some of the N resource subunits, the fourth indication information includes a third bit, where the third bit indicates whether the first device is allowed to perform TB PPDU transmission on some of the N resource subunits.

In this implementation, the second device indicates, by using the third bit, whether the first device is allowed to perform TB PPDU transmission on some of the N resource subunits. When allowed, the first device may perform transmission on some of the N resource subunits, thereby improving spectral utilization.

According to a fifth aspect, this application provides a PPDU transmission method, including:

A first device receives a trigger frame from a second device, where the trigger frame indicates a first resource allocated to the first device, the first resource includes N resource subunits, N is an integer greater than or equal to 1, the trigger frame includes a common field and a user-specific field corresponding to the first device, the common field includes fifth indication information, the user-specific field corresponding to the first device includes sixth indication information, the fifth indication information indicates whether the first device is allowed to perform TB PPDU transmission on some of the N resource subunits, and the sixth indication information indicates whether the first device is allowed to use an RU smaller than 996 subcarriers or an MRU smaller than 996 subcarriers for transmission when the first device performs transmission on some of the N resource subunits; and the first device sends a TB PPDU to the second device on some of the N resource subunits based on the fifth indication information and the sixth indication information.

It can be learned that the first device sends the TB PPDU to the second device on some of the N resource subunits based on the fifth indication information. In other words, the second device indicates, by using the fifth indication information, that the first device is allowed to perform TB PPDU transmission on some of the N resource subunits; and/or indicates that the first device is allowed to use an RU smaller than 996 subcarriers or an MRU smaller than 996 subcarriers for transmission when the first device performs transmission by using some of the N resource subunit. In this way, the second device may perform transmission on some of the N resource subunits, thereby improving spectral utilization.

According to a sixth aspect, this application provides a PPDU transmission method, including:

A second device sends a trigger frame to a first device, where the trigger frame indicates a first resource allocated to the first device, the first resource includes N resource subunits, N is an integer greater than or equal to 1, the trigger frame includes a common field and a user-specific field corresponding to the first device, the common field includes fifth indication information, the user-specific field corresponding to the first device includes sixth indication information, the fifth indication information indicates whether the first device is allowed to perform TB PPDU transmission on some of the N resource subunits, and the sixth indication information indicates whether the first device is allowed to use an RU smaller than 996 subcarriers or an MRU smaller than 996 subcarriers for transmission when the first device performs transmission on some of the N resource subunits; and the second device receives, from the first device, a TB PPDU sent on some of the N resource subunits.

It can be learned that the second device receives, from the first device, the TB PPDU sent on some of the N resource subunits. In other words, the second device indicates, by using the fifth indication information, that the first device is allowed to perform TB PPDU transmission on some of the N resource subunits; and/or indicates that the first device is allowed to use an RU smaller than 996 subcarriers or an MRU smaller than 996 subcarriers for transmission when the first device performs transmission by using some of the N resource subunits. In this way, the second device may perform transmission on some of the N resource subunits, thereby improving spectral utilization.

According to a seventh aspect, this application provides a PPDU transmission method, including:

A first device receives a beacon frame from a second device, where the beacon frame includes a first bitmap, a length of the first bitmap is X bits, the bits in the first bitmap separately indicate whether transmission is allowed on each of P fifth frequency-domain subblocks included in a TB PPDU bandwidth, the TB PPDU bandwidth is a bandwidth used by the second device to schedule the first device, P is greater than or equal to 1 and less than or equal to X, and X is an integer greater than or equal to 1; the first device receives a trigger frame from the second device, where the trigger frame indicates a first resource allocated to the first device, the first resource includes N resource subunits, the N resource subunits include at least one RU smaller than 996 subcarriers or MRU smaller than 996 subcarriers, and N is an integer greater than or equal to 1; the first device separately determines, based on the first bitmap, whether each of the at least one RU smaller than 996 subcarriers or MRU smaller than 996 subcarriers included in the N resource subunits can be used for transmission when the first device performs transmission by using some of the N resource subunits; and the first device sends a TB PPDU to the second device on some of the N resource subunits, where the some resource subunits include an idle RU smaller than 996 subcarriers or an idle MRU smaller than 996 subcarriers that can be used for transmission.

It can be learned from the foregoing technical solution that, the first device may determine, based on the first bitmap in the beacon frame, whether each of the at least one RU smaller than 996 subcarriers or MRU smaller than 996 subcarriers included in the N resource subunits can be used for transmission, so that the first device performs transmission on an RU smaller than 996 subcarriers or an MRU smaller than 996 subcarriers that can be used for transmission. In this way, the first device performs transmission by using the RU smaller than 996 subcarriers or the MRU smaller than 996 subcarriers, thereby improving spectral utilization.

In a possible implementation, that the first device separately determines, based on the first bitmap, whether each of the at least one RU smaller than 996 subcarriers or MRU smaller than 996 subcarriers included in the N resource subunits can be used for transmission when the first device performs transmission by using some of the N resource subunits includes:

if a first condition is met, the first device determines that at least one RU smaller than 996 subcarriers or MRU smaller than 996 subcarriers allocated to the first device in an $i^{th}$ second frequency-domain subblock in M second frequency-domain subblocks can be used for transmission when the first device performs transmission by using some of the N resource subunits, where i is an integer greater than or equal to 1 and less than or equal to M; and the first condition includes: In the $i^{th}$ second frequency-domain subblock, no RU or MRU is allocated except the at least one RU smaller than 996 subcarriers or MRU smaller than 996 subcarriers allocated to the first device, and the second device allows the first device to perform transmission on some of the N resource subunits.

In this possible implementation, a specific implementation is shown in which the first device determines whether the at least one RU smaller than 996 subcarriers or MRU smaller than 996 subcarriers can be used for transmission, to facilitate the implementation of the solution.

According to an eighth aspect, this application provides a PPDU transmission method, including:

A second device sends a beacon frame to a first device, where the beacon frame includes a first bitmap, a length of the first bitmap is X bits, the bits in the first bitmap separately indicate whether transmission is allowed on each of P fifth frequency-domain subblocks included in a TB PPDU bandwidth, the TB PPDU bandwidth is a bandwidth used by the second device to schedule the first device, P is greater than or equal to 1 and less than or equal to X, and X is an integer greater than or equal to 1; the second device sends a trigger frame to the first device, where the trigger frame indicates a first resource allocated to the first device, the first resource includes N resource subunits, the N resource subunits include at least one RU smaller than 996 subcarriers or MRU smaller than 996 subcarriers, and N is an integer greater than or equal to 1; and the second device receives, from the first device, a TB PPDU sent on some of the N resource subunits, where the some resource subunits include an idle RU smaller than 996 subcarriers or an idle MRU smaller than 996 subcarriers that can be used for transmission.

It can be learned from the foregoing technical solution that, the second device sends the first bitmap through the beacon frame to the first device, so that the first device determines, based on the first bitmap, whether each of the at least one RU smaller than 996 subcarriers or MRU smaller than 996 subcarriers included in the N resource subunits can be used for transmission, so that the first device performs transmission on an RU smaller than 996 subcarriers or an MRU smaller than 996 subcarriers that can be used for transmission. In this way, the first device performs transmission by using the RU smaller than 996 subcarriers or the MRU smaller than 996 subcarriers, thereby improving spectral utilization.

According to a ninth aspect, this application provides a PPDU transmission method, including:

A first device receives a trigger frame from a second device, where the trigger frame indicates a first resource allocated to the first device, the first resource includes N resource subunits, N is an integer greater than or equal to 1, the trigger frame includes a first user-specific field, the first user-specific field includes a first association identifier, and the first association identifier indicates that an RU or MRU indicated by a resource unit allocation subfield in the first user-specific field is unallocated; the first device determines, based on the first association identifier, that an RU or MRU, other than a first RU or MRU, in a second frequency-domain subblock is unallocated, and the first device determines that the first RU or MRU can be used for transmission when the first device performs transmission by using some of the N resource subunits; and the first device sends a TB PPDU to the second device on some of the N resource subunits, where the some resource subunits include the first RU or MRU.

It can be learned from the foregoing technical solution that, the second device indicates, by using the first association identifier included in the first user-specific field in the trigger frame, that the RU or MRU indicated by the resource unit allocation subfield in the first user-specific field is unallocated. In this way, the first device determines, based on the first association identifier, that the RU or MRU, other than the first RU or MRU, in the second frequency-domain subblock is unallocated, so that the first device performs transmission by using the first RU or the MRU. In this way, the first device performs transmission by using an RU smaller than 996 subcarriers or an MRU smaller than 996 subcarriers, thereby improving spectral utilization.

According to a tenth aspect, this application provides a PPDU transmission method, including:

A second device sends a trigger frame to a first device, where the trigger frame indicates a first resource allocated to the first device, the first resource includes N resource subunits, N is an integer greater than or equal to 1, the trigger frame includes a first user-specific field, the first user-specific field includes a first association identifier, and the first association identifier indicates that an RU or MRU indicated by a resource unit allocation subfield in the first user-specific field is unallocated; and the second device receives, from the first device, a TB PPDU sent on some of the N resource subunits, where the some resource subunits include the first RU or MRU.

It can be learned from the foregoing technical solution that, the second device indicates, by using the first association identifier included in the first user-specific field in the trigger frame, that the RU or MRU indicated by the resource unit allocation subfield in the first user-specific field is unallocated. In this way, the first device determines, based on the first association identifier, that the RU or MRU, other than the first RU or MRU, in the second frequency-domain subblock is unallocated, so that the first device performs transmission by using the first RU or the MRU. In this way, the first device performs transmission by using an RU smaller than 996 subcarriers or an MRU smaller than 996 subcarriers, thereby improving spectral utilization.

According to an eleventh aspect, this application provides a PPDU transmission method, including:

A first device receives a trigger frame from a second device, where the trigger frame indicates a first resource allocated to the first device, the first resource includes N resource subunits, N is an integer greater than or equal to 1, the trigger frame includes puncturing indication information, the puncturing indication information separately indicates whether transmission is allowed on each of R fifth frequency-domain subblocks included in a TB PPDU bandwidth, the TB PPDU bandwidth may be a bandwidth used by the second device to schedule the first device or may be a preset maximum TB PPDU bandwidth, and R is greater than or equal to 1 and less than or equal to a quantity of the fifth frequency-domain subblocks included in the TB PPDU bandwidth; the first device separately determines, based on the puncturing indication information, whether an RU smaller than 996 subcarriers or an MRU smaller than 996 subcarriers included in the N resource subunits can be used for transmission when the first device performs transmission by using some of the N resource subunits; and the first device sends a TB PPDU to the second device on some of the N resource subunits, where the some resource subunits include an idle RU smaller than 996 subcarriers or an idle MRU smaller than 996 subcarriers that can be used for transmission.

In the foregoing technical solution, the second device separately indicates, by using the puncturing indication information in the trigger frame, whether transmission is allowed on each of the R fifth frequency-domain subblocks included in the TB PPDU bandwidth. The first device may determine, based on the puncturing indication information, whether the RU smaller than 996 subcarriers or MRU smaller than 996 subcarriers included in the N resource subunits can be used for transmission when the first device performs transmission by using some of the N resource subunits, so that the first device performs transmission on an RU smaller than 996 subcarriers or an MRU smaller than 996 subcarriers that can be used for transmission. In this way, the first device performs transmission by using the RU smaller than 996 subcarriers or MRU smaller than 996 subcarriers, thereby improving spectral utilization.

According to a twelfth aspect, this application provides a PPDU transmission method, including:

A second device sends a trigger frame to a first device, where the trigger frame indicates a first resource allocated to the first device, the first resource includes N resource subunits, N is an integer greater than or equal to 1, the trigger frame includes puncturing indication information, the puncturing indication information separately indicates whether transmission is allowed on each of R fifth frequency-domain subblocks included in a TB PPDU bandwidth, the TB PPDU bandwidth may be a bandwidth used by the second device to schedule the first device or may be a preset maximum TB PPDU bandwidth, and R is greater than or equal to 1 and less than or equal to a quantity of the fifth frequency-domain subblocks included in the TB PPDU bandwidth; and the second device receives, from the first device, a TB PPDU sent on some of the N resource subunits, where the some resource subunits include an idle RU smaller than 996 subcarriers or an idle MRU smaller than 996 subcarriers that can be used for transmission.

In the foregoing technical solution, the second device separately indicates, by using the puncturing indication information in the trigger frame, whether transmission is allowed on each of the R fifth frequency-domain subblocks included in the TB PPDU bandwidth. The first device may determine, based on the puncturing indication information, whether an RU smaller than 996 subcarriers or an MRU smaller than 996 subcarriers included in the N resource subunits can be used for transmission when the first device performs transmission by using some of the N resource subunits, so that the first device performs transmission on an RU smaller than 996 subcarriers or an MRU smaller than 996 subcarriers that can be used for transmission. In this way, the first device performs transmission by using the RU smaller than 996 subcarriers or MRU smaller than 996 subcarriers, thereby improving spectral utilization.

According to a thirteenth aspect, this application provides a PPDU transmission method, including:

A first device receives a trigger frame from a second device, where the trigger frame indicates a first resource allocated to the first device, the first resource includes N resource subunits, the N resource subunits include a 996+484+242-tone MRU, and N is an integer greater than or equal to 1; if the second device allows the first device to perform transmission by using some of the N resource subunits, the first device determines, based on the first resource, that an RU smaller than 996 subcarriers or an MRU smaller than 996 subcarriers included in the N resource subunits can be used for transmission when the first device performs transmission by using some of the N resource subunits; and the first device sends a TB PPDU to the second device on some of the N resource subunits, where the some resource subunits include an idle RU smaller than 996 subcarriers or an idle MRU smaller than 996 subcarriers that can be used for transmission. According to the foregoing technical solution, for a case in which the N first resource subunits are a 996+484+242-tone MRU, if the second device allows the first device to perform transmission by using some of the N resource subunits, the first device may determine by default that the second device allows the first device to use an RU smaller than 996 subcarriers or an MRU smaller than 996 subcarriers for transmission. In this way, the first device may perform transmission by using the RU smaller than 996 subcarriers or MRU smaller than 996 subcarriers, thereby improving spectral utilization.

According to a fourteenth aspect, this application provides a PPDU transmission method, including:

A second device sends a trigger frame to a first device, where the trigger frame indicates a first resource allocated to the first device, the first resource includes N resource subunits, the N resource subunits include a 996+484+242-tone MRU, and N is an integer greater than or equal to 1; and the second device receives, from the first device, a TB PPDU sent on some of the N resource subunits, where the some resource subunits include an idle RU smaller than 996 subcarriers or an idle MRU smaller than 996 subcarriers that can be used for transmission. According to the foregoing technical solution, for a case in which the N first resource subunits are a 996+484+242-tone MRU, the first device may determine by default that the second device allows the first device to use an RU smaller than 996 subcarriers or an MRU smaller than 996 subcarriers for transmission. In this way, the first device may perform transmission by using the RU smaller than 996 subcarriers or the MRU smaller than 996 subcarriers, thereby improving spectral utilization.

According to a fifteenth aspect, this application provides a PPDU transmission method, including:

A first device receives a trigger frame from a second device, where the trigger frame indicates a first resource allocated to the first device, the first resource includes N resource subunits, N is an integer greater than or equal to 1, the N resource subunits include at least one RU or MRU, the at least one RU or MRU is located in M second frequency-domain subblocks, and M is an integer greater than or equal to 1; and the first device sends a TB PPDU to the second device on some of the N resource subunits, where the TB PPDU includes seventh indication information. The seventh indication information separately indicates whether the first device has performed transmission on an RU or MRU allocated to the first device in each of the M second frequency-domain subblocks. Values of bits included in the seventh indication information include at least one of the following: If the first device has performed transmission on an RU or MRU allocated to the first device in a second frequency-domain subblock, a bit corresponding to the second frequency-domain subblock in the seventh indication information is duplication of a bit corresponding to the second frequency-domain subblock in a U-SIG Disregard and Validate field in the trigger frame; or if the first device does not perform transmission on an RU or MRU allocated to the first device in a second frequency-domain subblock, a bit corresponding to the second frequency-domain subblock in the seventh indication information is negation of a bit corresponding to the second frequency-domain subblock in a U-SIG Disregard and Validate field in the trigger frame; or if the first resource is not located in a third frequency-domain subblock, a bit corresponding to the third frequency-domain subblock in the seventh indication information is duplication of a bit corresponding to the third frequency-domain subblock in a universal signal U-SIG Disregard and Validate field in the trigger frame, the third frequency-domain subblock and the M second frequency-domain subblocks are frequency-domain subblocks included in a TB PPDU bandwidth, and the TB PPDU bandwidth is a bandwidth used by the second device to schedule the first device; or if a preset maximum TB PPDU bandwidth includes a fourth frequency-domain subblock and a TB PPDU bandwidth does not include the fourth frequency-domain subblock, a bit corresponding to the fourth frequency-domain subblock in the seventh indication information is duplication of a bit corresponding to the fourth frequency-domain subblock in a universal signal U-SIG Disregard and Validate field in the trigger frame, the TB PPDU bandwidth is a bandwidth used by the second device to schedule the first device, and the TB PPDU bandwidth is less than the preset maximum TB PPDU bandwidth.

It can be learned from the foregoing technical solution that, relationships between the bits in the seventh indication information and the bits in the U-SIG Disregard and Validate field in the trigger frame are shown, so that the second device quickly parses the seventh indication information and determines RUs or MRUs on which the first device has performed transmission. A bit in the seventh indication information is either duplication of a corresponding bit in the U-SIG Disregard and Validate field in the trigger frame or negation of the corresponding bit in the U-SIG Disregard and Validate field in the trigger frame, so that the implementation logic of the solution is simpler.

According to a sixteenth aspect, this application provides a PPDU transmission method, including:

A second device sends a trigger frame to a first device, where the trigger frame indicates a first resource allocated to the first device, the first resource includes N resource subunits, N is an integer greater than or equal to 1, the N resource subunits include at least one RU or MRU, the at least one RU or MRU is located in M second frequency-domain subblocks, and M is an integer greater than or equal to 1; and the second device receives, from the first device, a TB PPDU sent on some of the N resource subunits, where the TB PPDU includes seventh indication information. The seventh indication information separately indicates whether the first device has performed transmission on an RU or MRU allocated to the first device in each of the M second frequency-domain subblocks. Values of bits included in the seventh indication information include at least one of the following: If the first device has performed transmission on an RU or MRU allocated to the first device in a second frequency-domain subblock, a bit corresponding to the second frequency-domain subblock in the seventh indication information is duplication of a bit corresponding to the second frequency-domain subblock in a U-SIG Disregard and Validate field in the trigger frame; or if the first device does not perform transmission on an RU or MRU allocated to the first device in a second frequency-domain subblock, a bit corresponding to the second frequency-domain subblock in the seventh indication information is negation of a bit corresponding to the second frequency-domain subblock in a U-SIG Disregard and Validate field in the trigger frame; or if the first resource is not located in a third frequency-domain subblock, a bit corresponding to the third frequency-domain subblock in the seventh indication information is duplication of a bit corresponding to the third frequency-domain subblock in a universal signal U-SIG Disregard and Validate field in the trigger frame, the third frequency-domain subblock and the M second frequency-domain subblocks are frequency-domain subblocks included in a TB PPDU bandwidth, and the TB PPDU bandwidth is a bandwidth used by the second device to schedule the first device; or if a preset maximum TB PPDU bandwidth includes a fourth frequency-domain subblock and a TB PPDU bandwidth does not include the fourth frequency-domain subblock, a bit corresponding to the fourth frequency-domain subblock in the seventh indication information is duplication of a bit corresponding to the fourth frequency-domain subblock in a universal signal U-SIG Disregard and Validate field in the trigger frame, the TB PPDU bandwidth is a bandwidth used by the second device to schedule the first device, and the TB PPDU bandwidth is less than the preset maximum TB PPDU bandwidth.

It can be learned from the foregoing technical solution that, relationships between the bits in the seventh indication information and the bits in the U-SIG Disregard and Validate field in the trigger frame are shown, so that the second device quickly parses the seventh indication information and determines RUs or MRUs on which the first device has performed transmission. A bit in the seventh indication information is either duplication of a corresponding bit in the U-SIG Disregard and Validate field in the trigger frame or negation of the corresponding bit in the U-SIG Disregard and Validate field in the trigger frame, so that the implementation logic of the solution is simpler.

According to a seventeenth aspect, this application provides a first communication apparatus, where the first communication apparatus includes:

a receiving unit, configured to receive a trigger frame from a second communication apparatus, where the trigger frame indicates a first resource allocated to the first communication apparatus, the first resource includes N resource subunits, the trigger frame includes first indication information, the first indication information separately indicates whether the first communication apparatus is allowed to perform trigger-based physical layer protocol data unit (TB PPDU) transmission on each of the N resource subunits when the first communication apparatus performs TB PPDU transmission by using some of the N resource subunits, and N is an integer greater than or equal to 1; and a sending unit, configured to send a TB PPDU to the second communication apparatus on some of the N resource subunits based on the first indication information.

According to an eighteenth aspect, this application provides a second communication apparatus, where the second communication apparatus includes:

a sending unit, configured to send a trigger frame to a first communication apparatus, where the trigger frame indicates a first resource allocated to the first communication apparatus, the first resource includes N resource subunits, the trigger frame includes first indication information, the first indication information separately indicates whether the first communication apparatus is allowed to perform TB PPDU transmission on each of the N resource subunits when the first communication apparatus performs transmission by using some of the N resource subunits, and N is an integer greater than or equal to 1; and a receiving unit, configured to receive, from the first communication apparatus, a TB PPDU sent on some of the N resource subunits.

Based on the seventeenth aspect or the eighteenth aspect, in a first implementation of this application, a resource subunit in the N resource subunits is located in a first frequency-domain subblock, and the first frequency-domain subblock includes at least one second frequency-domain subblock.

Based on the seventeenth aspect, the eighteenth aspect, and the first implementation, in a second implementation of this application, if a first condition is met, the first indication information indicates that the first communication apparatus is not allowed to perform TB PPDU transmission on the resource subunit when the first communication apparatus performs transmission by using some of the N resource subunits; and the first condition includes at least one of the following:

more than one device is scheduled in at least one second frequency-domain subblock in the first frequency-domain subblock to perform TB PPDU transmission; or when the first communication apparatus performs transmission by using some of the N resource subunits, the second communication apparatus does not support transmission on an RU or MRU smaller than 996 subcarriers.

Based on the seventeenth aspect, the eighteenth aspect, the first implementation, and the second implementation, in a third implementation of this application, that more than one device is scheduled in at least one second frequency-domain subblock in the first frequency-domain subblock to perform TB PPDU transmission includes:

more than one device is scheduled in at least one second frequency-domain subblock in the first frequency-domain subblock, to perform MU-MIMO transmission by using a resource unit (RU) or multiple-resource unit (MRU) larger than or equal to 996 subcarriers; or more than one device is scheduled in at least one second frequency-domain subblock in the first frequency-domain subblock, to perform MU-MIMO transmission by using an RU or MRU smaller than 996 subcarriers.

Based on the seventeenth aspect, the eighteenth aspect, and the first implementation to the third implementation, in a fourth implementation of this application, the first resource includes at least one RU or MRU smaller than 996 subcarriers.

Based on the seventeenth aspect, the eighteenth aspect, and the first implementation to the fourth implementation, in a fifth implementation of this application, the first resource includes at least one RU or MRU, the at least one RU or MRU is an RU or MRU allocated to the first communication apparatus in M second frequency-domain subblocks, and M is an integer greater than or equal to 1; and the TB PPDU includes second indication information, the second indication information separately indicates whether the first communication apparatus has performed transmission on an RU or MRU allocated to the first communication apparatus in each of the M second frequency-domain subblocks, and M is an integer greater than or equal to 1.

Based on the seventeenth aspect, the eighteenth aspect, and the first implementation to the fifth implementation, in a sixth implementation of this application, if the first communication apparatus has performed transmission on an RU or MRU allocated to the first communication apparatus in a second frequency-domain subblock, a bit corresponding to the second frequency-domain subblock in the second indication information is duplication of a bit corresponding to the second frequency-domain subblock in a U-SIG Disregard and Validate field in the trigger frame; or if the first communication apparatus does not perform transmission on an RU or MRU allocated to the first communication apparatus in a second frequency-domain subblock, a bit corresponding to the second frequency-domain subblock in the second indication information is negation of a bit corresponding to the second frequency-domain subblock in a U-SIG Disregard and Validate field in the trigger frame; or if the first resource is not located in a third frequency-domain subblock, a bit corresponding to the third frequency-domain subblock in the second indication information is duplication of a bit corresponding to the third frequency-domain subblock in a U-SIG Disregard and Validate field in the trigger frame, the third frequency-domain subblock and the M second frequency-domain subblocks are frequency-domain subblocks included in a TB PPDU bandwidth, and the TB PPDU bandwidth is a bandwidth used by the second communication apparatus to schedule the first communication apparatus; or if a preset maximum TB PPDU bandwidth includes a fourth frequency-domain subblock and a TB PPDU bandwidth does not include the fourth frequency-domain subblock, a bit corresponding to the fourth frequency-domain subblock in the second indication information is duplication of a bit corresponding to the fourth frequency-domain subblock in a U-SIG Disregard and Validate field in the trigger frame, the TB PPDU bandwidth is a bandwidth used by the second communication apparatus to schedule the first communication apparatus, and the TB PPDU bandwidth is less than the preset maximum TB PPDU bandwidth.

Based on the seventeenth aspect, the eighteenth aspect, and the first implementation to the sixth implementation, in a seventh implementation of this application, the first resource includes at least one resource unit (RU); and the TB PPDU includes third indication information, and the third indication information separately indicates whether the first communication apparatus has performed TB PPDU transmission on each of the at least one RU.

Based on the seventeenth aspect, the eighteenth aspect, and the first implementation to the seventh implementation, in an eighth implementation of this application, if the first communication apparatus has performed transmission on an RU in the first resource, a bit corresponding to the RU in the third indication information is duplication of a bit corresponding to the RU in the U-SIG Disregard and Validate field in the trigger frame; or if the first communication apparatus does not perform transmission on an RU in the first resource, a bit corresponding to the RU in the third indication information is negation of a bit corresponding to the RU in the U-SIG Disregard and Validate field in the trigger frame; or if a bit corresponding to an RU in the first resource in the third indication information is duplication or negation of a bit of the RU in the first resource in the U-SIG Disregard and Validate field in the trigger frame, bits other than the bit corresponding to the RU in the first resource in the second indication information are duplication of bits other than the bit of the RU in the first resource in the U-SIG Disregard and Validate field in the trigger frame.

Based on the seventeenth aspect, the eighteenth aspect, and the first implementation to the eighth implementation, in a ninth implementation of this application, the first indication information is located in at least one of the following: a common field of the trigger frame, a user-specific field of the trigger frame, or a special user-specific field of the trigger frame.

According to a nineteenth aspect, this application provides a first communication apparatus, including:

a receiving unit, configured to receive a trigger frame from a second communication apparatus, where the trigger frame indicates a first resource allocated to the first communication apparatus, the first resource includes N resource subunits, N is an integer greater than or equal to 1, the trigger frame includes a user-specific field corresponding to the first communication apparatus, the user-specific field corresponding to the first communication apparatus includes fourth indication information, and the fourth indication information indicates whether the first communication apparatus is allowed to perform TB PPDU transmission on some of the N resource subunits and/or indicates whether the first communication apparatus is allowed to use an RU smaller than 996 subcarriers or an MRU smaller than 996 subcarriers for transmission when the first communication apparatus performs transmission by using some of the N resource subunits; and a sending unit, configured to send a TB PPDU to the second communication apparatus on some of the N resource subunits based on the fourth indication information.

According to a twentieth aspect, this application provides a second communication apparatus, including:

a sending unit, configured to send a trigger frame to a first communication apparatus, where the trigger frame indicates a first resource allocated to the first communication apparatus, the first resource includes N resource subunits, N is an integer greater than or equal to 1, the trigger frame includes a user-specific field corresponding to the first communication apparatus, the user-specific field corresponding to the first communication apparatus includes fourth indication information, and the fourth indication information indicates whether the first communication apparatus is allowed to perform TB PPDU transmission on some of the N resource subunits and/or indicates whether the first communication apparatus is allowed to use an RU smaller than 996 subcarriers or an MRU smaller than 996 subcarriers for transmission when the first communication apparatus performs transmission by using some of the N resource subunits; and a receiving unit, configured to receive, from the first communication apparatus, a TB PPDU sent on some of the N resource subunits.

Based on the nineteenth aspect and the twentieth aspect, in a first implementation of this application, the fourth indication information includes a first bit and a second bit, the first bit indicates whether the first device is allowed to perform TB PPDU transmission on some of the N resource subunits, and the second bit indicates whether the first communication apparatus is allowed to use an RU smaller than 996 subcarriers or an MRU smaller than 996 subcarriers for transmission when the first communication apparatus performs transmission by using some of the N resource subunits.

Based on the nineteenth aspect, the twentieth aspect, and the first implementation, in a second implementation of this application, the fourth indication information includes a first bit sequence, and the first bit sequence indicates any one of the following:

the first communication apparatus is not allowed to perform TB PPDU transmission on some of the N resource subunits; or the first communication apparatus is allowed to perform TB PPDU transmission on some of the N resource subunits, but the first communication apparatus is not allowed to use an RU smaller than 996 subcarriers or an MRU smaller than 996 subcarriers for transmission when the first communication apparatus performs transmission by using some of the N resource subunits; or the first communication apparatus is allowed to perform TB PPDU transmission on some of the N resource subunits, and the first communication apparatus is allowed to use an RU smaller than 996 subcarriers or an MRU smaller than 996 subcarriers for transmission when the first communication apparatus performs transmission by using some of the N resource subunits.

Based on the nineteenth aspect, the twentieth aspect, and the first implementation to the second implementation, in a third implementation of this application, if the first communication apparatus is not allowed to use an RU smaller than 996 subcarriers or an MRU smaller than 996 subcarriers for transmission when the first communication apparatus performs transmission by using some of the N resource subunits, the fourth indication information includes a third bit, where the third bit indicates whether the first communication apparatus is allowed to perform TB PPDU transmission on some of the N resource subunits.

According to a twenty-first aspect, this application provides a first communication apparatus, including:

a receiving unit, configured to receive a trigger frame from a second communication apparatus, where the trigger frame indicates a first resource allocated to the first communication apparatus, the first resource includes N resource subunits, N is an integer greater than or equal to 1, the trigger frame includes a common field and a user-specific field corresponding to the first communication apparatus, the common field includes fifth indication information, the user-specific field corresponding to the first communication apparatus includes sixth indication information, the fifth indication information indicates whether the first communication apparatus is allowed to perform TB PPDU transmission on some of the N resource subunits, and the sixth indication information indicates whether the first communication apparatus is allowed to use an RU smaller than 996 subcarriers or an MRU smaller than 996 subcarriers for transmission when the first communication apparatus performs transmission on some of the N resource subunits; and a sending unit, configured to send a TB PPDU to the second communication apparatus on some of the N resource subunits based on the fifth indication information and the sixth indication information.

According to a twenty-second aspect, this application provides a second communication apparatus, including:

a sending unit, configured to send a trigger frame to a first communication apparatus, where the trigger frame indicates a first resource allocated to the first communication apparatus, the first resource includes N resource subunits, N is an integer greater than or equal to 1, the trigger frame includes a common field and a user-specific field corresponding to the first communication apparatus, the common field includes fifth indication information, the user-specific field corresponding to the first communication apparatus includes sixth indication information, the fifth indication information indicates whether the first communication apparatus is allowed to perform TB PPDU transmission on some of the N resource subunits, and the sixth indication information indicates whether the first communication apparatus is allowed to use an RU smaller than 996 subcarriers or an MRU smaller than 996 subcarriers for transmission when the first communication apparatus performs transmission on some of the N resource subunits; and a receiving unit, configured to receive, from the first communication apparatus, a TB PPDU sent on some of the N resource subunits.

According to a twenty-third aspect, this application provides a first communication apparatus, including:

a receiving unit, configured to receive a beacon frame from a second communication apparatus, where the beacon frame includes a first bitmap, a length of the first bitmap is X bits, the bits in the first bitmap separately indicate whether transmission is allowed on each of P fifth frequency-domain subblocks included in a TB PPDU bandwidth, the TB PPDU bandwidth is a bandwidth used by the second communication apparatus to schedule the first communication apparatus, P is greater than or equal to 1 and less than or equal to X, and X is an integer greater than or equal to 1; and receive a trigger frame from the second communication apparatus, where the trigger frame indicates a first resource allocated to the first communication apparatus, the first resource includes N resource subunits, the N resource subunits include at least one RU smaller than 996 subcarriers or MRU smaller than 996 subcarriers, and N is an integer greater than or equal to 1;

a processing unit, configured to separately determine, based on the first bitmap, whether each of the at least one RU smaller than 996 subcarriers or MRU smaller than 996 subcarriers included in the N resource subunits can be used for transmission when the first communication apparatus performs transmission by using some of the N resource subunits; and a sending unit, configured to send a TB PPDU to the second communication apparatus on some of the N resource subunits, where the some resource subunits include an idle RU smaller than 996 subcarriers or an idle MRU smaller than 996 subcarriers that can be used for transmission.

In a possible implementation, the processing unit is specifically configured to:

if a first condition is met, determine that at least one RU smaller than 996 subcarriers or MRU smaller than 996 subcarriers allocated to the first communication apparatus in an $i^{th}$ second frequency-domain subblock in M second frequency-domain subblocks can be used for transmission when the first communication apparatus performs transmission by using some of the N resource subunits, where i is an integer greater than or equal to 1 and less than or equal to M; and the first condition includes: In the $i^{th}$ second frequency-domain subblock, no RU or MRU is allocated except the at least one RU smaller than 996 subcarriers or MRU smaller than 996 subcarriers allocated to the first communication apparatus, and the second communication apparatus allows the first communication apparatus to perform transmission on some of the N resource subunits.

According to a twenty-fourth aspect, this application provides a second communication apparatus, including:

a sending unit, configured to send a beacon frame to a first communication apparatus, where the beacon frame includes a first bitmap, a length of the first bitmap is X bits, the bits in the first bitmap separately indicate whether transmission is allowed on each of P fifth frequency-domain subblocks included in a TB PPDU bandwidth, the TB PPDU bandwidth is a bandwidth used by the second communication apparatus to schedule the first communication apparatus, P is greater than or equal to 1 and less than or equal to X, and X is an integer greater than or equal to 1; and send a trigger frame to the first communication apparatus, where the trigger frame indicates a first resource allocated to the first communication apparatus, the first resource includes N resource subunits, the N resource subunits include at least one RU smaller than 996 subcarriers or MRU smaller than 996 subcarriers, and N is an integer greater than or equal to 1; and a receiving unit, configured to receive, from the first communication apparatus, a TB PPDU sent on some of the N resource subunits, where the some resource subunits include an idle RU smaller than 996 subcarriers or an idle MRU smaller than 996 subcarriers that can be used for transmission.

According to a twenty-fifth aspect, this application provides a first communication apparatus, including:

a receiving unit, configured to receive a trigger frame from a second communication apparatus, where the trigger frame indicates a first resource allocated to the first communication apparatus, the first resource includes N resource subunits, N is an integer greater than or equal to 1, the trigger frame includes a first user-specific field, the first user-specific field includes a first association identifier, and the first association identifier indicates that an RU or MRU indicated by a resource unit allocation subfield in the first user-specific field is unallocated;

a processing unit, configured to: determine, based on the first association identifier, that an RU or MRU, other than a first RU or MRU, in a second frequency-domain subblock is unallocated; and determine that the first RU or MRU can be used for transmission when the first communication apparatus performs transmission by using some of the N resource subunits; and a sending unit, configured to send a TB PPDU to the second communication apparatus on some of the N resource subunits, where the some resource subunits include the first RU or MRU.

According to a twenty-sixth aspect, this application provides a second communication apparatus, including:

a sending unit, configured to send a trigger frame to a first communication apparatus, where the trigger frame indicates a first resource allocated to the first communication apparatus, the first resource includes N resource subunits, N is an integer greater than or equal to 1, the trigger frame includes a first user-specific field, the first user-specific field includes a first association identifier, and the first association identifier indicates that an RU or MRU indicated by a resource unit allocation subfield in the first user-specific field is unallocated; and a receiving unit, configured to receive, from the first communication apparatus, a TB PPDU sent on some of the N resource subunits, where the some resource subunits include the first RU or MRU.

According to a twenty-seventh aspect, this application provides a first communication apparatus, including:

a receiving unit, configured to receive a trigger frame from a second communication apparatus, where the trigger frame indicates a first resource allocated to the first communication apparatus, the first resource includes N resource subunits, N is an integer greater than or equal to 1, the trigger frame includes puncturing indication information, the puncturing indication information separately indicates whether transmission is allowed on each of R fifth frequency-domain subblocks included in a TB PPDU bandwidth, the TB PPDU bandwidth may be a bandwidth used by the second communication apparatus to schedule the first communication apparatus, or may be a preset maximum TB PPDU bandwidth, and R is greater than or equal to 1 and less than or equal to a quantity of the fifth frequency-domain subblocks included in the TB PPDU bandwidth;

a processing unit, configured to separately determine, based on the puncturing indication information, whether an RU smaller than 996 subcarriers or an MRU smaller than 996 subcarriers included in the N resource subunits can be used for transmission when the first communication apparatus performs transmission by using some of the N resource subunits; and a sending unit, configured to send a TB PPDU to the second communication apparatus on some of the N resource subunits, where the some resource subunits include an idle RU smaller than 996 subcarriers or an idle MRU smaller than 996 subcarriers that can be used for transmission.

According to a twenty-eighth aspect, this application provides a second communication apparatus, including:

a sending unit, configured to send a trigger frame to a first communication apparatus, where the trigger frame indicates a first resource allocated to the first communication apparatus, the first resource includes N resource subunits, N is an integer greater than or equal to 1, the trigger frame includes puncturing indication information, the puncturing indication information separately indicates whether transmission is allowed on each of R fifth frequency-domain subblocks included in a TB PPDU bandwidth, the TB PPDU bandwidth may be a bandwidth used by the second communication apparatus to schedule the first communication apparatus or may be a preset maximum TB PPDU bandwidth, and R is greater than or equal to 1 and less than or equal to a quantity of the fifth frequency-domain subblocks included in the TB PPDU bandwidth; and a receiving unit, configured to receive, from the first communication apparatus, a TB PPDU sent on some of the N resource subunits, where the some resource subunits include an idle RU smaller than 996 subcarriers or an idle MRU smaller than 996 subcarriers that can be used for transmission.

According to a twenty-ninth aspect, this application provides a first communication apparatus, including:

a receiving unit, configured to receive a trigger frame from a second communication apparatus, where the trigger frame indicates a first resource allocated to the first communication apparatus, the first resource includes N resource subunits, the N resource subunits include a 996+484+242-tone MRU, and N is an integer greater than or equal to 1;

a processing unit, configured to: if the second communication apparatus allows the first communication apparatus to perform transmission by using some of the N resource subunits, determine, based on the first resource, that an RU smaller than 996 subcarriers or an MRU smaller than 996 subcarriers included in the N resource subunits can be used for transmission when the first communication apparatus performs transmission by using some of the N resource subunits; and a sending unit, configured to send a TB PPDU to the second communication apparatus on some of the N resource subunits, where the some resource subunits include an idle RU smaller than 996 subcarriers or an idle MRU smaller than 996 subcarriers that can be used for transmission.

According to a thirtieth aspect, this application provides a second communication apparatus, including:

a sending unit, configured to send a trigger frame to a first communication apparatus, where the trigger frame indicates a first resource allocated to the first communication apparatus, the first resource includes N resource subunits, the N resource subunits include a 996+484+242-tone MRU, and N is an integer greater than or equal to 1; and a receiving unit, configured to receive, from the first communication apparatus, a TB PPDU sent on some of the N resource subunits, where the some resource subunits include an idle RU smaller than 996 subcarriers or an idle MRU smaller than 996 subcarriers that can be used for transmission.

According to a thirty-first aspect, this application provides a first communication apparatus, including:

a receiving unit, configured to receive a trigger frame from a second communication apparatus, where the trigger frame indicates a first resource allocated to the first communication apparatus, the first resource includes N resource subunits, N is an integer greater than or equal to 1, the N resource subunits include at least one RU or MRU, the at least one RU or MRU is located in M second frequency-domain subblocks, and M is an integer greater than or equal to 1; and a sending unit, configured to send a TB PPDU to the second communication apparatus on some of the N resource subunits, where the TB PPDU includes seventh indication information, the seventh indication information separately indicates whether the first communication apparatus has performed transmission on an RU or MRU allocated to the first communication apparatus in each of the M second frequency-domain subblocks, and values of bits included in the seventh indication information include at least one of the following: If the first communication apparatus has performed transmission on an RU or MRU allocated to the first communication apparatus in a second frequency-domain subblock, a bit corresponding to the second frequency-domain subblock in the seventh indication information is duplication of a bit corresponding to the second frequency-domain subblock in a U-SIG Disregard and Validate field in the trigger frame; or if the first communication apparatus does not perform transmission on an RU or MRU allocated to the first communication apparatus in a second frequency-domain subblock, a bit corresponding to the second frequency-domain subblock in the seventh indication information is negation of a bit corresponding to the second frequency-domain subblock in a U-SIG Disregard and Validate field in the trigger frame; or if the first resource is not located in a third frequency-domain subblock, a bit corresponding to the third frequency-domain subblock in the seventh indication information is duplication of a bit corresponding to the third frequency-domain subblock in a universal signal U-SIG Disregard and Validate field in the trigger frame, the third frequency-domain subblock and the M second frequency-domain subblocks are frequency-domain subblocks included in a TB PPDU bandwidth, and the TB PPDU bandwidth is a bandwidth used by the second communication apparatus to schedule the first communication apparatus; or if a preset maximum TB PPDU bandwidth includes a fourth frequency-domain subblock and a TB PPDU bandwidth does not include the fourth frequency-domain subblock, a bit corresponding to the fourth frequency-domain subblock in the seventh indication information is duplication of a bit corresponding to the fourth frequency-domain subblock in a universal signal U-SIG Disregard and Validate field in the trigger frame, the TB PPDU bandwidth is a bandwidth used by the second communication apparatus to schedule the first communication apparatus, and the TB PPDU bandwidth is less than the preset maximum TB PPDU bandwidth.

According to a thirty-second aspect, this application provides a second communication apparatus, including:

a sending unit, configured to send a trigger frame to a first communication apparatus, where the trigger frame indicates a first resource allocated to the first communication apparatus, the first resource includes N resource subunits, N is an integer greater than or equal to 1, the N resource subunits include at least one RU or MRU, the at least one RU or MRU is located in M second frequency-domain subblocks, and M is an integer greater than or equal to 1; and a receiving unit, configured to receive, from the first communication apparatus, a TB PPDU sent on some of the N resource subblocks, where the TB PPDU includes seventh indication information, the seventh indication information separately indicates whether the first communication apparatus has performed transmission on an RU or MRU allocated to the first communication apparatus in each of the M second frequency-domain subblocks, and values of bits included in the seventh indication information include at least one of the following: If the first communication apparatus has performed transmission on an RU or MRU allocated to the first communication apparatus in a second frequency-domain subblock, a bit corresponding to the second frequency-domain subblock in the seventh indication information is duplication of a bit corresponding to the second frequency-domain subblock in a U-SIG Disregard and Validate field in the trigger frame; or if the first communication apparatus does not perform transmission on an RU or MRU allocated to the first communication apparatus in a second frequency-domain subblock, a bit corresponding to the second frequency-domain subblock in the seventh indication information is negation of a bit corresponding to the second frequency-domain subblock in a U-SIG Disregard and Validate field in the trigger frame; or if the first resource is not located in a third frequency-domain subblock, a bit corresponding to the third frequency-domain subblock in the seventh indication information is duplication of a bit corresponding to the third frequency-domain subblock in a universal signal U-SIG Disregard and Validate field in the trigger frame, the third frequency-domain subblock and the M second frequency-domain subblocks are frequency-domain subblocks included in a TB PPDU bandwidth, and the TB PPDU bandwidth is a bandwidth used by the second communication apparatus to schedule the first communication apparatus; or if a preset maximum TB PPDU bandwidth includes a fourth frequency-domain subblock and a TB PPDU bandwidth does not include the fourth frequency-domain subblock, a bit corresponding to the fourth frequency-domain subblock in the seventh indication information is duplication of a bit corresponding to the fourth frequency-domain subblock in a universal signal U-SIG Disregard and Validate field in the trigger frame, the TB PPDU bandwidth is a bandwidth used by the second communication apparatus to schedule the first communication apparatus, and the TB PPDU bandwidth is less than the preset maximum TB PPDU bandwidth.

According to a thirty-third aspect, this application provides a communication apparatus, where the communication apparatus includes a processor and a memory. The memory stores a computer program or computer instructions, and the processor is configured to invoke and run the computer program or computer instructions stored in the memory, so that the processor implements any one of the implementations according to any one of the first aspect to the sixteenth aspect.

Optionally, the communication apparatus further includes a transceiver, and the processor is configured to control the transceiver to receive and send signals.

According to a thirty-fourth aspect, this application provides a communication apparatus, where the communication apparatus includes a processor. The processor is configured to invoke a computer program or computer instructions in a memory, to enable the processor to implement any one of the implementations according to any one of the first aspect to the sixteenth aspect.

Optionally, the communication apparatus further includes a transceiver, and the processor is configured to control the transceiver to receive and send signals.

According to a thirty-fifth aspect, this application provides a computer program product including instructions. When the computer program product runs on a computer, the computer is enabled to implement any one of the implementations according to any one of the first aspect to the sixteenth aspect.

According to a thirty-sixth aspect, this application provides a computer readable storage medium, including computer instructions. When the instructions are run on a computer, the computer is enabled to implement any one of the implementations according to any one of the first aspect to the sixteenth aspect.

According to a thirty-seventh aspect, this application provides a chip apparatus, including a processor configured to invoke a computer program or computer instructions in the memory, to enable the processor to implement any one of the implementations according to any one of the first aspect to the sixteenth aspect.

Optionally, the chip apparatus further includes the memory, and the memory is configured to store a computer program, computer instructions, and the like. The chip apparatus includes a chip, or may include a chip and another discrete component.

Optionally, the processor is coupled to the memory through an interface.

DESCRIPTION OF EMBODIMENTS

Figure 1:
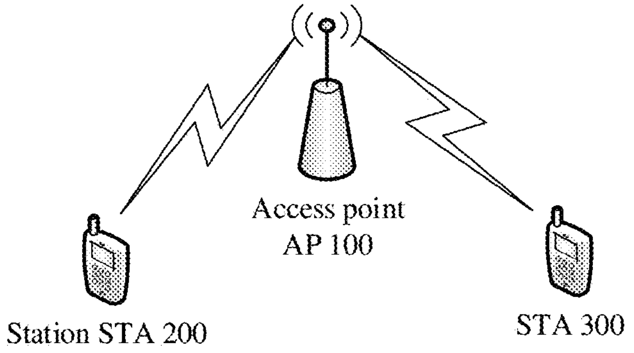
FIG. 1 is a schematic diagram of an architecture of an example wireless communication system according to an embodiment of this application.

Embodiments of this application provide a PPDU transmission method and a related apparatus, so that a first device sends a TB PPDU to a second device on some of N resource subunits based on first indication information, thereby improving spectral utilization.

The following clearly and completely describes the technical solutions in embodiments of this application with reference to the accompanying drawings in embodiments of this application.

In descriptions of this application, unless otherwise specified, "/" means "or". For example, A/B may represent A or B. The term "and/or" in this specification describes only an association relationship between associated objects and represents that three relationships may exist. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

In this application, a term such as "example" or "for example" is used to represent giving an example, an illustration, or a description. Any embodiment or design scheme described as "example", "in an example", or "for example" in this application should not be construed as being more preferable or advantageous than other embodiments or design schemes. Exactly, use of the term "example", "in an example", "for example", or the like is intended to present a related concept in a specific manner.

For ease of understanding the method provided in embodiments of this application, the following describes a system architecture for the method provided in embodiments of this application. It may be understood that, the system architecture described in embodiments of this application is intended to describe the technical solutions in embodiments of this application more clearly, and does not constitute any limitation on the technical solutions provided in embodiments of this application.

The technical solutions provided in this application may be applied to various communication systems, for example, a system using an 802.11 standard. For example, the 802.11 standard includes but is not limited to the 802.11be standard or a next-next-generation 802.11 standard. A scenario to which the technical solutions of this application are applicable includes communication between one or more second devices and one or more first devices, for example, communication between an AP and one or more STAs, or communication between a plurality of APs and a plurality of STAs. In embodiments of this application, the term "communication" may also be described as "data transmission", "information transmission", or "transmission".

A communication system to which the technical solutions provided in this application are applicable includes a first device and a second device. The first device may be an AP or a STA, and the second device is an AP or a STA. The following describes the technical solutions of this application by using an example in which the first device is a STA and the second device is an AP.

Refer to FIG. 1. FIG. 1 is a schematic diagram of an architecture of an example wireless communication system according to an embodiment of this application. As shown in FIG. 1, the wireless communication system may include one or more APs (for example, an AP 100 shown in FIG. 1) and one or more STAs (for example, a STA 200 and a STA 300 shown in FIG. 1). The AP and the STA support a WLAN communication protocol. The communication protocol may include 802.11be (or referred to as Wi-Fi 7, which is an EHT protocol), and may further include protocols such as 802.11ax and 802.11ac. Certainly, with continuous evolution and development of communication technologies, the communication protocol may further include a protocol with future evolution of 802.11be, for example, a next-generation protocol or a next-next-generation protocol. A WLAN is used as an example. An apparatus for implementing the method in this application may be an AP or a STA in the WLAN, or a chip or a processing system installed in an AP or a STA.

Optionally, the access point (for example, the AP 100 in FIG. 1) in this application is an apparatus having a wireless communication function, supports communication by using the WLAN protocol, has a function of communicating with another device (for example, a station or another access point) in the WLAN network, and certainly, may further have a function of communicating with another device. In the WLAN system, the access point may be referred to as an access point station (AP STA). The apparatus having the wireless communication function may be an entire device, or may be a chip or a processing system installed in an entire device, or the like. A device on which the chip or the processing system is installed may implement, under control of the chip or the processing system, the method and functions in embodiments of this application. The AP in embodiments of this application is an apparatus that serves the STA, and may support the 802.11 series of protocols. For example, the AP may be a communication entity such as a communication server, a router, a switch, or a bridge. The AP may include a macro base station, a micro base station, a relay station, and the like in various forms. Certainly, the AP may alternatively be a chip and a processing system in these devices in various forms, to implement the method and functions in embodiments of this application.

Optionally, the station (for example, the STA 200 or the STA 300 in FIG. 1) in this application is an apparatus having a wireless communication function, supports communication by using the WLAN protocol, and has a capability of communicating with another station or an access point in the WLAN network. In the WLAN system, the station may be referred to as a non-access point station (non-AP STA). For example, the STA is any user communication device that allows a user to communicate with the AP and to further communicate with the WLAN. The apparatus having the wireless communication function may be an entire device, or may be a chip or a processing system installed in an entire device, or the like. A device on which the chip or the processing system is installed may implement, under control of the chip or the processing system, the method and functions in embodiments of this application. For example, the STA may be user equipment that can be connected to the Internet, for example, a tablet computer, a desktop computer, a laptop computer, a notebook computer, an ultra-mobile personal computer (UMPC), a handheld computer, a netbook, a personal digital assistant (PDA), or a mobile phone. Alternatively, the STA may be an internet of things node in an internet of things, an in-vehicle communication apparatus in an internet of vehicles, an entertainment device, a game device or system, a global positioning system device, or the like. Alternatively, the STA may be a chip and a processing system in the foregoing terminals.

The WLAN system can provide high-speed and low-latency transmission. With continuous evolution of WLAN application scenarios, the WLAN system is to be applied to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops, and warehousing. Certainly, a device (for example, an access point or a station) that supports WLAN communication may be a sensor node (for example, a smart water meter, a smart electricity meter, or a smart air detection node) in a smart city, a smart device (for example, a smart camera, a projector, a display screen, a television, a stereo, a refrigerator, or a washing machine) in smart home, a node in the internet of things, an entertainment terminal (for example, a wearable device such as augmented reality (AR) or virtual reality (VR)), a smart device (for example, a printer, a projector, a speaker, or a stereo) in a smart office, an internet of vehicles device in the internet of vehicles, infrastructure (for example, a vending machine, a self-service navigation console in a supermarket, a self-service cashier, or a self-ordering kiosk) in a daily life scenario, a device in a large sports or music venue, or the like. Specific forms of the STA and the AP are not limited in embodiments of this application, and are merely examples for description herein.

Figure 2A:
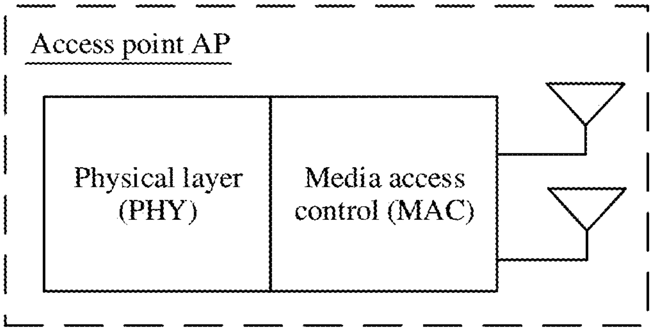
FIG. 2*a* is a schematic diagram of a structure of an example access point according to an embodiment of this application.
Figure 2B:
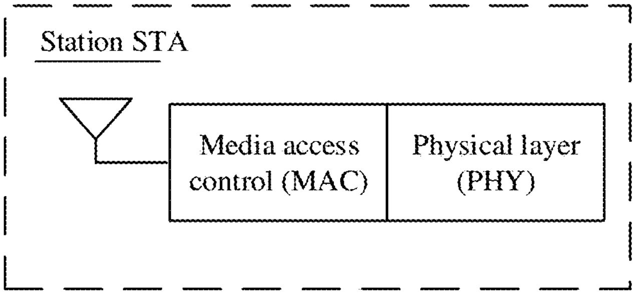
FIG. 2*b* is a schematic diagram of a structure of an example station according to an embodiment of this application.

It needs to be understood that, the 802.11 standard focuses on a physical (PHY) layer part and a media access control (MAC) layer part. For example, refer to FIG. 2*a*. FIG. 2*a* is a schematic diagram of a structure of an example access point according to an embodiment of this application. The AP may be multi-antenna/multi-radio-frequency, or single-antenna/single-radio-frequency. The antenna/radio frequency is used to send/receive data packets (where the data packet in this specification may also be referred to as a physical layer protocol data unit, namely, a PPDU). In an implementation, an antenna part or a radio frequency part of the AP may be separated from a main body part of the AP, and is in a remote layout structure. In FIG. 2*a*, the AP may include a physical layer processing circuit and a media access control processing circuit. The physical layer processing circuit may be configured to process physical layer signals, and the MAC layer processing circuit may be configured to process MAC layer signals. For another example, refer to FIG. 2*b*. FIG. 2*b* is a schematic diagram of a structure of an example station according to an embodiment of this application. FIG. 2*b* shows a schematic diagram of a structure of a single-antenna/single-radio-frequency STA. In an actual scenario, the STA may alternatively be a multi-antenna/multi-radio-frequency STA, and may be a device having more than two antennas. The antenna/radio frequency is used to send/receive data packets. In an implementation, an antenna part or a radio frequency part of the STA may be separated from a main body part of the STA, and is in a remote layout structure. In FIG. 2*b*, the STA may include a PHY processing circuit and a MAC processing circuit. The physical layer processing circuit may be configured to process physical layer signals, and the MAC layer processing circuit may be configured to process MAC layer signals.

The foregoing content briefly describes the system architecture in embodiments of this application. To better understand the technical solutions in embodiments of this application, the following describes content related to embodiments of this application.

Figure 3:
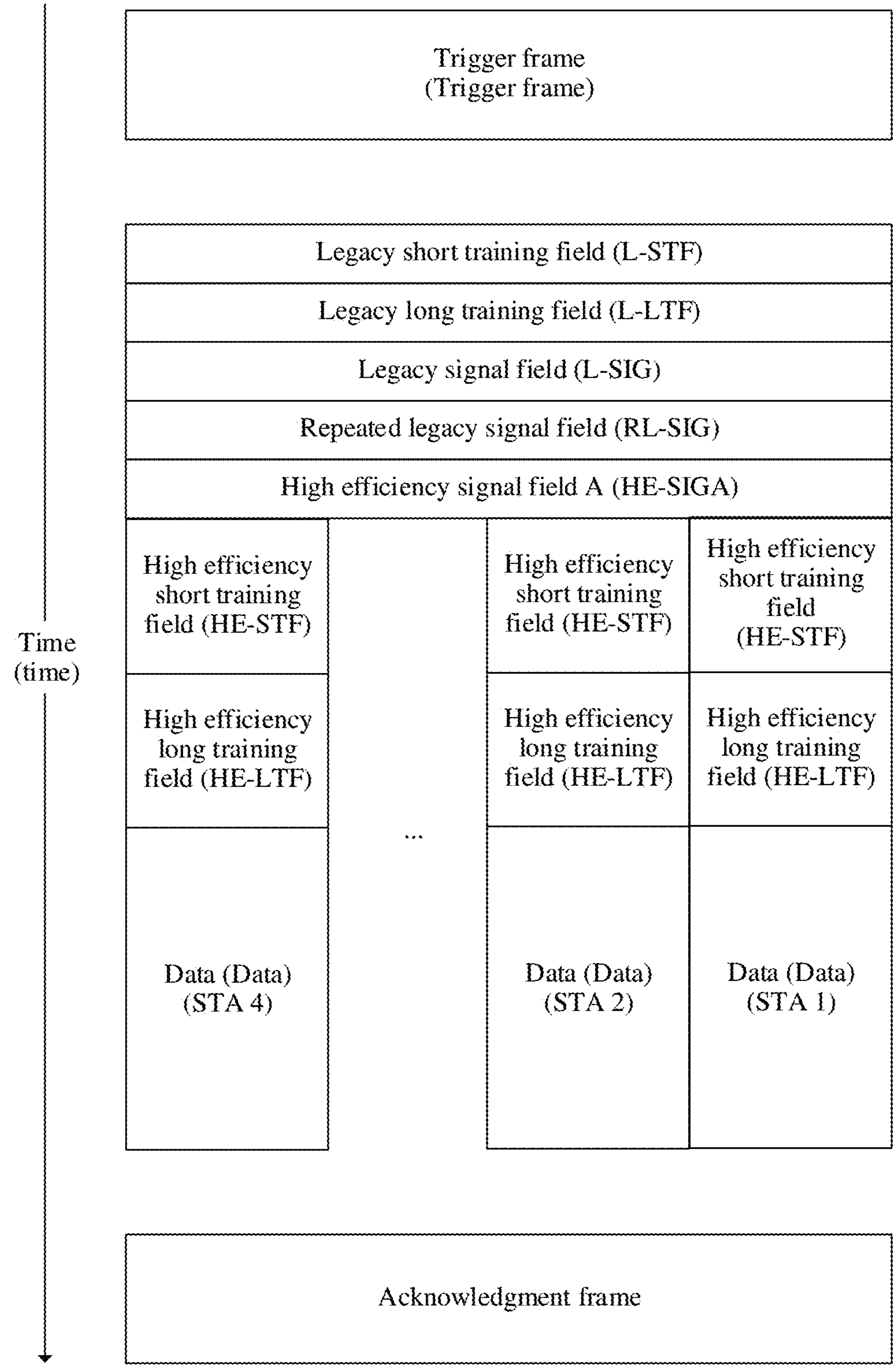
FIG. 3 is a schematic flowchart of an example trigger-frame-based uplink scheduling transmission method in the 802.11ax standard.

1. Trigger-Frame-Based Uplink Scheduling Transmission Method in the 802.11ax Standard In a WLAN, a STA usually needs to obtain a transmission opportunity (TXOP) through channel contention before performing uplink data transmission. For example, the STA performs channel contention in an enhanced distributed channel access (EDCA) manner to obtain the transmission opportunity. The 802.11ax introduces a trigger-frame-based uplink scheduling transmission method. Specifically, refer to FIG. 3. FIG. 3 is a schematic flowchart of a trigger-frame-based scheduling transmission method in the 802.11ax standard. As shown in FIG. 3, the trigger-frame-based uplink scheduling transmission method in the 802.11ax standard includes the following steps:

Step 1: An AP sends a trigger frame, where the trigger frame is used to schedule one or more STAs each to send an HE TB PPDU. The trigger frame includes resource scheduling and other parameters that are used by the one or more STAs each to send an uplink sub-PPDU. For a specific frame format of the trigger frame, refer to corresponding descriptions in the 802.11ax standard. The trigger frame includes a common information field and a user information list field. The common information field includes common information that all STAs need to read, the user information list field includes one or more user information fields, and each user information field includes information that each STA needs to separately read. In the user information field, an association identifier (association identification 12, AID12) represents an association identifier of a specific STA, and a resource unit allocation (RU allocation) subfield indicates a location of a resource unit (RU) allocated to the STA (the STA indicated by the AID 12).

Step 2: After receiving the trigger frame, a STA parses the trigger frame to obtain a user information field that matches an AID of the STA, and then sends an HE TB PPDU on an RU indicated by a resource unit allocation subfield included in the user information field. For names and meanings of fields included in the HE TB PPDU, refer to corresponding descriptions in the 802.11ax standard. It needs to be understood that, in the HE TB PPDU, a legacy short training field (L-STF) to a high-efficiency signal field A (HE-SIG-A) are all transmitted in a unit of 20 MHz. When a bandwidth is greater than 20 MHz, the L-STF to the HE-SIG-A are all transmitted in a unit of 20 MHz in a duplicated manner. In the HE TB PPDU, from a high-efficiency short training field (HE-STF) to a data field, an entire bandwidth may be divided into one or more resource units, where the one or more resource units are used to perform transmission of the HE-STF to the data field of the HE TB PPDU.

Step 3: After receiving an uplink multi-user PPDU sent by the one or more STAs, the AP returns an acknowledgment frame. The uplink multi-user PPDU includes the HE TB PPDU sent by the one or more STAs.

2. Some Multiple-Resource Unit (Multiple RU, MRU)/RU Formats Supported in the 802.11be Standard An RU is defined in the 802.11ax standard. An entire TB PPDU bandwidth may be divided into one or more RUs. For the RUs, different quantities of subcarriers (also referred to as tones) may form RUs of different sizes, for example, a 26-tone RU, a 52-tone RU, a 106-tone RU, a 242-tone RU, a 484-tone RU, a 996-tone RU, and a 2×996-tone RU. It needs to be understood that an x-tone RU is an RU including x subcarriers. For example, the 242-tone RU may be understood as an RU including 242 subcarriers, the 484-tone RU may be understood as an RU including 484 subcarriers, and the 996-tone RU may be understood as an RU including 996 subcarriers.

The 802.11be standard inherits the 26-tone RU, the 52-tone RU, the 106-tone RU, the 242-tone RU, the 484-tone RU, the 996-tone RU, and the 2×996-tone RU as defined in the 802.11ax standard. In addition, a 4×996-tone RU is newly introduced for a bandwidth of 320 MHz.

In addition, based on the foregoing RUs, an MRU is further defined in the 802.11be standard. One MRU includes a plurality of the foregoing RUs. MRUs include: a 52+26-tone MRU, a 106+26-tone MRU, a 484+242-tone MRU, a 996+484-tone MRU, a 2×996+484-tone MRU, a 3×996-tone MRU, and a 3×996+484-tone MRU.

A bandwidth corresponding to the 242-tone RU is about 20 MHz, a bandwidth corresponding to the 484-tone RU is about 40 MHz, a bandwidth corresponding to the 484+242-tone MRU is about 60 MHz, and a bandwidth corresponding to the 996-tone RU is about 80 MHz. An 80 MHz bandwidth may include a 242-tone RU, a 484-tone RU, a 484+242-tone MRU, or a 996-tone RU.

In the 802.11ax standard, only one RU can be allocated to one STA. However, a next-generation 802.11be standard allows one RU or one MRU to be allocated to one STA. It needs to be understood that, allocating one MRU to one STA may also be understood as combining a plurality of RUs and allocating them to one STA, unless otherwise specified in the following description.

This application mainly considers RUs or MRUs, each of which includes more than or equal to 242 subcarriers in the MRU/RU formats as supported by the 802.11be standard.

The following describes some types of MRUs/RUs supported by the 802.11be standard. It needs to be understood that the 802.11be standard supports more than the MRU/RU formats listed in this specification. For details, refer to related descriptions in the 802.11be standard. Examples are merely provided herein for description.

Figure 4:
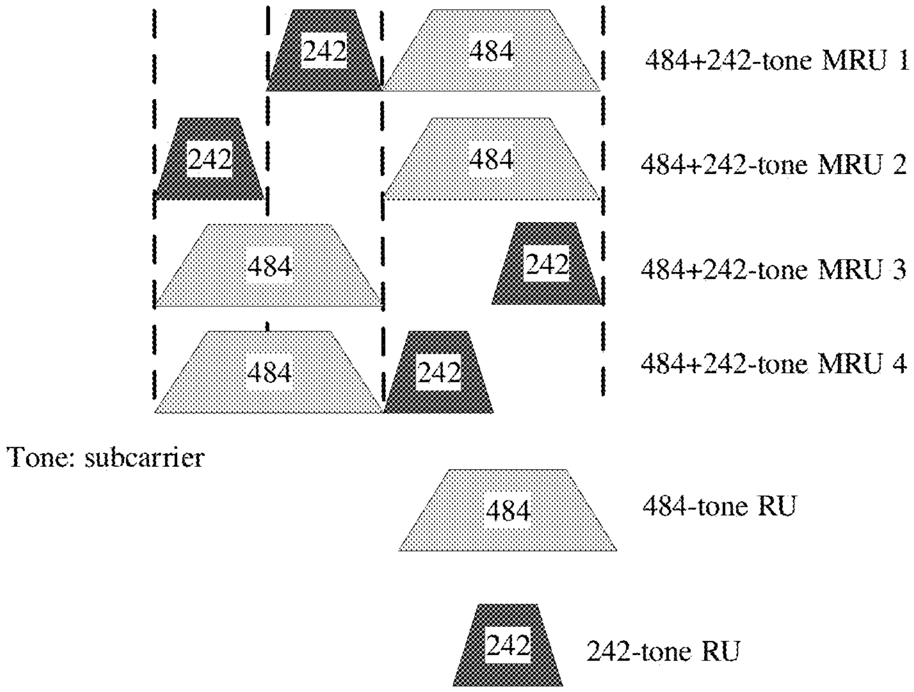
FIG. 4 is a schematic diagram of example manners of a 484+242-tone MRU in the 802.11be standard according to an embodiment of this application.

Refer to FIG. 4. FIG. 4 is a schematic diagram of example manners of a 484+242-tone MRU in the 802.11be standard. The 484+242-tone MRU represents a combination/merging of one 484-tone RU and one 242-tone RU. Therefore, FIG. 4 shows four combination/merging manners of one 484-tone RU and one 242-tone RU as supported by the 802.11be standard. For a TB PPDU bandwidth of 160 MHz or 320 MHz, each 80 MHz bandwidth supports the four possible MRU combinations shown in FIG. 4.

Figure 5:
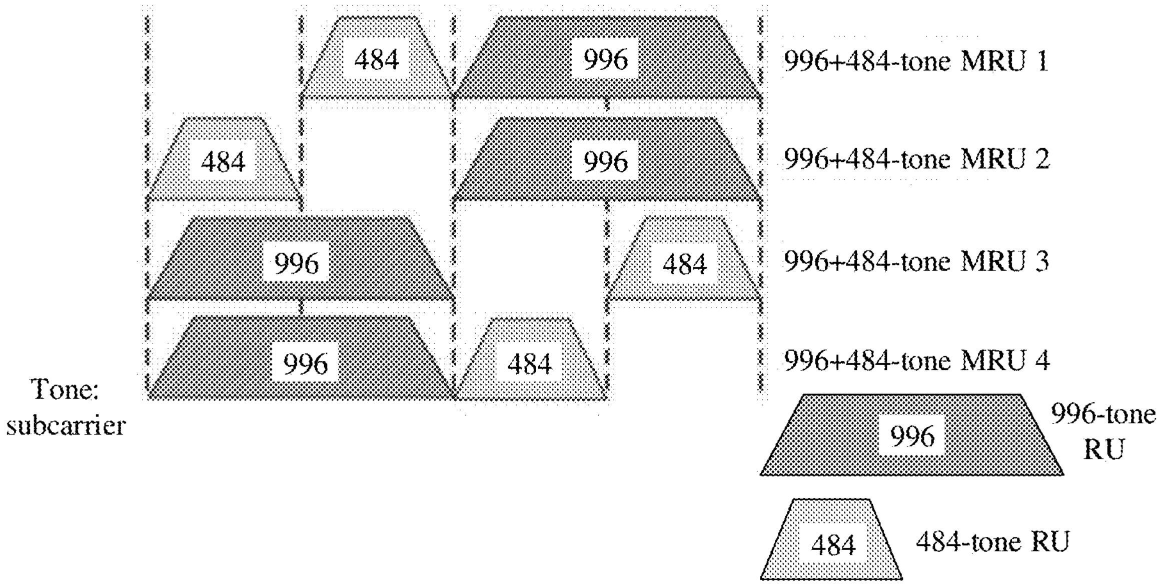
FIG. 5 is a schematic diagram of example manners of a 996+484-tone MRU in the 802.11be standard.

Refer to FIG. 5. FIG. 5 is a schematic diagram of example manners of a 996+484-tone MRU in the 802.11be standard. The 996+484-tone MRU represents a combination/merging of one 996-tone RU and one 484-tone RU. Therefore, FIG. 5 shows four combination/merging manners of one 996-tone RU and one 484-tone RU as supported by the 802.11be standard. For a TB PPDU bandwidth of 320 MHz, each 160 MHz bandwidth supports the four possible combinations shown in FIG. 5.

Figure 6:
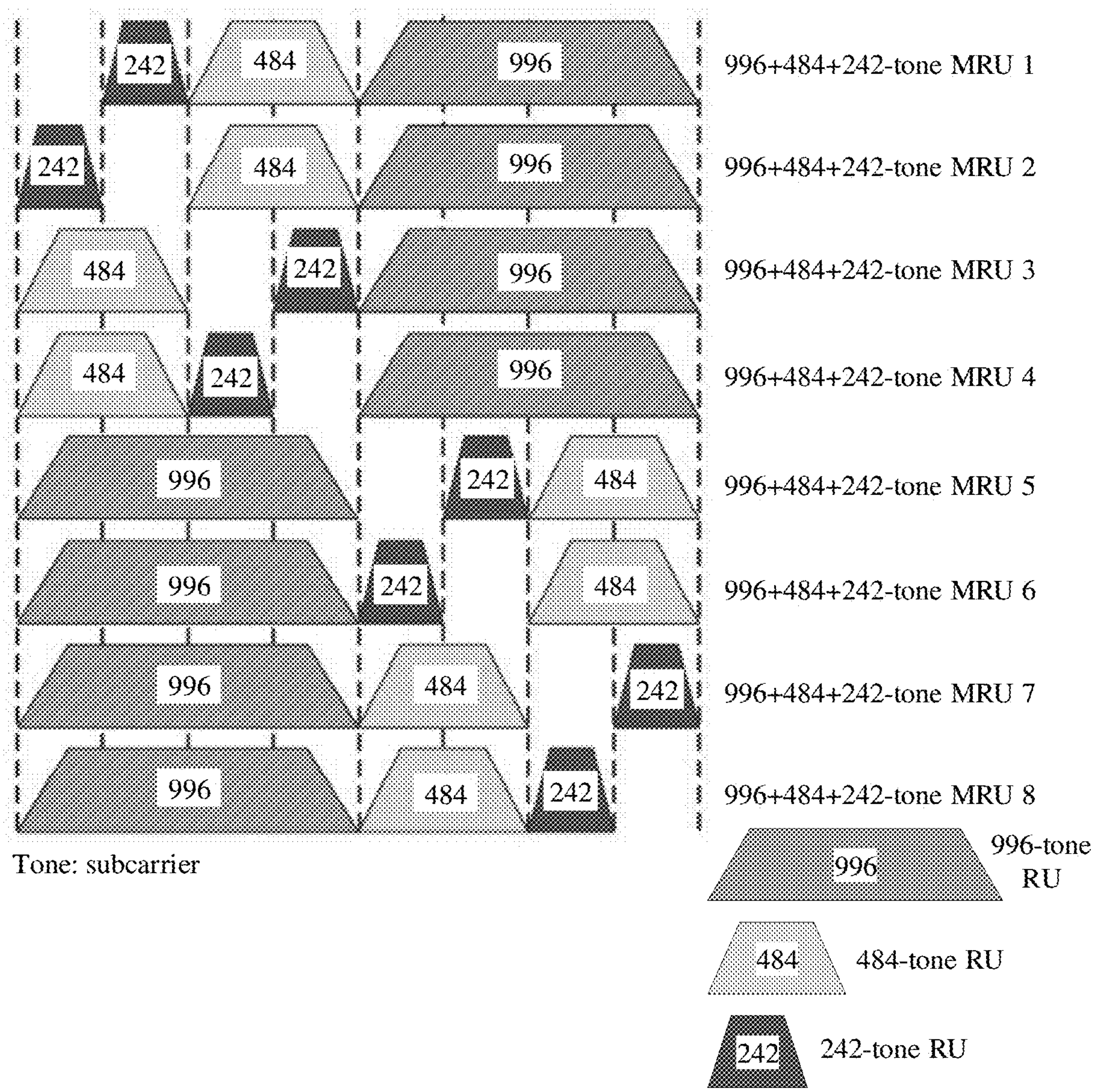
FIG. 6 is a schematic diagram of example manners of a 996+484+242-tone MRU in the 802.11be standard.

Refer to FIG. 6. FIG. 6 is a schematic diagram of example manners of a 996+484+242-tone MRU in the 802.11be standard. The 996+484+242-tone MRU represents a combination/merging of one 996-tone RU, one 484-tone RU, and one 242-tone RU. FIG. 6 shows eight combination/merging manners of one 996-tone RU, one 484-tone RU, and one 242-tone RU as supported by the 802.11be standard. For a case of non-orthogonal frequency division multiple access (none orthogonal frequency division multiple access, non-OFDMA) transmission in a TB PPDU bandwidth of 160 MHz, the 160 MHz bandwidth supports the plurality of possible combinations shown in FIG. 6.

Figure 7:
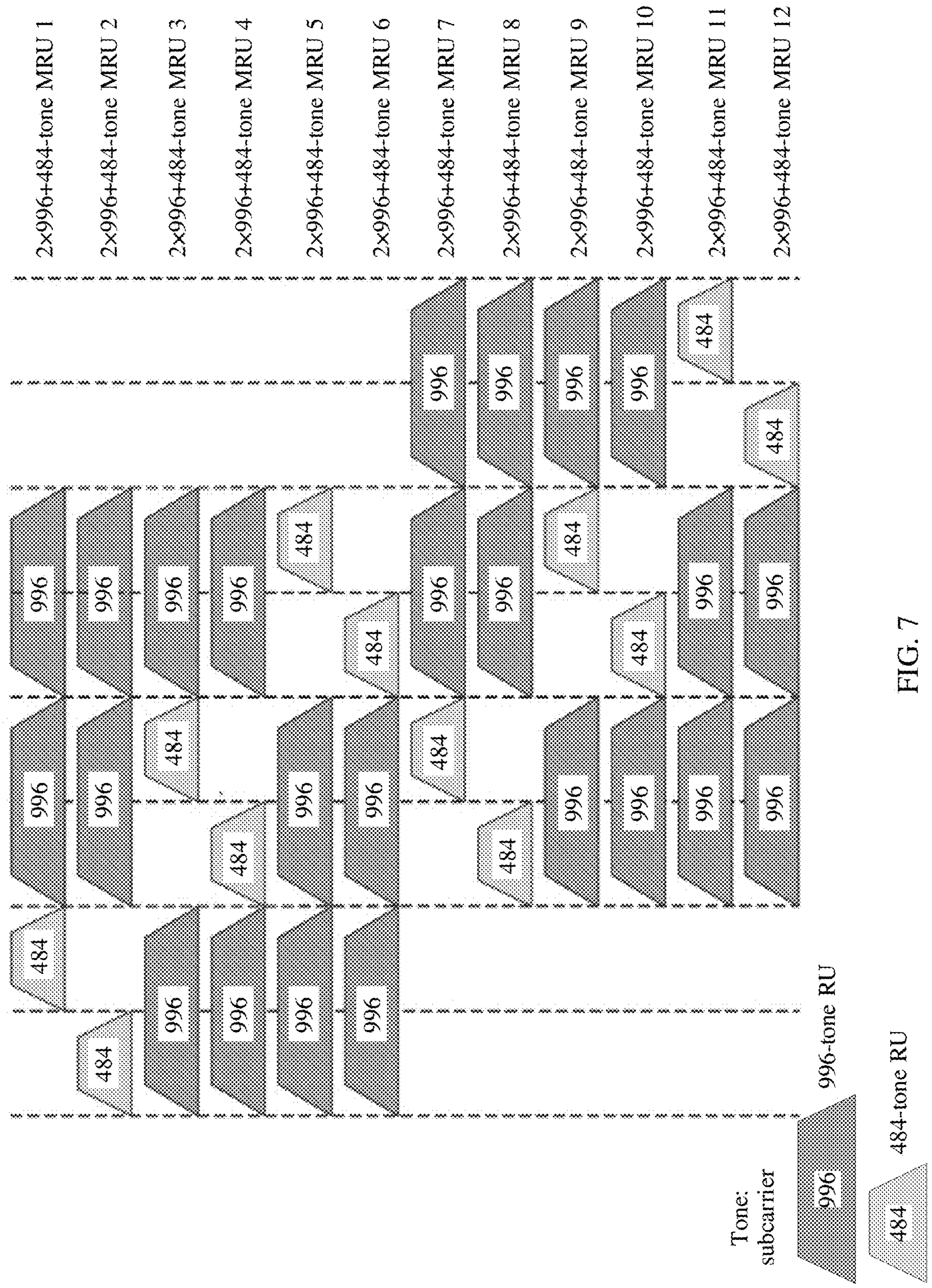
FIG. 7 is a schematic diagram of example manners of a 2×996+484-tone MRU in the 802.11be standard.

Refer to FIG. 7. FIG. 7 is a schematic diagram of example manners of a 2×996+484-tone MRU in the 802.11be standard. The 2×996+484-tone MRU represents a combination/merging of two 996-tone RUs and one 484-tone RU. Therefore, FIG. 7 shows twelve combination/merging manners of two 996-tone RUs and one 484-tone RU as supported by the 802.11be standard.

Figure 8:
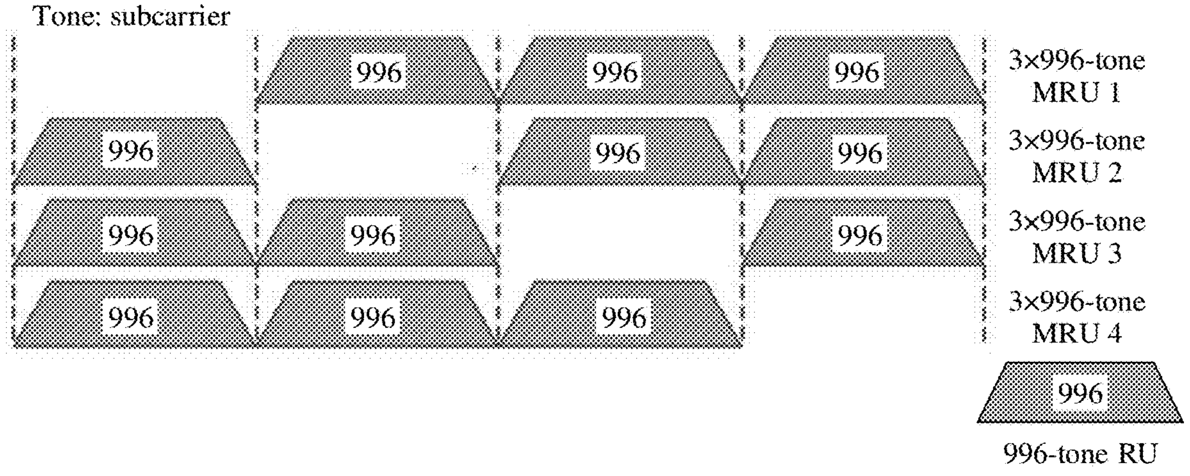
FIG. 8 is a schematic diagram of example manners of a 3×996-tone MRU in the 802.11be standard.

Refer to FIG. 8. FIG. 8 is a schematic diagram of example manners of a 3×996-tone MRU in the 802.11be standard. The 3×996-tone MRU represents a combination/merging of three 996-tone RUs. Therefore, FIG. 8 shows four combination/merging manners of three 996-tone RUs as supported by the 802.11be standard.

Figure 9:
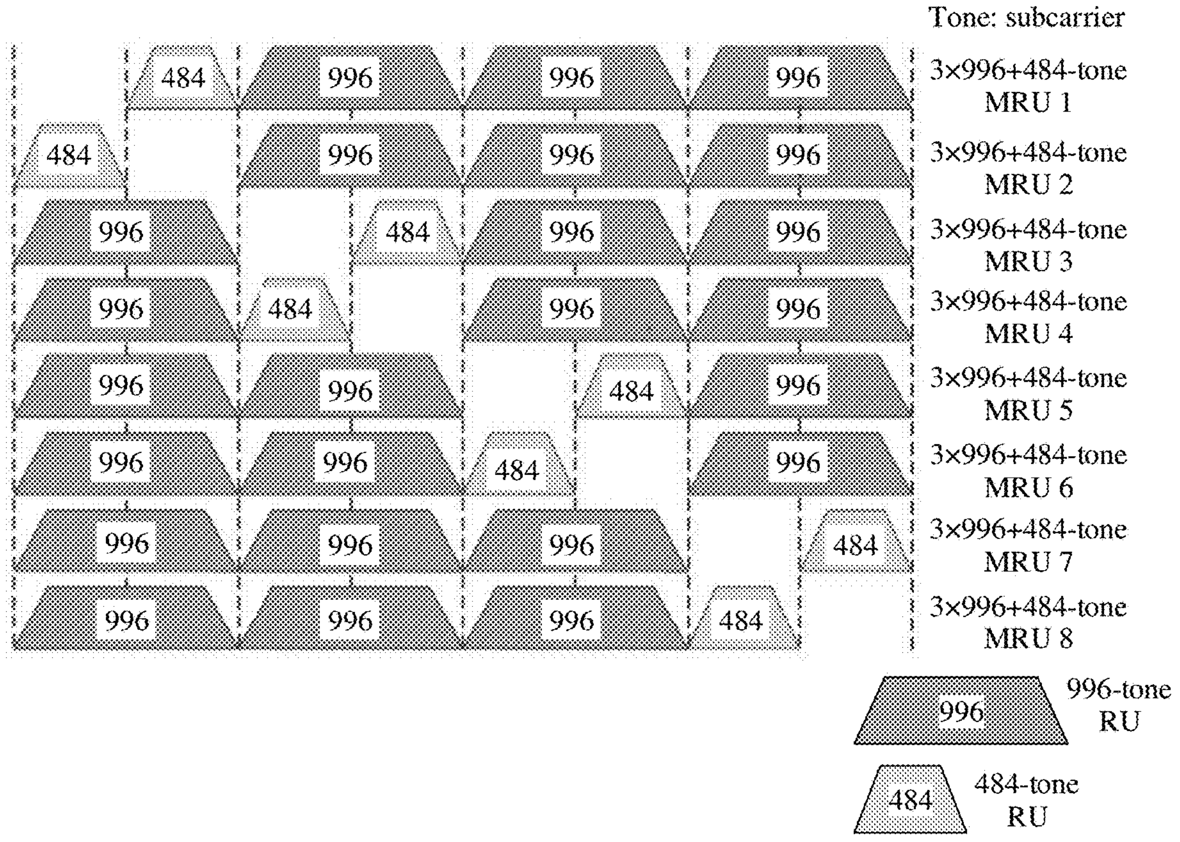
FIG. 9 is a schematic diagram of example manners of a 3×996+484-tone MRU in the 802.11be standard.

Refer to FIG. 9. FIG. 9 is a schematic diagram of example manners of a 3×996+484-tone MRU in the 802.11be standard. The 3×996+484-tone MRU represents a combination/merging of three 996-tone RUs and one 484-tone RU. Therefore, FIG. 9 shows twelve combination/merging manners of three 996-tone RUs and one 484-tone RU as supported by the 802.11be standard.

Figure 10:
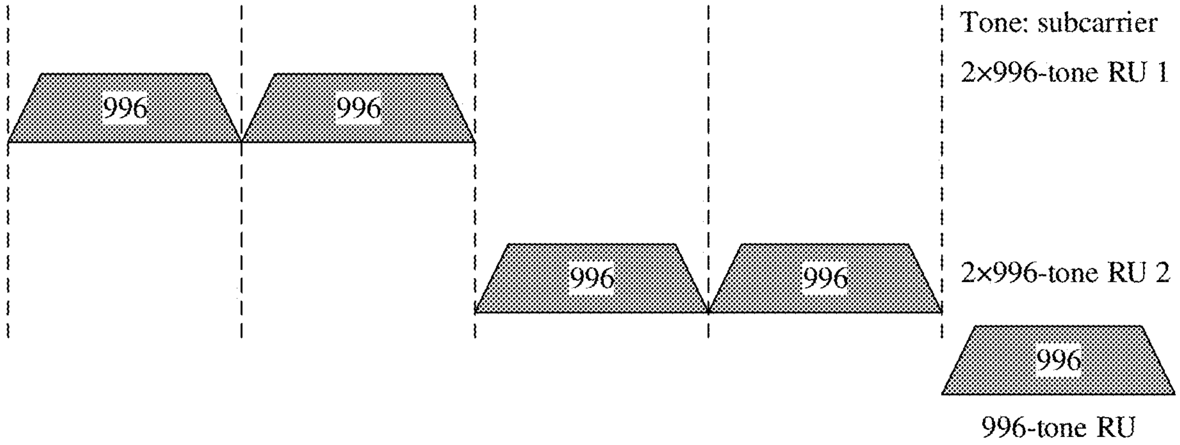
FIG. 10 is a schematic diagram of example manners of a 2×996-tone RU in the 802.11be standard.
Figure 11:
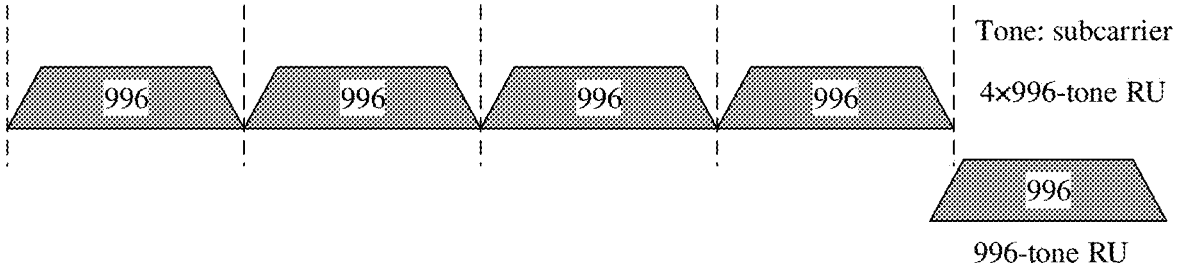
FIG. 11 is a schematic diagram of example manners of a 4×996-tone RU in the 802.11be standard.

In addition, a combination/merging of four 996-tone RUs is known as an RU, namely, a 4×996-tone RU; and a combination/merging of two 996-tone RUs is also known as an RU, namely, a 2×996-tone RU. Refer to FIG. 10. FIG. 10 shows two combination/merging manners of two 996-tone RUs as supported by the 802.11be standard. The 2×996-tone RU represents a combination/merging of two 996-tone RUs. Refer to FIG. 11. FIG. 11 shows a combination/merging manner of four 996-tone RUs as supported by the 802.11be standard. The 4×996-tone RU represents a combination/merging of four 996-tone RUs.

3. Constraints for Forming an MRU in the 802.11be Standard

The 802.11be standard allows one MRU to be allocated to one STA. Therefore, constraints for allocating one MRU to one STA are also specified in the 802.11be standard. (1) Small RUs can only be merged/combined with small RUs to form small MRUs (small size RUs can only be combined with small size RUs to form small size MRUs), and large RUs can only be merged/combined with large RUs to form large MRUs (large size RUs can only be combined with large size RUs to form large size MRUs). In other words, large RUs cannot be merged/combined with small RUs. An RU that includes more than or equal to 242 subcarriers is referred to as a large RU (RUs that are the same size or larger than 242-tone RUs are defined as large size RUs), and an RU that includes fewer than 242 subcarriers is referred to as a small RU (RUs that are smaller than 242-tone RUs are defined as small size RUs). Optionally, the 1st constraint may be further understood as follows: A first type of RUs can be merged/combined with only the first type of RUs to form an MRU, and a second type of RUs can be merged/combined with only the second type of RUs to form an MRU. In other words, different types of RUs cannot be merged/combined with each other. The first type and the second type herein may be distinguished based on sizes of the RUs. For example, the first type is an RU whose size is larger than or equal to 242 subcarriers, and the second type is an RU whose size is smaller than 242 subcarriers.

(2) For merging/combination between small RUs, the 802.11be standard currently supports two merging/combination manners. In a manner 1, 106-tone RUs are merged/combined with 26-tone RUs. In a manner 2, 52-tone RUs are merged/combined with 26-tone RUs. For specific merging/combination manners, refer to related descriptions in a document of the 802.11be standard.

(3) For merging/combination between large RUs, the 802.11be standard currently supports a combination of 484-tone RUs and 242-tone RUs in a bandwidth of 80 MHz. For manners of combination/merging in a bandwidth of 160 MHz, in a bandwidth of 240 MHz, and in a bandwidth of 320 MHz, this application considers a case in which an RU or MRU includes more than or equal to 242 subcarriers in the MRU/RU formats as supported by the 802.11be standard. Possible combination/merging manners are shown in FIG. 4 to FIG. 11.

4. Procedure of TB PPDU Transmission with Carrier Sensing (CS)

Optionally, the trigger frame includes a CS required field, to indicate that a station needs to perform carrier sensing. Therefore, when performing HE TB PPDU transmission, the STA performs carrier sensing on one or more 20 MHz subchannels on which an RU allocated to the STA is located, to detect whether sensed energy exceeds a predetermined threshold. If detecting that the sensed energy exceeds the predetermined threshold, the STA determines that a specific 20 MHz subchannel is busy; or if detecting that the sensed energy does not exceed the predetermined threshold, the STA determines that a specific 20 MHz subchannel is idle. According to the 802.11ax standard, if at least one 20 MHz subchannel is busy in a frequency range in which the RU allocated to the STA is located, no HE TB PPDU can be transmitted, to prevent interference to other transmission. For example, a resource unit allocated to a STA 1 is a 484-tone RU, and a bandwidth corresponding to the 484-tone RU is 40 MHz and includes two 20 MHz subchannels: a subchannel 1 and a subchannel 2. The STA 1 performs carrier sensing before transmission. If finding that the subchannel 1 is in a busy state and the subchannel 2 is in an idle state, the STA 1 cannot perform transmission on the allocated 484-tone RU. For a STA 2, a resource unit allocated to the STA 2 is a 242-tone RU, and a bandwidth corresponding to the 242-tone RU is 20 MHz and includes one 20 MHz subchannel. The STA 2 performs carrier sensing before transmission. If finding that the 20 MHz subchannel is in the idle state, the STA 2 may perform transmission of an HE TB PPDU on the allocated 242-tone RU.

The 802.11be standard further considers a scenario in which an MRU may be allocated to a STA. Therefore, when performing EHT TB PPDU transmission, the STA also performs carrier sensing on one or more 20 MHz subchannels on which the MRU allocated to the STA is located. According to a result of carrier sensing, optionally, a transmission manner is as follows: Similar to stipulation in the 802.11ax standard, if at least one 20 MHz subchannel is busy in the plurality of 20 MHz subchannels on which the MRU is located, transmission of an EHT TB PPDU cannot be performed on the MRU. It can be learned that transmission can be performed on the MRU only when all the allocated 20 MHz subchannels are idle. This manner causes a waste of spectral resources.

Therefore, embodiments of this application provide a PPDU transmission method. Specifically, a second device indicates, by using a trigger frame, whether a first device is allowed to perform trigger-based physical layer protocol data unit (TB PPDU) transmission on each of N resource subunits when the first device performs TB PPDU transmission by using some of the N resource subunits. In other words, the second device indicates whether each of the N resource subunits can support the first device in performing TB PPDU transmission on the resource subunit, or the second device indicates which resource subunits in the N resource subunits can support the first device in performing TB PPDU transmission on these resource subunits; or the second device indicates which resource subunits in the N resource subunits do not support the first device in performing TB PPDU transmission on these resource subunits, so that the first device may learn of some resource subunits that support TB PPDU transmission, to perform TB PPDU transmission, where N is an integer greater than or equal to 1. The first device sends a TB PPDU to the second device on some of the N resource subunits based on first indication information. In other words, the second device indicates that the first device is allowed to perform TB PPDU transmission on a resource subunit; and when the resource subunit is idle, the first device may perform transmission of the TB PPDU on the resource subunit. In this way, the first device performs transmission on the some of the N resource subunits, thereby improving spectral utilization. For example, a resource subunit in the N resource subunits is an RU smaller than 996 tones or an MRU smaller than 996 tones, and the first indication information indicates that the first device is allowed to perform TB PPDU transmission on the resource subunit; and when the resource subunit is idle, the first device may perform transmission on the resource subunit. In this way, the first device performs transmission on the some of the N resource subunits, thereby improving spectral utilization. For example, there is no MU-MIMO transmission on the N resource subunits, and the first indication information separately indicates that the first device is allowed to perform TB PPDU transmission on each of the N resource subunits when the first device performs TB PPDU transmission by using some of the N resource subunits. In this case, when any resource subunit in the N resource subunits is idle, the first device may perform TB PPDU transmission on the any resource subunit. In this way, the first device performs transmission on the some of the N resource subunits, thereby improving spectral utilization. The PPDU transmission method may be applied to a wireless communication system, for example, a wireless local area network system. The PPDU transmission method may be implemented by a communication device, or a chip or a processor in a communication device in the wireless communication system. The communication device may be an access point device or a station device.

The technical solutions of this application are described below with reference to specific embodiments.

Figure 12:
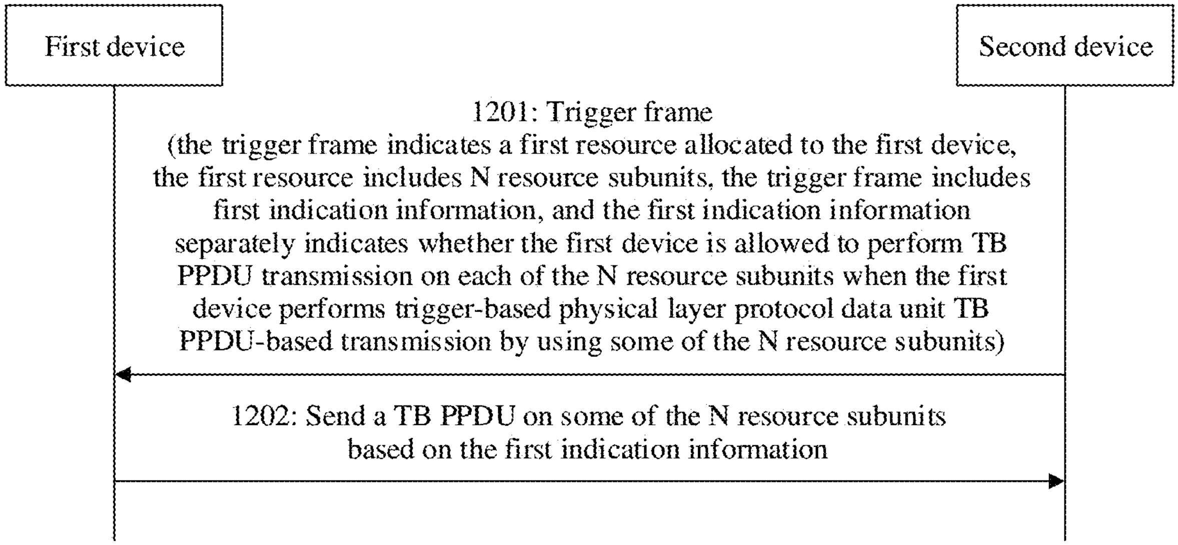
FIG. 12 is a schematic flowchart of an example PPDU transmission method according to an embodiment of this application.

FIG. 12 is a schematic diagram of an embodiment of an example PPDU transmission method according to an embodiment of this application. As shown in FIG. 12, the PPDU transmission method includes the following steps.

1201: A second device sends a trigger frame to a first device, where the trigger frame indicates a first resource allocated to the first device, the first resource includes N resource subunits, the trigger frame includes first indication information, and the first indication information separately indicates whether the first device is allowed to perform TB PPDU transmission on each of the N resource subunits when the first device performs TB PPDU transmission by using some of the N resource subunits. In other words, the first indication information indicates whether each of the N resource subunits can support the first device in performing TB PPDU transmission on the resource subunit; or the first indication information indicates which resource subunits in the N resource subunits can support the first device in performing TB PPDU transmission on these resource subunits; or the first indication information indicates which resource subunits in the N resource subunits do not support the first device in performing TB PPDU transmission on these resource subunits, so that the first device may learn of some resource subunits that support TB PPDU transmission, to perform TB PPDU transmission. Correspondingly, the first device receives the trigger frame from the second device.

N is an integer greater than or equal to 1. The first resource includes at least one RU or MRU. For example, the first resource includes a 484+242-tone MRU, a 996+484-tone MRU, a 996+484+242-tone MRU, a 2×996-tone RU, a 2×996+484-tone MRU, a 3×996-tone RU, a 3×996+484-tone MRU, or a 4×996-tone RU.

Optionally, the first resource includes at least one RU or MRU smaller than 996 tones. For example, the first resource includes a 484+242-tone MRU or a 996+484-tone MRU.

The following describes some possible implementations of a division granularity of the resource subunit.

Implementation 1: In the N resource subunits, one resource subunit is located in one first frequency-domain subblock, and one first frequency-domain subblock includes at least one second frequency-domain subblock.

In the implementation 1, the resource subunits are divided at a granularity of a first frequency-domain subblock.

For example, a bandwidth of the first frequency-domain subblock is 80 MHz, and a bandwidth of the second frequency-domain subblock is also 80 MHz, that is, the first frequency-domain subblock includes one second frequency-domain subblock; or a bandwidth of the first frequency-domain subblock is 160 MHz, and a bandwidth of the second frequency-domain subblock is 80 MHz, that is, one first frequency-domain subblock includes two second frequency-domain subblocks.

Specifically, the first indication information separately indicates whether TB PPDU transmission is allowed on some resource units included in each of N first frequency-domain subblocks, where N is an integer greater than 1 or equal to 1. The N first frequency-domain subblocks are first frequency-domain subblocks included in a TB PPDU bandwidth, and the TB PPDU bandwidth is a bandwidth used by the second device to schedule the first device. The first resource belongs to some or all of M first frequency-domain subblocks.

For example, the TB PPDU bandwidth is 320 MHz, the TB PPDU bandwidth includes four first frequency-domain subblocks, and a bandwidth of each first frequency-domain subblock is 80 MHz. The four first frequency-domain subblocks are respectively a $1^{st}$ 80 MHz first bandwidth, a $2^{nd}$ 80 MHz bandwidth, a $3^{rd}$ 80 MHz bandwidth, and a $4^{th}$ 80 MHz bandwidth. The first resource includes a 3×996+484-tone MRU, and a $1^{st}$ 996-tone RU in the 3×996+484-tone MRU is located in the $1^{st}$ 80 MHz bandwidth. A $2^{nd}$ 996-tone RU in the 3×996+484-tone MRU is located in the $2^{nd}$ 80 MHz bandwidth. A $3^{rd}$ 996-tone RU in the 3×996+484-tone MRU is located in the $3^{rd}$ 80 MHz bandwidth. A 484-tone RU in the 3×996+484-tone MRU is located in the $4^{th}$ 80 MHz bandwidth. The first indication information separately indicates whether the first device is allowed to perform TB PPDU transmission on some resource units of each of the four first frequency-domain subblocks when the first device performs transmission by using some of the N resource subunits. For the first device, it may be understood that the first indication information separately indicates whether the first device is allowed to perform TB PPDU transmission in the $1^{st}$ 996-tone RU located in the $1^{st}$ 80 MHz bandwidth, perform TB PPDU transmission in the $2^{nd}$ 996-tone RU located in the $2^{nd}$ 80 MHz bandwidth, perform TB PPDU transmission in the $3^{rd}$ 996-tone RU located in the $3^{rd}$ 80 MHz bandwidth, and perform TB PPDU transmission in the 484-tone RU located in the $4^{th}$ 80 MHz bandwidth when the first device performs transmission by using some of the N resource subunits.

For example, the TB PPDU bandwidth is 320 MHz, the TB PPDU bandwidth includes two first frequency-domain subblocks, and a bandwidth of each first frequency-domain subblock is 160 MHz. The two first frequency-domain subblocks are respectively a 1st 160 MHz bandwidth and a $2^{nd}$ 160 MHz bandwidth. The first resource includes a 2×996+484-tone MRU. A 2×996-tone RU in the 996+484-tone MRU is located in the $1^{st}$ 160 MHz bandwidth, and a 484-tone RU in the 2×996+484-tone MRU is located in the $2^{nd}$ 160 MHz bandwidth. The first indication information separately indicates whether the first device is allowed to perform TB PPDU transmission on some resource units of each of the two first frequency-domain subblocks when the first device performs transmission by using some of the N resource subunits. For the first device, it may be understood that the first indication information separately indicates whether the first device is allowed to perform TB PPDU transmission on the 2×996-tone RU located in the $1^{st}$ 160 MHz bandwidth and perform TB PPDU transmission on the 484-tone RU located in the $2^{nd}$ 160 MHz bandwidth when the first device performs transmission by using some of the N resource subunits.

For example, the TB PPDU bandwidth is 160 MHz, the TB PPDU bandwidth includes two first frequency-domain subblocks, and a bandwidth of each first frequency-domain subblock is 80 MHz. The two first frequency-domain subblocks are respectively a $1^{st}$ 80 MHz bandwidth and a $2^{nd}$ 80 MHz bandwidth. The first resource includes a 996+484-tone MRU. A 996-tone RU in the 996+484-tone MRU is located in the $1^{st}$ 80 MHz bandwidth. A 484-tone RU in the 996+484-tone MRU is located in the $2^{nd}$ 80 MHz bandwidth. The first indication information separately indicates whether TB PPDU transmission is allowed on each of the two first frequency-domain subblocks. For the first device, it may be understood that the first indication information separately indicates whether the first device is allowed to perform TB PPDU transmission on the 996-tone RU located in the $1^{st}$ 80 MHz bandwidth, and perform TB PPDU transmission on the 484-tone RU located in the $2^{nd}$ 80 MHz bandwidth.

Optionally, the first indication information may indicate, in ascending order or descending order of frequencies of the N first frequency-domain subblocks, whether TB PPDU transmission is allowed on some resource units of each of the N first frequency-domain subblocks.

For example, the TB PPDU bandwidth includes four first frequency-domain subblocks, which are separately four 80 MHz bandwidths. The four first frequency-domain subblocks are a first frequency-domain subblock 1, a first frequency-domain subblock 2, a first frequency-domain subblock 3, and a first frequency-domain subblock 4. A frequency of the first frequency-domain subblock 1 is less than a frequency of the first frequency-domain subblock 2, the frequency of the first frequency-domain subblock 2 is less than a frequency of the first frequency-domain subblock 3, and the frequency of the first frequency-domain subblock 3 is less than a frequency of the first frequency-domain subblock 4. Therefore, the first indication information indicates, in ascending order of frequencies of the four first frequency-domain subblocks, whether TB PPDU transmission is allowed on some resource units of each of the four first frequency-domain subblocks, or in other words, sequentially indicates whether each of the four first frequency-domain subblocks supports TB PPDU transmission. Herein, whether each first frequency-domain subblock supports TB PPDU transmission means whether a resource unit in the first frequency-domain subblock supports TB PPDU transmission.

It needs to be noted that the foregoing is merely an example of an indication sequence of the first indication information. In actual application, the first indication information may alternatively indicate, in a predetermined sequence, whether TB PPDU transmission is allowed on some resource units of each of the N first frequency-domain subblocks. This is not specifically limited in this application.

Implementation 2: Each of the N resource subunits includes one RU.

In the implementation 2, the N resource subunits are divided at a granularity of an RU. For example, the first resource includes a 996+484-tone MRU. The N resource subunits include two resource subunits. A $1^{st}$ resource subunit is a 996-tone RU in the 996+484-tone MRU, and a $2^{nd}$ resource subunit is a 484-tone RU in the 996+484-tone MRU. The TB PPDU is 320 MHz, including four 80 MHz bandwidths, and the TB PPDU bandwidth is a bandwidth used by the second device to schedule the first device. The $1^{st}$ resource subunit (namely, the 996-tone RU) is located in a $1^{st}$ 80 MHz bandwidth, and the $2^{nd}$ resource subunit (namely, the 484-tone RU) is located in a $2^{nd}$ 80 MHz bandwidth. In other words, the N resource subunits include N RUs, and the first indication information separately indicates whether the first device is allowed to perform TB PPDU transmission on each of the N RUs when the first device performs transmission by using some of the N RUs.

The following describes the technical solutions of this application by using the implementation 1 as an example. To be specific, the resource subunits are divided at a granularity of a first frequency-domain subblock, where each resource subunit is located in one first frequency-domain subblock. One resource subunit includes one or more RUs. For example, a resource subunit is a 996-tone RU; or a resource subunit is a 996+484-tone MRU.

In some implementations, each of the N resource subunits is located in one first frequency-domain subblock, that is, the N resource subunits are located in N first frequency-domain subblocks. Each first frequency-domain subblock includes at least one second frequency-domain subblock. From the perspective of the second frequency-domain subblocks, the N resource subunits are located in M second frequency-domain subblocks.

Both N and M are integers greater than or equal to 1.

Optionally, when the first frequency-domain subblock includes one second frequency-domain subblock, that is, a bandwidth of the first frequency-domain subblock is the same as a bandwidth of the second frequency-domain subblock, both N and M are integers greater than 1, and N=M. For example, the bandwidth of the first frequency-domain subblock is 80 MHz, and the bandwidth of the second frequency-domain subblock is also 80 MHz.

Optionally, when the first frequency-domain subblock includes a plurality of second frequency-domain subblocks, that is, a bandwidth of the first frequency-domain subblock is greater than a bandwidth of the second frequency-domain subblock, N is an integer greater than or equal to 1, M is an integer greater than 1, and N is less than M. For example, the bandwidth of the first frequency-domain subblock is 160 MHz, and the bandwidth of the second frequency-domain subblock is 80 MHz.

When N=1, the first indication information indicates whether the first device is allowed to use some resource units of the resource subunit for transmission when the first device uses some resource units of the resource subunit.

For example, the first resource includes a resource subunit, and the resource subunit is located in a 160 MHz bandwidth (a first frequency-domain subblock). The 160 MHz bandwidth includes a $1^{st}$ 80 MHz bandwidth (a $1^{st}$ second frequency-domain subblock included in the first frequency-domain subblock) and a $2^{nd}$ 80 MHz bandwidth (a $2^{nd}$ second frequency-domain subblock included in the first frequency-domain subblock). The resource subunit includes a 996+484-tone MRU. A 996-tone RU in the 996+484-tone MRU is located in the $1^{st}$ 80 MHz bandwidth, and a 484-tone RU in the 996+484-tone MRU is located in the $2^{nd}$ 80 MHz bandwidth. The second device indicates that the first device is allowed to use some resource units of the resource subunit for transmission when the first device uses some resource units of the resource subunit. When the 996-tone RU in the 996+484-tone MRU and the 484-tone RU in the 996+484-tone MRU are idle, the first device may perform transmission in the 996+484-tone MRU. When the 996-tone RU in the 996+484-tone MRU is busy and the 484-tone RU in the 996+484-tone MRU is idle, the first device may perform transmission on the 484-tone RU but not on the 996-tone RU. When the 996-tone RU in the 996+484-tone MRU is idle and the 484-tone RU in the 996+484-tone MRU is busy, the first device may perform transmission on the 996-tone RU but not on the 484-tone RU.

For example, the N resource subunits include a 996+484-tone MRU, the 996+484-tone MRU is located in a first frequency-domain subblock, and a bandwidth of the first frequency-domain subblock is 160 MHz. The 996+484-tone MRU is located in two second frequency-domain subblocks, and a bandwidth of each second frequency-domain subblock is 80 MHz. A 996-tone RU in the 996+484-tone MRU is located in a $1^{st}$ second frequency-domain subblock in the two second frequency-domain subblocks, and a 484-tone RU in the 996+484-tone MRU is located in a $2^{nd}$ second frequency-domain subblock in the two second frequency-domain subblocks. In other words, when N is equal to 1, M needs to be an integer greater than 1.

Optionally, in the N resource subunits, a resource subunit is located in a first frequency-domain subblock, and the first frequency-domain subblock includes at least two second frequency-domain subblocks. A $1^{st}$ part of resource units included in the resource subunit is located in a $1^{st}$ second frequency-domain subblock in the at least two second frequency-domain subblocks, and a $2^{nd}$ part of resource units included in the resource subunit is located in a $2^{nd}$ second frequency-domain subblock in the at least two second frequency-domain subblocks.

In an implementation, the first indication information indicates whether the first device is allowed to perform TB PPDU transmission on the resource subunit when the first device performs transmission by using some of the N resource subunits. The first device may perform transmission on some resource units of the resource subunit based on the first indication information. In other words, the first indication information indicates whether TB PPDU transmission is allowed on some resource units of each second frequency-domain subblock in the first frequency-domain subblock. For the first device, the first indication information indicates whether the first device is allowed to perform TB PPDU transmission on the $1^{st}$ part of resource units in the $1^{st}$ second frequency-domain subblock, and whether the first device is allowed to perform TB PPDU transmission on the $2^{nd}$ part of resource units in the $2^{nd}$ second frequency-domain subblock. For example, the first indication information indicates that the first device is allowed to perform TB PPDU transmission on the resource subunit when the first device performs transmission by using some of the N resource subunits. The first device may perform transmission on the $1^{st}$ part of resource units or the $2^{nd}$ part of resource units of the resource subunit. For example, the $1^{st}$ part of resource units is idle, and the $2^{nd}$ part of resource units is busy; and then the first device performs transmission on the $1^{st}$ part of resource units of the resource subunit but not on the $2^{nd}$ part of resource units.

For example, the TB PPDU bandwidth is 320 MHz, the TB PPDU bandwidth includes two first frequency-domain subblocks, and a bandwidth of each first frequency-domain subblock is 160 MHz. The two first frequency-domain subblocks are respectively a $1^{st}$ 160 MHz bandwidth and a $2^{nd}$ 160 MHz bandwidth. Each first frequency-domain subblock includes two second frequency-domain subblocks, and a bandwidth of the second frequency-domain subblock is 80 MHz. The first resource includes a 2×996-tone RU, and the 2×996-tone RU is located in the $1^{st}$160 MHz bandwidth. The first indication information separately indicates whether transmission is allowed on some resource units of the $1^{st}$ 160 MHz bandwidth. However, from the perspective of the second frequency-domain subblocks, the first indication information indicates whether TB PPDU transmission is allowed on some resource units of each second frequency-domain subblock in the first frequency-domain subblock (the $1^{st}$ 160 MHz bandwidth). For the first device, it may be understood that the first indication information indicates whether the first device is allowed to perform TB PPDU transmission on a $1^{st}$ 996-tone RU located in a $1^{st}$ 80 MHz bandwidth, or perform TB PPDU transmission on a $2^{nd}$ 996-tone RU located in a $2^{nd}$ 80 MHz bandwidth. When the first indication information indicates that the first device is allowed to perform transmission on some resource units of the first frequency-domain subblock (the $1^{st}$ 160 MHz bandwidth), it represents that the second device allows the first device to perform TB PPDU transmission on the $1^{st}$ 996-tone RU located in the 1st 80 MHz bandwidth and perform TB PPDU transmission on the 2nd 996-tone RU located in the 2nd 80 MHz bandwidth. When the 1st 996-tone RU is idle and the 2nd 996-tone RU is busy, the first device may perform transmission on the 1st 996-tone RU but not on the 2nd 996-tone RU. In other words, the first device may perform transmission on some resource units of a resource subunit.

Optionally, the first indication information may indicate, in ascending order or descending order of frequencies of the N resource subunits, whether the first device is allowed to perform TB PPDU transmission on each of the N resource subunits when the first device performs TB PPDU transmission by using some of the N resource subunits. It needs to be noted that the foregoing is merely an example of an indication sequence of the first indication information. In actual application, the first indication information may alternatively indicate, in a predetermined order, whether the first device is allowed to perform TB PPDU transmission on each of the N resource subunits when the first device performs TB PPDU transmission by using some of the N resource subunits.

Optionally, in the N resource subunits, a resource subunit is located in a first frequency-domain subblock, and one first frequency-domain subblock includes at least one second frequency-domain subblock.

For the resource subunit, the first indication information indicates whether the first device is allowed to perform TB PPDU transmission on the resource subunit when the first device performs transmission by using some of the N resource subunits.

If a first condition is met, the first indication information indicates that the first device is not allowed to perform TB PPDU transmission on the resource subunit when the first device performs transmission by using the some of the N resource subunits.

The first condition includes at least one of the following:

1. more than one device is scheduled in at least one second frequency-domain subblock in the first frequency-domain subblock to perform TB PPDU transmission.

For this condition, there may be specifically the following four possible scenarios.

Scenario A: There is MU-MIMO transmission on at least one second frequency-domain subblock in the first frequency-domain subblock.

Specifically, the second device has scheduled, in the at least one second frequency-domain subblock, more than one device to perform transmission (by using an RU or MRU smaller than 996 tones, or by using an RU or MRU larger than or equal to 996 tones).

For example, a bandwidth of a second frequency-domain subblock in the first frequency-domain subblock is 80 MHz, and corresponds to a 996-tone RU. The 996-tone RU is allocated to a STA 1 and a STA 2, that is, the STA 1 and the STA 2 share the 996-tone RU. In this case, the second device indicates that transmission is not allowed on some resource units included in the first frequency-domain subblock, that is, the second device indicates that the first device is not allowed to perform TB PPDU transmission on the resource subunit when the first device performs transmission on some of the N resource subunits.

For example, a bandwidth of a second frequency-domain subblock in the first frequency-domain subblock is 80 MHz, and corresponds to two 484-tone RUs. The 1st 484-tone RU is allocated to a STA 1 (namely, the first device) and a STA 2, that is, the STA 1 and the STA 2 share the 1st 484-tone RU. In this case, the second device indicates that transmission is not allowed on some resource units included in the first frequency-domain subblock, that is, the second device indicates that the first device is not allowed to perform TB PPDU transmission on the resource subunit when the first device performs transmission on some of the N resource subunits.

Scenario B: At least two devices are scheduled in at least one second frequency-domain subblock in the first frequency-domain subblock, and RUs or MRUs allocated to the at least two devices correspond to different frequency ranges. The RUs or MRUs allocated to the at least two devices are RUs smaller than 996 tones or MRUs smaller than 996 tones.

For example, a bandwidth of a second frequency-domain subblock in the first frequency-domain subblock is 80 MHz, and corresponds to two 484-tone RUs. The 1st 484-tone RU is allocated to a STA 1 (namely, the first device), and a 2nd 484-tone RU is allocated to a STA 2. When devices scheduled within one 80 MHz bandwidth perform TB PPDU transmission, values of U-SIGs of the devices need to be kept the same. If a device scheduled within one 80 MHz bandwidth is allowed to perform transmission on one of the two 484-tone RUs, it cannot be ensured that a value of a U-SIG is the same as a value of a U-SIG sent by the other device. Therefore, the STA 1 cannot perform transmission in the 1st 484-tone RU, and the STA 2 cannot perform transmission in the 2nd 484-tone RU. In this way, it is ensured that values of U-SIGs sent by different STAs are the same, so that the AP performs merging and reception for different 20 MHz subchannels within the 80 MHz bandwidth, thereby improving reliability. Therefore, the second device indicates that transmission is not allowed on some resource units included in the first frequency-domain subblock, that is, the second device indicates that the first device is not allowed to perform TB PPDU transmission on the resource subunit when the first device performs transmission on some of the N resource subunits. To be specific, if an RU or MRU, other than an RU or MRU allocated to the first device, in a second frequency-domain subblock is allocated to another STA, the first device cannot perform transmission on the RU or the MRU allocated to the first device in the second frequency-domain subblock.

Scenario C: At least three devices are scheduled in at least one second frequency-domain subblock in the first frequency-domain subblock, RUs or MRUs allocated to at least two devices in the at least three devices correspond to different frequency ranges, and RUs or MRUs allocated to at least two devices in the at least three devices correspond to a same frequency range (that is, there is MU-MIMO transmission on the at least one second frequency-domain subblock).

For example, a bandwidth of a second frequency-domain subblock in the first frequency-domain subblock is 80 MHz, and corresponds to two 484-tone RUs. The 1st 484-tone RU is allocated to a STA 1 (namely, the first device) and a STA 2, that is, there is MU-MIMO transmission on the 1st 484-tone RU. A 2nd 484-tone RU is allocated to a STA 3, and a frequency range corresponding to the 1st 484-tone RU allocated to the STA 1 and the STA 2 in the second frequency-domain subblock is different from a frequency range corresponding to the 2nd 484-tone RU allocated to the STA 3 in the second frequency-domain subblock. The second device indicates that transmission is not allowed on some resource units included in the first frequency-domain subblock, that is, the second device indicates that the first device is not allowed to perform TB PPDU transmission on the resource subunit when the first device performs transmission on some of the N resource subunits. To be specific, if an RU or MRU, other than an RU or MRU allocated to the first device, in a second frequency-domain subblock is allocated to another STA, the first device cannot perform transmission on the RU or the MRU allocated to the first device in the second frequency-domain subblock. If RUs or MRUs corresponding to a same frequency range in a second frequency-domain subblock are allocated to at least two devices (including the first device) at the same time, the first device cannot perform transmission on the RU or MRU allocated to the first device in the second frequency-domain subblock. This prevents information sent by different devices from being mixed, which would otherwise cause errors during decoding on the AP side.

Scenario D: The first frequency-domain subblock includes at least two second frequency-domain subblocks, there is MU-MIMO transmission on one of the at least two second frequency-domain subblocks, at least two devices are scheduled in another one of the at least two second frequency-domain subblocks, and RUs or MRUs allocated to the at least two devices correspond to different frequency ranges. The RUs or MRUs allocated to the at least two devices are RUs smaller than 996 tones or MRUs smaller than 996 tones.

For example, a bandwidth of the first frequency-domain subblock is 160 MHz, and a bandwidth of each of the two second frequency-domain subblocks is 80 MHz. A 1$^{st}$ second frequency-domain subblock corresponds to a 996-tone RU, and the 996-tone RU is allocated to a STA 1 (namely, the first device) and a STA 2, that is, there is MU-MIMO transmission on the 996-tone RU. A 2$^{nd}$ second frequency-domain subblock corresponds to two 484-tone RUs. A 1$^{st}$ 484-tone RU is allocated to a STA 3, and a 2$^{nd}$ 484-tone RU is allocated to a STA 4. A frequency range corresponding to the 1$^{st}$ 484-tone RU allocated to the STA 3 and the STA 4 in the 2$^{nd}$ second frequency-domain subblock is different from a frequency range corresponding to the 2$^{nd}$ 484-tone RU allocated to the STA 3 in the 2$^{nd}$ second frequency-domain subblock. The second device indicates that transmission is not allowed on some resource units included in the first frequency-domain subblock, that is, the second device indicates that the first device is not allowed to perform TB PPDU transmission on the resource subunit when the first device performs transmission on some of the N resource subunits. To be specific, if an RU or MRU, other than an RU or MRU allocated to the first device, in a second frequency-domain subblock is allocated to another STA, the first device cannot perform transmission on the RU or the MRU allocated to the first device in the second frequency-domain subblock. If RUs or MRUs corresponding to a same frequency range in a second frequency-domain subblock are allocated to at least two devices (including the first device) at the same time, the first device cannot perform transmission on the RU or MRU allocated to the first device in the second frequency-domain subblock. This prevents information sent by different devices from being mixed, which would otherwise cause errors during decoding on the AP side.

It needs to be noted that, optionally, for one of the N resource subunits, if the foregoing first condition is not met, the first indication information may indicate that the first device is allowed to perform TB PPDU transmission on the resource subunit when the first device performs transmission by using some of the N resource subunits. A process of indication by the second device for another resource subunit is similar. Details are not enumerated in this application.

The following describes a specific indication manner in which the first indication information indicates whether the first device is allowed to perform TB PPDU transmission on one of the N resource subunits. An indication manner of another one of the N resource subunits is similar.

Optionally, one bit in the first indication information indicates whether the first device is allowed to perform TB PPDU transmission on the resource subunit when the first device performs transmission by using some of the N resource subunits. For example, when the bit is "1", it represents that the first device is allowed to perform TB PPDU transmission on the resource subunit when the first device performs transmission by using the some of the N resource subunits; or when the bit is "0", it represents that the first device is not allowed to perform TB PPDU transmission on the resource subunit when the first device performs transmission by using the some of the N resource subunits. Alternatively, when the bit is "0", it represents that the first device is allowed to perform TB PPDU transmission on the resource subunit when the first device performs transmission by using the some of the N resource subunits; or when the bit is "1", it represents that the first device is not allowed to perform TB PPDU transmission on the resource subunit when the first device performs transmission by using the some of the N resource subunits.

In other words, the first indication information may be represented by using a bitmap, and bits in the bitmap respectively indicate whether the first device is allowed to perform TB PPDU transmission on each of the N resource subunits when the first device performs TB PPDU transmission by using the some of the N resource subunits.

It can be learned, from the implementation 1 of the resource subunits that, the first indication information separately indicates whether TB PPDU transmission is allowed on some resource units included in each of N first frequency-domain subblocks, where N is an integer greater than or equal to 1. The N first frequency-domain subblocks are first frequency-domain subblocks included in a TB PPDU bandwidth, and the TB PPDU bandwidth is a bandwidth used by the second device to schedule the first device. Generally, a preset maximum TB PPDU bandwidth is 320 MHz, and the preset maximum TB PPDU bandwidth is a maximum bandwidth that can be used by an AP to schedule a STA as specified in a communication standard. When the TB PPDU bandwidth is equal to the preset maximum TB PPDU bandwidth, a bandwidth of the first frequency-domain subblock is 80 MHz, and the TB PPDU bandwidth includes four first frequency-domain subblocks. Therefore, the first indication information may include four bits, to separately indicate whether TB PPDU transmission is allowed on some resource units included in each of the four first frequency-domain subblocks.

Figure 13A:
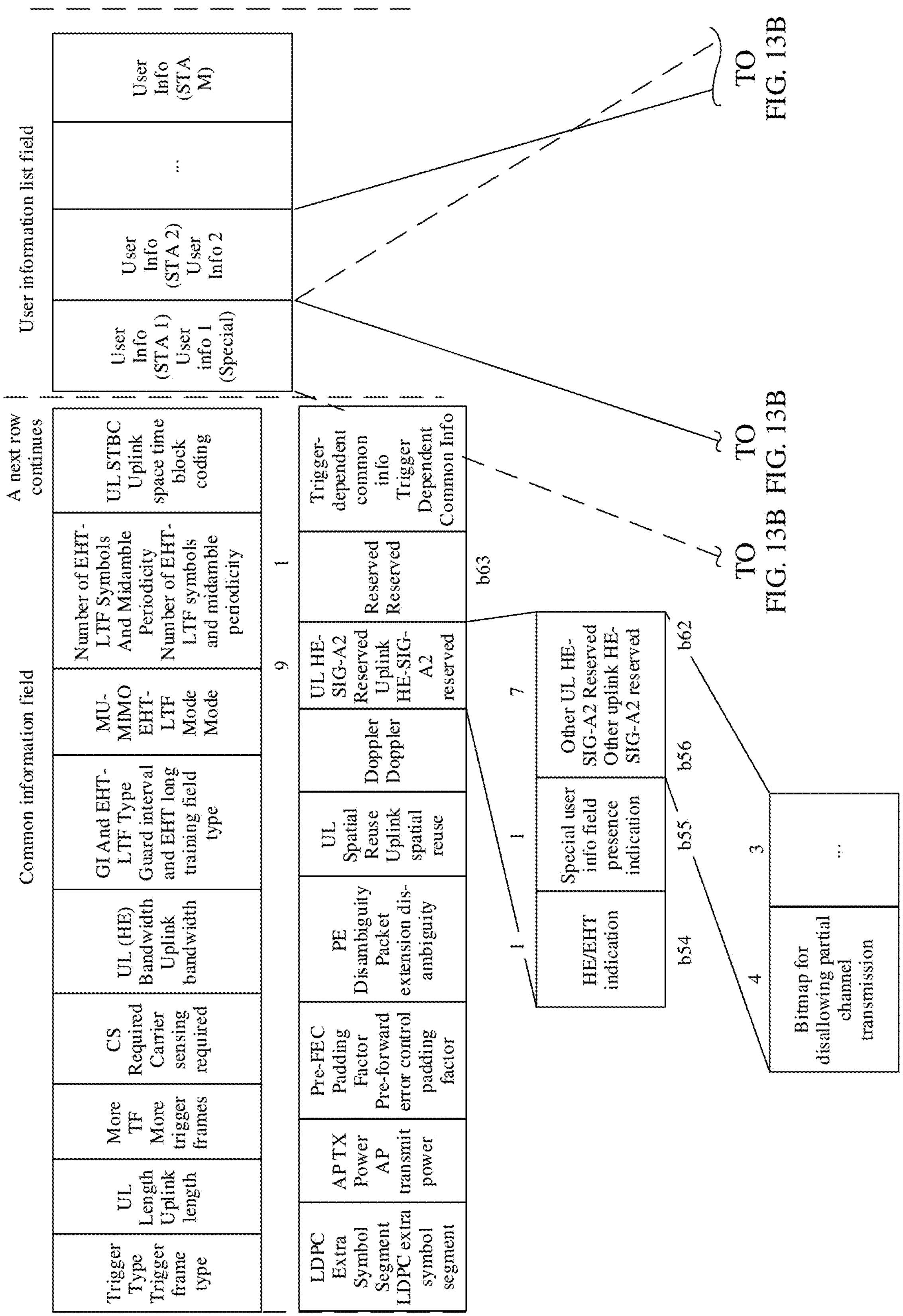
FIG. 13A and FIG. 13B are schematic diagrams of an example frame format of an 802.11be trigger frame according to an embodiment of this application.
Figure 13B:
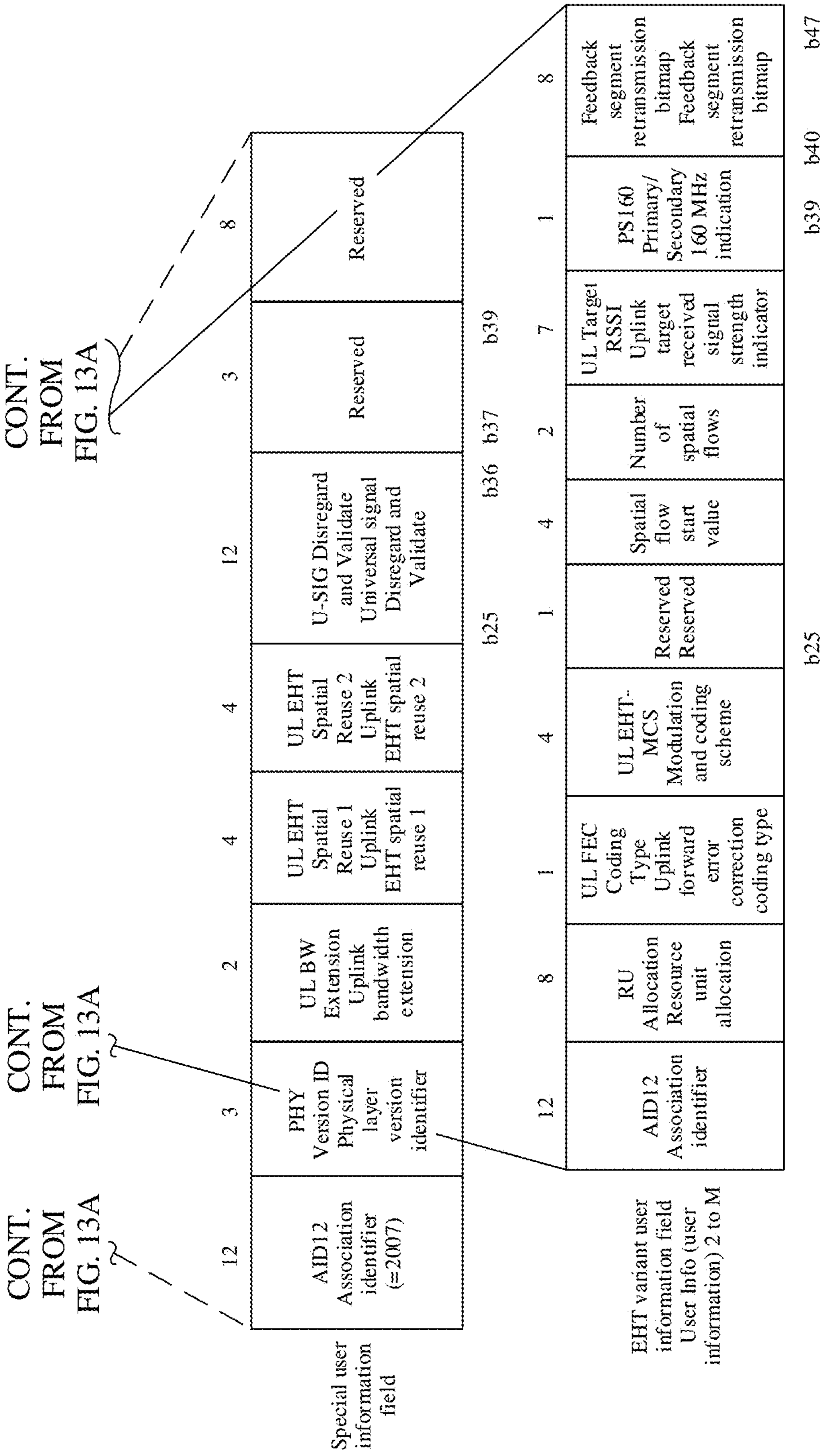

Refer to FIG. 13A and FIG. 13B. FIG. 13A and FIG. 13B are schematic diagrams of an example frame format of an 802.11be trigger frame according to an embodiment of this application. As shown in FIG. 13A and FIG. 13B, the trigger frame includes but is not limited to a common information field and a user information list field. The common information field includes common information that needs to be read by all STAs (where the STA includes at least one of an HE STA and an EHT STA). The EHT STA in this specification represents a station that not only supports an EHT protocol but also is compatible with HE and earlier protocols. In some scenarios and embodiments, the HE STA in this application supports an HE protocol to the utmost extent, but does not support a future Wi-Fi protocol, for example, an EHT protocol. However, it should not be understood that in this application, all HE STAs are limited to being that none of them can support a future Wi-Fi protocol.

In some implementations, the first indication information is located in at least one of the following: a common field of the trigger frame, a user-specific field of the trigger frame, or a special user-specific field of the trigger frame.

For example, as shown in FIG. 13A and FIG. 13B, there are b56 to b62 (six bits in total, which are unused) in a common field of the trigger frame, a common field b63 (a reserved bit) of the trigger frame, a special user-specific field b25 to b36 of the trigger frame, a user-specific field b25 of the trigger frame, and bits in a trigger-dependent user information field in a user-specific field (including a special user-specific field) of the trigger frame. For example, some of these bits in the trigger frame may be used to carry the first indication information.

For example, as shown in FIG. 13A and FIG. 13B, the first indication information is a bitmap for disallowing partial channel transmission. The bitmap for disallowing partial channel transmission is located in b56 to b59 in the common field of the trigger frame. Partial channel transmission means that the first device performs transmission on some of the N resource subunits. A default value of each of b56 to b59 in the common field of the trigger frame is 1, and the first indication information is carried in b56 to b59 in the common field of the trigger frame. When a value of a corresponding bit is 1, it may represent that the first device is allowed to perform TB PPDU transmission on a corresponding resource subunit when the first device performs transmission by using some of the N resource subunits. When the bit is "0", it represents that the first device is not allowed to perform TB PPDU transmission on the corresponding resource subunit when the first device performs transmission by using some of the N resource subunits.

Optionally, the first indication information separately indicates whether the first device is allowed to perform EHT TB PPDU transmission on each of the N resource subunits when the first device performs EHT TB PPDU transmission by using some of the N resource subunits. In other words, the technical solutions of this application may be applied to transmission of an EHT TB PPDU in the 802.11be standard. It needs to be noted that a next-next-generation 802.11 standard is also applicable to the technical solutions in this application. This is not specifically limited in this application.

1202: The first device sends a TB PPDU to the second device on the some of the N resource subunits based on the first indication information; and correspondingly, the second device receives, on the some resource subunits in the N resource subunits, the TB PPDU from the first device.

Specifically, after the first device receives the trigger frame, the first device determines, based on the trigger frame, the first resource allocated by the first device to the first device. The first resource includes at least one RU or MRU. The first device determines, based on the first indication information, whether the first device is allowed to perform TB PPDU transmission on each of the N resource subunits when the first device performs EHT TB PPDU transmission by using some of the N resource subunits. For example, the first indication information indicates that the first device is allowed to perform TB PPDU transmission on each of the N resource subunits when the first device performs TB PPDU transmission by using some of the N resource subunits. The resource subunit includes at least one RU or MRU. The first device determines whether each of the at least one RU or MRU is idle, and the first device performs TB PPDU transmission on an idle RU or MRU in the at least one RU or MRU. This is similar for another resource subunit.

For example, one of the N resource subunits includes a 484-tone RU, and the first indication information indicates that the first device is allowed to perform TB PPDU transmission on the 484-tone RU when the first device performs transmission by using some of the N resource subunits. When the 484-tone RU is idle (that is, each 20 MHz subchannel in a frequency range corresponding to the 484-tone RU is idle), the first device performs TB PPDU transmission on the 484-tone RU. When the 484-tone RU is busy (that is, at least one 20 MHz subchannel in the frequency range corresponding to the 484-tone RU is busy), the first device does not perform transmission on the 484-tone RU.

For example, one of the N resource subunits includes a 996+484-tone MRU, and the first indication information indicates that the first device is allowed to perform TB PPDU transmission on the 996+484-tone MRU when the first device performs transmission by using some of the N resource subunits. When a 996-tone RU in the 996+484-tone MRU is idle and a 484-tone RU in the 996+484-tone MRU is busy, the first device performs TB PPDU transmission on the 996-tone RU but not on the 484-tone RU. When the 996-tone RU in the 996+484-tone MRU is busy and the 484-tone RU in the 996+484-tone MRU is idle, the first device performs transmission on the 484-tone RU but not on the 996-tone RU. Other busy/idle cases of the 996+484-tone MRU are similar, and are not enumerated herein.

It can be learned that, in the technical solution of this application, when the second device indicates that the first device is allowed to perform transmission on the resource subunit (including at least one RU smaller than 996 tones or MRU smaller than 996 tones), and the at least one RU smaller than 996 tones or MRU smaller than 996 tones is idle, the first device may perform transmission on the RU or MRU smaller than 996 tones. In this way, the first device may perform transmission by using an RU or MRU smaller than 996 tones, thereby improving spectral utilization.

For example, the TB PPDU bandwidth used by the second device to schedule the first device (for example, a STA 1) is 320 MHz, and is divided into four 80 MHz bandwidths. Each 80 MHz bandwidth corresponds to one 996-tone RU. The N resource subunits include two resource subunits: A 1$^{st}$ resource subunit includes one 996-tone RU, and the 996-tone RU is located in a 1$^{st}$ 80 MHz bandwidth; and a 2$^{nd}$ resource subunit includes one 996-tone RU, and the 996-tone RU is located in a 2$^{nd}$ 80 MHz bandwidth. A 3$^{rd}$ 80 MHz bandwidth in the four 80 MHz bandwidths corresponds to one 996-tone RU, and a 4$^{th}$ 80 MHz bandwidth in the four 80 MHz bandwidths corresponds to one 996-tone RU. The 996-tone RU corresponding to the 3$^{rd}$ 80 MHz bandwidth and the 996-tone RU corresponding to the 4$^{th}$ 80 MHz bandwidth are allocated to a third device and a fourth device (for example, a STA 2 and a STA 3). In other words, there is MU-MIMIO transmission on the 996-tone RU corresponding to the 3$^{rd}$ 80 MHz bandwidth and the 996-tone RU corresponding to the 4$^{th}$ 80 MHz bandwidth. Therefore, the second device separately indicates, by using the first indication information that: The first device is allowed to perform transmission on some resource units included in each of the 1$^{st}$ 80 MHz bandwidth and the 2$^{nd}$ 80 MHz bandwidth, but not allowed to perform transmission on some resource units included in each of the 3$^{rd}$ 80 MHz bandwidth and the 4$^{th}$ 80 MHz bandwidth when the first device performs transmission by using some of the N resource subunits. When the 996-tone RU located in the 1st 80 MHz bandwidth is idle and the 996-tone RU located in the 2nd 80 MHz bandwidth is busy, the first device performs transmission on the 996-tone RU located in the 1st 80 MHz bandwidth but not on the 996-tone RU located in the 2nd 80 MHz bandwidth. Other busy/idle cases of the 996-tone RU located in the 1st 80 MHz bandwidth and the 996-tone RU located in the 2nd 80 MHz bandwidth are similar.

It can be learned that, in the technical solution of this application, when there is MU-MIMO transmission on some 80 MHz bandwidths (for example, the 1st 80 MHz bandwidth and the 2nd 80 MHz bandwidth) in the TB PPDU bandwidth, the first indication information may indicate that transmission is allowed on an 80 MHz bandwidth (for example, the 3rd 80 MHz bandwidth or the 4th 80 MHz bandwidth) on which there is no MU-MIMO transmission in the TB PPDU bandwidth. The first resource allocated to the first device is located in the 3rd 80 MHz bandwidth and the 4th 80 MHz bandwidth. When an RU or MRU allocated to the first device is idle, the first device may perform transmission on the RU or MRU allocated to the first device. In this way, spectral utilization is improved without affecting the MU-MIMO transmission on the RUs or MRUs allocated to the 1st 80 MHz bandwidth and the 2nd 80 MHz bandwidth in the TB PPDU bandwidth.

Optionally, one of the N resource subunits is located in a first frequency-domain subblock, the first frequency-domain subblock includes a plurality of second frequency-domain subblocks, and the resource subunit is located in the plurality of second frequency-domain subblocks; and if the first indication information indicates that the first device is allowed to perform transmission on the resource subunit when the first device performs transmission by using some of the N resource subunits, the step 1202 specifically includes:

the first device performs transmission on some resource units of the resource subunit based on the first indication information.

For example, one of the N resource subunits is located in a first frequency-domain subblock (a 160 MHz bandwidth), and the 160 MHz bandwidth includes two second frequency-domain subblocks: a 1st 80 MHz bandwidth and a 2nd 80 MHz bandwidth. The resource subunit includes a 996+484-tone MRU. A 996-tone RU in the 996+484-tone MRU is located in the 1st 80 MHz bandwidth, and a 484-tone RU in the 996+484-tone MRU is located in the 2nd 80 MHz bandwidth. The first indication information indicates that the first device is allowed to perform transmission on the first resource subunit when the first device performs transmission by using some of the N resource subunits. When the 996-tone RU in the 996+484-tone MRU is busy and the 484-tone RU in the 996+484-tone MRU is idle, the first device may perform transmission on the 484-tone RU but not on the 996-tone RU. When the 996-tone RU in the 996+484-tone MRU is idle and the 484-tone RU in the 996+484-tone MRU is busy, the first device may perform transmission on the 996-tone RU but not on the 484-tone RU. In this way, the first resource performs transmission on some resource units of the resource subunit.

Optionally, the step 1202 specifically includes: The first device sends the TB PPDU to the second device on the some of the N resource subunits based on the first indication information.

It needs to be noted that, if the first indication information in the step 1201 separately indicates that the first device is not allowed to perform TB PPDU transmission on each of the N resource subunits when the first device performs transmission by using some of the N resource subunits, the first device determines, based on the first indication information, that the first device is not allowed to perform transmission by using some of the N resource subunits. The first device may determine whether each 20 MHz subchannel in a frequency range corresponding to the first resource is idle: If yes, the first device sends the TB PPDU to the second device on the first resource; or if no, the first device does not perform transmission on the first resource, that is, does not send the TB PPDU.

In some implementations, the TB PPDU includes indication information, where the indication information indicates a transmission status of the first device on the first resource. The following describes two possible indication manners of the indication information included in the TB PPDU.

Indication manner 1: The first resource includes at least one RU or MRU, where the at least one RU or MRU is an RU or MRU allocated to the first device in M second frequency-domain subblocks, and M is an integer greater than or equal to 1. The second indication information separately indicates whether the first device has performed transmission on an RU or MRU allocated to the first device in each of the M second frequency-domain subblocks.

In the indication manner 1, the first device indicates, at a granularity of a second frequency-domain subblock, the transmission status of the first device on the first resource.

For example, the first resource includes a 996+484-tone MRU, the first resource includes two resource subunits, a 1st resource subunit is a 996-tone MRU in the 996+484-tone RU, and a 2nd resource subunit is a 484-tone RU in the 996+484-tone MRU. The first device determines, based on the first indication information, that the first device is allowed to perform TB PPDU transmission on each of the two resource subunits when the first device performs transmission by using some of the two resource subunits. The M second frequency-domain subblocks include two second frequency-domain subblocks: a second frequency-domain subblock 1 and a second frequency-domain subblock 2. A bandwidth of each second frequency-domain subblock is 80 MHz. The 996-tone RU in the 996+484-tone RU is located in the second frequency-domain subblock 1. The 484-tone RU in the 996+484-tone RU is located in the second frequency-domain subblock 2. When the 996-tone RU in the 996+484-tone RU is idle and the 484-tone RU in the 996+484-tone RU is busy, the first device may perform transmission on the 996-tone RU in the 996+484-tone RU but not on the 484-tone RU in the 996+484-tone RU. Therefore, the second indication information separately indicates that transmission has been performed on the 996-tone RU located in the second frequency-domain subblock 1 but not on the 484-tone RU located in the second frequency-domain subblock 2. When the 996-tone RU in the 996+484-tone RU is busy and the 484-tone RU in the 996+484-tone RU is idle, the first device may perform transmission on the 484-tone RU in the 996+484-tone RU but not on the 996-tone RU in the 996+484-tone RU. Therefore, the second indication information separately indicates that transmission has been performed on the 484-tone RU located in the second frequency-domain subblock 2 but not on the 996-tone RU located in the second frequency-domain subblock 1. When the 996-tone RU in the 996+484-tone RU is idle and the 484-tone RU in the 996+484-tone RU is idle, the first device may perform transmission on the 996-tone RU in the 996+484-tone RU, and perform transmission on the 484-tone RU in the 996+484-tone RU. Therefore, the second indication information separately indicates that transmission has been performed on the 996-tone RU located in the second frequency-domain subblock 1 and transmission has been performed on the 484-tone RU located in the second frequency-domain subblock 2.

For example, the first resource includes a 996+484+242-tone MRU, the first resource includes two resource subunits, a 1st resource subunit includes a 996-tone RU in a 996+484-tone RU, and a 2nd resource subunit includes a 484+242-tone MRU (including a 484-tone RU and a 242-tone RU) in the 996+484-tone RU. The first device determines, based on the first indication information, that the first device is allowed to perform TB PPDU transmission on each of the two resource subunits when the first device performs transmission by using some of the two resource subunits. The M second frequency-domain subblocks include two second frequency-domain subblocks: a second frequency-domain subblock 1 and a second frequency-domain subblock 2. A bandwidth of each second frequency-domain subblock is 80 MHz. The 996-tone RU in the 996+484+242-tone MRU is located in the second frequency-domain subblock 1, and the 484+242-tone MRU in the 996+484+242-tone MRU is located in the second frequency-domain subblock 2. When the 996-tone RU in the 996+484+242-tone MRU is idle, the 484-tone RU in the 996+484+242-tone MRU is busy, and the 242-tone RU in the 996+484+242-tone MRU is idle, the first device may perform transmission on the 996-tone RU in the 996+484+242-tone MRU, but not on the busy 484-tone RU in the 996+484+242-tone MRU and not on the 242-tone RU in the 996+484+242-tone MRU. The first device does not perform transmission on the 242-tone RU and the 484-tone RU in the second frequency-domain subblock 2, even if the 242-tone RU in the 996+484+242-tone MRU is idle, because the 484-tone RU located in the same second frequency-domain subblock as the 242-tone RU is busy, so that the second indication information indicates the transmission status of the first device at a granularity of a second frequency-domain subblock. Therefore, the second indication information separately indicates that transmission has been performed on the 996-tone RU located in the second frequency-domain subblock 1, but not on the 484-tone RU and the 242-tone RU in the second frequency-domain subblock 2. Other busy/idle cases of the 996+484+242-tone MRU are similar.

Optionally, in the step 1202, the TB PPDU may be an EHT TB PPDU.

Figure 14:
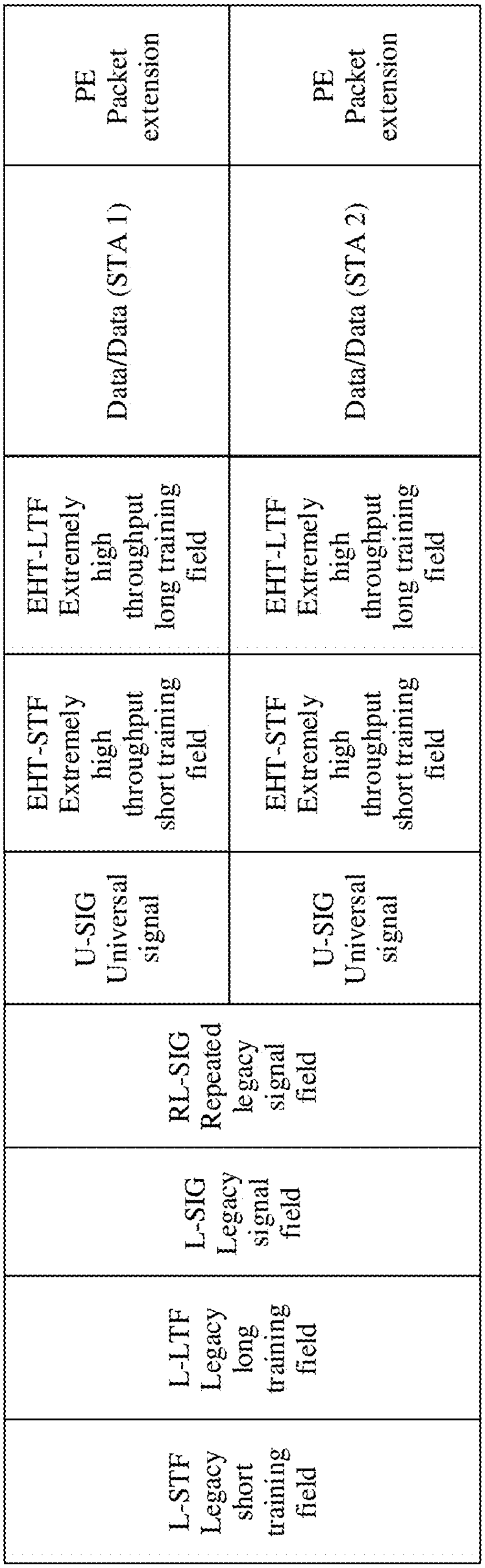
FIG. 14 is a schematic diagram of an example frame format of an EHT TB PPDU according to an embodiment of this application.

Optionally, the second indication information may be located in a U-SIG included in the EHT TB PPDU. Refer to FIG. 14. FIG. 14 is a schematic diagram of an example frame format of a TB PPDU according to an embodiment of this application. As shown in FIG. 14, the EHT TB PPDU includes but is not limited to the following fields: a legacy short training field, a legacy long training field, a legacy signal field, a repeated legacy signal field, a universal signal field, an extremely high throughput short training field, an extremely high throughput long training field, a data field, and a packet extension field. For meanings of the fields included in the EHT TB PPDU, refer to Table 1 below.

TABLE 1

Meanings of the fields in the EHT TB PPDU

| Acronyms or abbreviations | Full name | Description | Function |
|---|---|---|---|
| L-STF | Legacy Short Training Field | Legacy short training field | This field is used to perform PPDU discovery, coarse synchronization, and automatic gain control. |
| L-LTF | Legacy Long Training Field | Legacy long training field | This field is used to perform fine synchronization and channel estimation. |
| L-SIG | Legacy Signal Field A | Legacy signal field | This field is used to carry signaling information related to a PPDU length, to ensure coexistence. |
| RL-SIG | Repeated Legacy Signal Field | Repeated legacy signal field | Same as the L-SIG, this field is used together with the L-SIG for automatic detection, to improve reliability. |
| U-SIG | Universal SIG | Universal signal | This field is similar to HE-SIG-A. A difference is that a unified signal field is used in an EHT PPDU and subsequent standards. Therefore, this field is referred to as a universal signal field. |
| EHT-STF | Extremely High Throughput Short Training Field | Extremely high throughput short training field | This field is used to perform automatic gain control of subsequent fields. |
| EHT-LTF | Extremely High Throughput Long Training Field | Extremely high throughput long training field | This field is used to perform channel estimation. |
| Data | | Data | This field is used to carry data information. |
| PE | Packet Extension | Packet extension | This field is used to increase the processing time of a receiver. |

The universal signal field (U-SIG) includes two U-SIG symbols: U-SIG-1 and U-SIG-2. The following describes content included in the U-SIG field with reference to Table 2.

TABLE 2

| U-SIG symbols (two in total) | Bits | Field | Meaning |
|---|---|---|---|
| U-SIG-1 | B0-B2 | Physical layer version indication | This field indicates a version of a physical layer of the PPDU, where the EHT PPDU is indicated in the solution of the present invention. |
| | B3-B5 | Bandwidth | This field indicates a bandwidth of the PPDU. |

TABLE 2-continued

| U-SIG symbols (two in total) | Bits | Field | Meaning |
|---|---|---|---|
| | B6 | UL/DL | This field indicates an uplink or a downlink, where the uplink is indicated in the solution of the present invention. |
| | B7-B12 | BSS Color | BSS: Basic Service Set, basic service set This field indicates an identifier of the basic service set. |
| | B13-B19 | TXOP | Transmit opportunity indicating a transmit opportunity |
| | B20-B25 | Disregard | This field depends on the setting of a U-SIG Disregard and Validate subfield in the trigger frame. |
| U-SIG-2 | B0-B1 | PPDU type and compressed mode | This field indicates a format of the PPDU, where the EHT TB PPDU is indicated in the solution of the present invention. |
| | B2 | Validate | Acknowledgment indication |
| | B3-B6 | Spatial reuse 1 | This field indicates parameters related to spatial multiplexing transmission. |
| | B7-B10 | Spatial reuse 2 | This field indicates parameters related to spatial multiplexing transmission. |
| | B11-B15 | Disregard | Disregard indication |
| | B16-B19 | CRC | CRC: cyclic redundancy code, cyclic redundancy code used to check the U-SIG, where CRC in the U-SIG and/or the EHT-SIG may have more bits, to improve reliability |
| | B20-B25 | Tail (tail) | Tail bits used to end encoding |

In Table 2, B20 to B25 (six bits in total) in the U-SIG-1 symbol are Disregard bits, the Disregard bits are unused (or spare) bits, and B2 in the U-SIG-2 symbol and B11 to B15 (five bits in total) in the U-SIG-2 symbol are also unused (or spare). Optionally, for example, these unused (or spare) bits in the U-SIG may be used to carry the second indication information.

It needs to be noted that the second indication information may alternatively be located in another field of the EHT TB PPDU. For example, an EHT-SIG field (extremely high throughput signal field) is newly added following the U-SIG field or the EHT-LTF field in the EHT TB PPDU, that is, the second indication information is carried in the newly added EHT-SIG field.

In a possible implementation, bits in the second indication information may be duplication of bits in the U-SIG Disregard and Validate field in the trigger frame. The following describes a specific implementation.

Optionally, values of the bits in the second indication information include at least one of the following:

if the first device has performed transmission on an RU or MRU allocated to the first device in a second frequency-domain subblock, a bit corresponding to the second frequency-domain subblock in the second indication information is duplication of a bit corresponding to the second frequency-domain subblock in the U-SIG Disregard and Validate field in the trigger frame; or if the first device does not perform transmission on an RU or MRU allocated to the first device in a second frequency-domain subblock, a value of a bit corresponding to the second frequency-domain subblock in the second indication information is 0; or if the first resource is not located in a third frequency-domain subblock, a value of a bit corresponding to the third frequency-domain subblock in the second indication information is 0, the third frequency-domain subblock and the M second frequency-domain subblocks are frequency-domain subblocks included in a TB PPDU bandwidth, the TB PPDU bandwidth is bandwidth used by the second device to schedule the first device, and a bandwidth of the third frequency-domain subblock is greater than or equal to 80 MHz, for example, the TB PPDU bandwidth is 320 MHz, including four 80 MHz bandwidths, the M second frequency-domain subblocks are a $1^{st}$ 80 MHz bandwidth, a $2^{nd}$ 80 MHz bandwidth, and a $3^{rd}$ 80 MHz bandwidth, and the third frequency-domain subblock is a $4^{th}$ 80 MHz bandwidth; or if a preset maximum TB PPDU bandwidth includes a fourth frequency-domain subblock and a TB PPDU bandwidth does not include the fourth frequency-domain subblock, a value of a bit corresponding to the fourth frequency-domain subblock in the second indication information is 0, the TB PPDU bandwidth is a bandwidth used by the second device to schedule the first device, the TB PPDU bandwidth is less than the preset maximum TB PPDU bandwidth, and a bandwidth of the fourth frequency-domain subblock is greater than or equal to 80 MHz. For example, the TB PPDU bandwidth is 160 MHz, including a $1^{st}$ 80 MHz bandwidth and a $2^{nd}$ 80 MHz bandwidth, the preset maximum TB PPDU bandwidth is 320 MHz, including four 80 MHz bandwidths: a $1^{st}$ 180 MHz bandwidth, a $2^{nd}$ 80 MHz bandwidth, a $3^{rd}$ 80 MHz bandwidth, and a $4^{th}$ 80 MHz bandwidth, and the fourth frequency-domain subblock may be understood as the $3^{rd}$ 80 MHz bandwidth and the $4^{th}$ 80 MHz bandwidth.

The preset maximum TB PPDU bandwidth is a maximum bandwidth used by an AP to schedule a STA as specified in a communication standard. According to the 802.11be standard, the preset maximum TB PPDU bandwidth is 320 MHz.

Optionally, the universal signal U-SIG Disregard and Validate field in the trigger frame includes four bits, and the four bits are respectively bits corresponding to the four 80 MHz bandwidths (in ascending order of frequencies of the four 80 MHz bandwidths) included in the preset maximum TB PPDU bandwidth.

It needs to be noted that, if the first device performs transmission on all RUs or MRUs included in the first resource, the bits included in the second indication information are duplication of the bits corresponding to the four 80 MHz bandwidths in the universal signal U-SIG Disregard and Validate field in the trigger frame.

It needs to be noted that, if the first device determines, based on the first indication information and busy/idle conditions of RUs or MRUs included in the first resource, not to perform transmission on the first resource, the first device does not send the TB PPDU. To be specific, there is no second indication information.

The following provides description with reference to some examples. It needs to be noted that, in the following examples, the U-SIG Disregard and Validate subfield in the trigger frame includes four bits, and its value is "1 1 1 1" by default.

Example 1: The TB PPDU bandwidth is 160 MHz, and is divided into two 80 MHz bandwidths. A frequency of a 1st 80 MHz bandwidth is less than a frequency of a 2nd 80 MHz bandwidth. The 1st 80 MHz bandwidth corresponds to one 996-tone RU, and the 2nd 80 MHz bandwidth corresponds to two 484-tone RUs. The second device is an AP, and the first device is a STA 1. The AP allocates a 996+484-tone MRU to the STA 1, and the other 484-tone RU is unallocated. The AP indicates, in the trigger frame, that transmission is allowed on some resource units included in the 1st 80 MHz bandwidth, and transmission is allowed on some resource units included in the 2nd 80 MHz bandwidth. For a transmission status of the STA 1, refer to Table 3 below. The second indication information is a value of an RU transmission indication field in Table 3 below.

TABLE 3

| Busy/Idle condition of the 996-tone RU | Busy/Idle condition of the 484-tone RU | Value of the RU transmission indication field (bitmap) | Meaning of the RU transmission indication field |
|---|---|---|---|
| Idle | Idle | Duplication of the value of the U-SIG Disregard and Validate subfield in the trigger frame, for example, 1 1 1 1 | Transmission on all RUs (transmission on the 996 + 484-tone MRU) |
| Idle | Busy | 1 0 0 0 (The TB PPDU bandwidth is 160 MHz, a bit corresponding to the 1st 80 MHz bandwidth is duplication of a bit corresponding to the 1st 80 MHz bandwidth in the U-SIG Disregard and Validate subfield in the trigger frame, and a value of a bit corresponding to the 2nd 80 MHz bandwidth is 0. There is no transmission in the 3rd 80 MHz bandwidth and the 4th 80 MHz bandwidth. Therefore, a value of a bit corresponding to the 3rd 80 MHz bandwidth and a value of a bit corresponding to the 4th 80 MHz bandwidth are both 0.) | Transmission on only the 996-tone RU |
| Busy | Idle | 0 1 0 0 (The TB PPDU bandwidth is 160 MHz, the value of the bit corresponding to the 1st 80 MHz bandwidth is 0, and the bit corresponding to the 2nd 80 MHz bandwidth is duplication of the bit corresponding to the 2nd 80 MHz bandwidth in the U-SIG Disregard and Validate subfield in the trigger frame. There is no transmission in the 3rd 80 MHz bandwidth and the 4th 80 MHz bandwidth. Therefore, the value of the bit corresponding to the 3rd 80 MHz bandwidth and the value of the bit corresponding to the 4th 80 MHz bandwidth are both 0.) | Transmission on only the 484-tone RU |
| Busy | Busy | No U-SIG | No transmission |

Example 2: The TB PPDU bandwidth is 320 MHz, and is divided into four 80 MHz bandwidths. A 1st 80 MHz bandwidth corresponds to one 996-tone RU, a 2nd 80 MHz bandwidth corresponds to one 996-tone RU, a 3rd 80 MHz bandwidth corresponds to one 996-tone RU, and a 4th 80 MHz bandwidth corresponds to two 484-tone RUs. The second device is an AP, and the first device is a STA 1. The AP allocates a 3×996+484-tone MRU to the STA 1, and the other 484-tone RU is unallocated. The AP separately indicates, in the trigger frame, that transmission is allowed on some resource units included in each of the 1st 80 MHz bandwidth, the 2nd 80 MHz bandwidth, the 3rd 80 MHz bandwidth, and the 4th 80 MHz bandwidth. For a transmission status of the STA 1, refer to Table 4 below. The second indication information is a value of an RU transmission indication field in Table 4 below.

TABLE 4

| Busy/Idle condition of the 996-tone RU | Busy/Idle condition of the 996-tone RU | Busy/Idle condition of the 996-tone RU | Busy/Idle condition of the 484-tone RU | Value of the RU transmission indication field (bitmap) | Meaning of the RU transmission indication field |
|---|---|---|---|---|---|
| Idle | Idle | Idle | Idle | Duplication of the value of the U-SIG Disregard and Validate subfield in the trigger frame, for example, 1 1 1 1 | Transmission on all RUs (transmission on the 3 × 996 + 484-tone MRU) |

TABLE 4-continued

| Busy/Idle condition of the 996-tone RU | Busy/Idle condition of the 996-tone RU | Busy/Idle condition of the 996-tone RU | Busy/Idle condition of the 484-tone RU | Value of the RU transmission indication field (bitmap) | Meaning of the RU transmission indication field |
|---|---|---|---|---|---|
| Idle | Idle | Idle | Busy | 1 1 1 0 | Transmission on a 3 × 996-tone MRU |
| Idle | Idle | Busy | Idle | 1 1 0 0 | Transmission on a 2 × 996-tone RU (For 2 × 996 + 484-tone MRUs currently supported in a standard, the 1st or 4th 80 MHz bandwidth needs to be punctured. If a case is further supported in which the 3rd 80 MHz bandwidth is punctured, transmission may be performed on a 2 × 996 + 484-tone MRU. In this case, the U-SIG bitmap indicates 1 1 0 1.) |
| Idle | Idle | Busy | Busy | 1 1 0 0 | Transmission on a 2 × 996-tone RU |
| Idle | Busy | Idle | Idle | 0 0 1 1 | Transmission on a 996 + 484-tone MRU (For 2 × 996 + 484-tone MRUs currently supported in a standard, the 1st or 4th 80 MHz bandwidth needs to be punctured. If a case is further supported in which the 2nd 80 MHz bandwidth is punctured, transmission may be performed on a 2 × 996 + 484-tone MRU. In this case, the U-SIG bitmap indicates 1 0 1 1.) |
| Idle | Busy | Idle | Busy | 1 0 0 0 or 0 0 1 0 | Transmission on a 996-tone RU |
| Idle | Busy | Busy | Idle | 1 0 0 0 | Transmission on a 996-tone RU |
| Idle | Busy | Busy | Busy | 1 0 0 0 | Transmission on a 996-tone RU |
| Busy | Idle | Idle | Idle | 0 1 1 1 | Transmission on a 2 × 996 + 484-tone MRU |
| Busy | Idle | Idle | Busy | 0 1 0 0 or 0 0 1 0 | Transmission on a 996-tone RU |
| Busy | Idle | Busy | Idle | 0 1 0 0 | Transmission on a 996-tone RU |
| Busy | Idle | Busy | Busy | 0 1 0 0 | Transmission on a 996-tone RU |
| Busy | Busy | Idle | Idle | 0 0 1 1 | Transmission on a 996 + 484-tone MRU |
| Busy | Busy | Idle | Busy | 0 0 1 0 | Transmission on a 996-tone RU |
| Busy | Busy | Busy | Idle | 0 0 0 1 | Transmission on a 484-tone RU |
| Busy | Busy | Busy | Busy | No U-SIG | No transmission |

Table 4 shows only some combinations of busy/idle conditions of the RUs. In practice, there are other combinations not shown in Table 4. This is not specifically limited in this application. In some implementations, the AP may claim, in a capability field or an operation field in a beacon frame or a probe response frame, some combinations that support transmission, or settings of the AP support transmission on only an RU or MRU whose size is greater than a specific threshold, to reduce complexity of reception processing on the AP side. For a combination not supported by the AP, the STA does not perform transmission. For example, the AP claims no support for receiving data transmitted on a 484-tone RU when the first resource is a 3×996+484-tone MRU; and then even if all the three 996-tone RUs in the 3×996+484-tone MRU are busy and the 484-tone RU in the 3×996+484-tone MRU is idle, the STA does not perform transmission on the 484-tone RU.

Example 3: The TB PPDU bandwidth is 320 MHz, and is divided into four 80 MHz bandwidths. Each 80 MHz bandwidth corresponds to one 996-tone RU. The second device is an AP, and the first device is a STA 1. The AP allocates a 2×996-tone RU to the STA 1 for transmission. Two 996-tone RUs in the 2×996-tone RU are respectively located in a 1$^{st}$ 80 MHz bandwidth and a 2$^{nd}$ 80 MHz bandwidth. The AP allocates another 2×996-tone RU to a STA 2 and a STA 3, and two 996-tone RUs in the 2×996-tone RU are respectively located in a 3$^{rd}$ 80 MHz bandwidth and a 4$^{th}$ 80 MHz bandwidth. The AP separately indicates, in the trigger frame, that transmission is allowed on some resource units included in each of the 1$^{st}$ 80 MHz bandwidth and the 2$^{nd}$ 80 MHz bandwidth, and that transmission is not allowed on some resource units included in each of the 3$^{rd}$ 80 MHz bandwidth and the 4$^{th}$ 80 MHz bandwidth. For a transmission status of the STA 1, refer to Table 5 below. The second indication information is a value of an RU transmission indication field in Table 5 below.

TABLE 5

| Busy/Idle condition of the 996-tone RU corresponding to the 1$^{st}$ 80 MHz bandwidth | Busy/Idle condition of the 996-tone RU corresponding to the 2$^{nd}$ 80 MHz bandwidth | Value of the RU transmission indication field (bitmap) | Meaning of the RU transmission indication field |
|---|---|---|---|
| Idle | Idle | Duplication of the value of the U-SIG Disregard and Validate subfield in the trigger frame (for example, 1 1 1 1) | Transmission on all RUs (transmission on the 2 × 996-tone RU) |
| Idle | Busy | 1 0 0 0 (The TB PPDU bandwidth is 160 MHz, a bit corresponding to the 1$^{st}$ 80 MHz bandwidth is duplication of a bit corresponding to the 1$^{st}$ 80 MHz bandwidth in the U-SIG Disregard and Validate subfield in the trigger frame, and a value of a bit corresponding to the 2$^{nd}$ 80 MHz bandwidth is 0. There is no transmission in the 3$^{rd}$ 80 MHz bandwidth and the 4$^{th}$ 80 MHz bandwidth. Therefore, a value of a bit corresponding to the 3$^{rd}$ 80 MHz bandwidth and a value of a bit corresponding to the 4$^{th}$ 80 MHz bandwidth are both 0.) | Transmission on only the 996-tone RU corresponding to the 1$^{st}$ 80 MHz bandwidth |
| Busy | Idle | 0 1 0 0 (The TB PPDU bandwidth is 160 MHz, the value of the bit corresponding to the 1$^{st}$ 80 MHz bandwidth is 0, and the bit corresponding to the 2$^{nd}$ 80 MHz bandwidth is duplication of the bit corresponding to the 1$^{st}$ 80 MHz bandwidth in the U-SIG Disregard and Validate subfield in the trigger frame. There is no transmission in the 3$^{rd}$ 80 MHz bandwidth and the 4$^{th}$ 80 MHz | Transmission on only the 996-tone RU corresponding to the 2$^{nd}$ 80 MHz bandwidth |

TABLE 5-continued

| Busy/Idle condition of the 996-tone RU corresponding to the 1st 80 MHz bandwidth | Busy/Idle condition of the 996-tone RU corresponding to the 2nd 80 MHz bandwidth | Value of the RU transmission indication field (bitmap) | Meaning of the RU transmission indication field |
|---|---|---|---|
| | | bandwidth. Therefore, the value of the bit corresponding to the 3rd 80 MHz bandwidth and the value of the bit corresponding to the 4th 80 MHz bandwidth are both 0.) | |
| Busy | Busy | No U-SIG | No transmission |

It can be learned from Example 3 that some 80 MHz bandwidths (the 1st 80 MHz bandwidth and the 2nd 80 MHz bandwidth) in the TB PPDU bandwidth (320 MHz) are allocated to the STA 1. The other two 80 MHz bandwidths (the 3rd 80 MHz bandwidth and the 4th 80 MHz bandwidth) are allocated only to the STA 2 and the STA 3, that is, there is MU-MIMO transmission on some 80 MHz bandwidths in the TB PPDU bandwidth (320 MHz). There is no MU-MIMO transmission on the 1st 80 MHz bandwidth and the 2nd 80 MHz bandwidth. Therefore, the STA 1 may perform transmission on some resource units included in the 1st 80 MHz bandwidth and the 2nd 80 MHz bandwidth. However, the STA 2 and the STA 3 cannot perform transmission on some resource units included in each of the 3rd 80 MHz bandwidth and the 4th 80 MHz bandwidth. Therefore, in a case in which there is MU-MIMO transmission on some 80 MHz bandwidths in the TB PPDU bandwidth, for an 80 MHz bandwidth on which there is no MU-MIMO transmission, the corresponding STA may perform transmission on an RU or MRU allocated to the STA in the 80 MHz bandwidth, thereby improving spectral resource utilization.

In another possible implementation, bits in the second indication information may be duplication or negation of bits in the U-SIG Disregard and Validate field in the trigger frame.

Optionally, values of the bits in the second indication information include at least one of the following:

- if the first device has performed transmission on an RU or MRU allocated to the first device in a second frequency-domain subblock, a bit corresponding to the second frequency-domain subblock in the second indication information is duplication of a bit corresponding to the second frequency-domain subblock in the U-SIG Disregard and Validate field in the trigger frame; or
- if the first device does not perform transmission on an RU or MRU allocated to the first device in a second frequency-domain subblock, a bit corresponding to the second frequency-domain subblock in the second indication information is negation of a bit corresponding to the second frequency-domain subblock in the U-SIG Disregard and Validate field in the trigger frame; or
- if the first resource is not located in a third frequency-domain subblock, a bit corresponding to the third frequency-domain subblock in the second indication information is duplication of a bit corresponding to the third frequency-domain subblock in the universal signal U-SIG Disregard and Validate field in the trigger frame, the third frequency-domain subblock and the M second frequency-domain subblocks are frequency-domain subblocks included in a TB PPDU bandwidth, the TB PPDU bandwidth is a bandwidth used by the second device to schedule the first device, and a bandwidth of the third frequency-domain subblock is greater than or equal to 80 MHz; or
- if a preset maximum TB PPDU bandwidth includes a fourth frequency-domain subblock and a TB PPDU bandwidth does not include the fourth frequency-domain subblock, a bit corresponding to the fourth frequency-domain subblock in the second indication information is duplication of a bit corresponding to the fourth frequency-domain subblock in the universal signal U-SIG Disregard and Validate field in the trigger frame, the TB PPDU bandwidth is a bandwidth used by the second device to schedule the first device, the TB PPDU bandwidth is less than the preset maximum TB PPDU bandwidth, and a bandwidth of the fourth frequency-domain subblock is greater than or equal to 80 MHz.

The preset maximum TB PPDU bandwidth is a maximum bandwidth used by an AP to schedule a STA as specified in a communication standard. According to the 802.11be standard, the preset maximum TB PPDU bandwidth is 320 MHz.

Optionally, the universal signal U-SIG Disregard and Validate field in the trigger frame includes four bits, and the four bits are respectively bits corresponding to the four 80 MHz bandwidths (in ascending order of frequencies of the four 80 MHz bandwidths) included in the preset maximum TB PPDU bandwidth.

It needs to be noted that, if the first device performs transmission on all RUs or MRUs included in the first resource, the bits included in the second indication information are duplication of the bits corresponding to the four 80 MHz bandwidths in the universal signal U-SIG Disregard and Validate field in the trigger frame.

It needs to be noted that, if the first device determines, based on the first indication information and busy/idle conditions of RUs or MRUs included in the first resource, not to perform transmission on the first resource, the first device does not send the TB PPDU. To be specific, there is no second indication information.

The following provides description with reference to an example. It needs to be noted that, in the following example, a value of the U-SIG Disregard and Validate subfield in the trigger frame is “1 1 1 1” by default.

Based on the foregoing example 1, for a transmission status of the STA 1, refer to Table 7 below. The second indication information is a value of an RU transmission indication field in Table 7 below.

TABLE 7

| Busy/Idle condition of the 996-tone RU | Busy/Idle condition of the 484-tone RU | Value of the RU transmission indication field (bitmap) | Meaning of the RU transmission indication field |
|---|---|---|---|
| Idle | Idle | Duplication of the value of the U-SIG Disregard and Validate subfield in the trigger frame, for example, 1 1 1 1 | Transmission on all RUs (transmission on the 996 + 484-tone MRU) |
| Idle | Busy | 1 0 1 1 (The TB PPDU bandwidth is 160 MHz, a bit corresponding to the 1st 80 MHz bandwidth is duplication of a bit corresponding to the 1st 80 MHz bandwidth in the U-SIG Disregard and Validate subfield in the trigger frame, and a bit corresponding to the 2nd 80 MHz bandwidth is negation of a bit corresponding to the 2nd 80 MHz bandwidth in the U-SIG Disregard and Validate subfield in the trigger frame. There is no transmission in the 3rd 80 MHz bandwidth and the 4th 80 MHz bandwidth. Therefore, a bit corresponding to the 3rd 80 MHz bandwidth is duplication of a bit corresponding to the 3rd 80 MHz bandwidth in the U-SIG Disregard and Validate subfield in the trigger frame, and a bit corresponding to the 4th 80 MHz bandwidth is duplication of a bit corresponding to the 4th 80 MHz bandwidth in the U-SIG Disregard and Validate subfield in the trigger frame.) | Transmission on only the 996-tone RU |
| Busy | Idle | 0 1 1 1 (The TB PPDU bandwidth is 160 MHz, the bit corresponding to the 1st 80 MHz bandwidth is negation of the bit corresponding to the 1st 80 MHz bandwidth in the U-SIG Disregard and Validate subfield in the trigger frame, and the bit corresponding to the 2nd 80 MHz bandwidth is duplication of the bit corresponding to the 2nd 80 MHz bandwidth in the U-SIG Disregard and Validate subfield in the trigger frame. There is no transmission in the 3rd 80 MHz bandwidth and the 4th 80 MHz bandwidth. Therefore, the bit corresponding to the 3rd 80 MHz bandwidth is duplication of the bit corresponding to the 3rd 80 MHz bandwidth in the U-SIG Disregard and Validate subfield in the trigger frame, and the bit corresponding to the 4th 80 MHz bandwidth is duplication of the bit corresponding to the 4th 80 MHz bandwidth in the U-SIG Disregard and Validate subfield in the trigger frame.) | Transmission on only the 484-tone RU |
| Busy | Busy | No U-SIG | No transmission |

It can be learned that, if the first device has performed transmission on all RUs or MRUs allocated to the first device in the M second frequency-domain subblocks, the bits in the second indication information are duplication of the bits corresponding to the four 80 MHz bandwidths in the U-SIG Disregard and Validate field in the trigger frame. If the first device has performed transmission on an RU or MRU allocated to the first device in a second frequency-domain subblock, a bit corresponding to the second frequency-domain subblock in the second indication information is duplication of a bit corresponding to the second frequency-domain subblock in the U-SIG Disregard and Validate field in the trigger frame; or if the first device does not perform transmission on an RU or MRU allocated to the first device in a second frequency-domain subblock, a corresponding bit in the second indication information is negation of a corresponding bit in the U-SIG Disregard and Validate field in the trigger frame. A bit irrelevant to the first resource in the second indication information (for example, a bit corresponding to a third frequency-domain subblock not included in the first resource, or a bit corresponding to a fourth frequency-domain subblock included in the preset maximum TB PPDU bandwidth) may be duplication of a bit in the U-SIG Disregard and Validate field in the trigger frame. In this way, the implementation logic of the solution is simpler.

Indication manner 2: The first resource includes at least one RU, the TB PPDU includes third indication information, and the third indication information separately indicates whether the first device has performed TB PPDU transmission on each of the at least one RU.

In the foregoing indication manner 2, the first device indicates, at a granularity of an RU, the transmission status of the first device on the first resource.

For example, the first resource includes a 996+484+242-tone MRU, the first resource includes two resource subunits, a 1st resource subunit includes a 996-tone RU in a 996+484-tone RU, and a 2nd resource subunit includes a 484-tone RU and a 242-tone RU in the 996+484-tone RU. The first device determines, based on the first indication information, that the first device is allowed to perform TB PPDU transmission on each of the two resource subunits when the first device performs transmission by using some of the two resource subunits. When the 996-tone RU in the 996+484+242-tone MRU is idle, the 484-tone RU in the 996+484+242-tone MRU is busy, and the 242-tone RU in the 996+484+242-tone MRU is idle, the first device may perform transmission on the 996-tone RU in the 996+484+242-tone MRU, but not on the 484-tone RU and the 242-tone RU in the 996+484+242-tone MRU. Therefore, the third indication information separately indicates that transmission has been separately performed on the 996-tone RU in the 996+484+242-tone MRU, but not on the 484-tone RU and the 242-tone RU in the 996+484+242-tone MRU. When the 996-tone RU in the 996+484+242-tone MRU is idle, the 484-tone RU in the 996+484+242-tone MRU is idle, and the 242-tone RU in the 996+484+242-tone MRU is busy, the first device may perform transmission on the 996-tone RU and the 484-tone RU in the 996+484+242-tone MRU, but not on the 242-tone RU in the 996+484+242-tone MRU. Therefore, the third indication information separately indicates that transmission has been separately performed on the 996-tone RU in the 996+484+242-tone MRU and the 484-tone RU in the 996+484+242-tone MRU, but not on the 484-tone RU and the 242-tone RU in the 996+484+242-tone MRU. Other busy/idle cases of the 996+484+242-tone MRU are similar.

For example, the first resource includes a 484+242-tone MRU, the first resource includes a resource subunit, and the resource subunit includes a 484-tone RU and a 242-tone RU in the 484+242-tone MRU. The first device determines, based on the first indication information, that the first device is allowed to perform TB PPDU transmission on the resource subunit. When the 484-tone RU in the 484+242-tone MRU is idle and the 242-tone RU in the 484+242-tone MRU is busy, the first device may perform transmission on the 484-tone RU in the 484+242-tone MRU, but not on the 242-tone RU in the 484+242-tone MRU. Therefore, the third indication information separately indicates that transmission has been performed on the 484-tone RU in the 484+242-tone MRU but not on the 242-tone RU in the 484+242-tone MRU. Other busy/idle cases of the 484+242-tone MRU are similar.

In the foregoing indication manner 2, the first device indicates, at a granularity of an RU, the transmission status of the first device on the first resource. Particularly, when the first resource includes a 996+484+242-tone MRU and a 484+242-tone MRU, the first device may perform transmission more efficiently by using some RUs or MRUs, thereby further improving spectral utilization.

Optionally, in the step 1203, the TB PPDU may be an EHT TB PPDU. The third indication information may be located in a U-SIG included in the EHT TB PPDU. For the EHT TB PPDU and the U-SIG included in the EHT TB PPDU, refer to the foregoing related descriptions. Specific bit locations of the U-SIG, in which the third indication information is located, included in the EHT TB PPDU are similar to the bit locations of the U-SIG, in which the second indication information is located, included in the EHT TB PPDU. For details, refer to the foregoing related descriptions.

In a possible implementation, bits in the third indication information may be duplication or negation of bits in the U-SIG Disregard and Validate field in the trigger frame. The following describes a specific implementation.

Optionally, values of the bits in the third indication information include at least one of the following:

- if the first device has performed transmission on an RU in the first resource, a bit corresponding to the RU in the third indication information is duplication of a bit corresponding to the RU in the universal signal field (U-SIG) Disregard and Validate field in the trigger frame; or
- if the first device does not perform transmission on an RU in the first resource, a bit corresponding to the RU in the third indication information is negation of a bit corresponding to the RU in the U-SIG Disregard and Validate field in the trigger frame; or
- if a bit corresponding to an RU in the first resource in the third indication information is duplication or negation of a bit of the RU in the first resource in the U-SIG Disregard and Validate field in the trigger frame, bits other than the bit corresponding to the RU in the first resource in the third indication information are duplication of bits other than the bit of the RU in the first resource in the U-SIG Disregard and Validate field in the trigger frame.

It needs to be noted that, if the first device determines, based on the first indication information and busy/idle conditions of RUs or MRUs included in the first resource, not to perform transmission on the first resource, the first device does not send the TB PPDU. To be specific, there is no third indication information.

Optionally, the third indication information includes four bits, and the U-SIG Disregard and Validate subfield in the trigger frame includes four bits.

The following provides description with reference to a specific example. It needs to be noted that, in the following example, the U-SIG Disregard and Validate subfield in the trigger frame includes four bits, and its value is “1 1 1 1” by default.

Example 4: The TB PPDU bandwidth is 160 MHz, and is divided into two 80 MHz bandwidths. A frequency of a 1$^{st}$ 80 MHz bandwidth is less than a frequency of a 2$^{nd}$ 80 MHz bandwidth. The 1$^{st}$ 80 MHz bandwidth corresponds to one 996-tone RU, and the 2$^{nd}$ 80 MHz bandwidth corresponds to one 484-tone RU and two 242-tone RUs. The second device is an AP, and the first device is a STA 1. The AP allocates a 996+484+242-tone MRU to the STA 1, and the other 242-tone RU is unallocated. The AP indicates, in the trigger frame, that transmission is allowed on some resource units included in the 1$^{st}$ 80 MHz bandwidth, and transmission is allowed on some resource units included in the 2$^{nd}$ 80 MHz bandwidth. For a transmission status of the STA 1, refer to Table 8 below. The second indication information is a value of an RU transmission indication field in Table 8 below.

TABLE 8

| Busy/Idle condition of the 996-tone RU | Busy/Idle condition of the 484-tone RU | Busy/Idle condition of the 242-tone RU | Value of the RU transmission indication field (bitmap) | Meaning of the RU transmission indication field |
|---|---|---|---|---|
| Idle | Idle | Idle | 1 1 1 1 (duplication of the value of the U-SIG Disregard and Validate subfield in the trigger frame) | Transmission on all RUs (transmission on the 996 + 484 + 242- tone MRU) |
| Idle | Idle | Busy | 1 1 0 1 (using an example in which an irrelevant bit is still a value indicated in the trigger frame) | Transmission on a 996 + 484-tone MRU |
| Idle | Busy | Idle | 1 0 0 1 | Transmission on the 996-tone RU |
| Idle | Busy | Busy | 1 0 0 1 | Transmission on the 996-tone RU |
| Busy | Idle | Idle | 0 1 1 1 | Transmission on a 484 + 242-tone MRU |
| Busy | Idle | Busy | 0 1 0 1 | Transmission on the 484-tone RU |
| Busy | Busy | Idle | 0 0 1 1 | Transmission on the 242-tone RU |
| Busy | Busy | Busy | No U-SIG | No transmission |

Table 8 shows only some combinations of busy/idle conditions of the RUs. In practice, there are other combinations not shown in Table 8. This is not specifically limited in this application. In actual application, the AP may specify some RU combinations that support transmission, or settings of the AP support transmission on only an RU or MRU whose size is greater than a specific threshold, to reduce complexity of reception processing on the AP side.

It needs to be noted that the TB PPDU in the step 1202 may exclude the indication information, that is, the first device does not need to indicate the RUs or MRUs on which the first device has performed transmission. The second device may determine, by identifying 20 MHz bandwidth subchannels on which the first device has sent a preamble, the RUs or MRUs on which the first device has actually performed transmission.

In this embodiment of this application, the first device receives the trigger frame from the second device, where the trigger frame indicates the first resource allocated to the first device, the first resource includes the N resource subunits, the trigger frame includes the first indication information, the first indication information separately indicates whether the first device is allowed to perform trigger-based physical layer protocol data unit (TB PPDU) transmission on each of the N resource subunits when the first device performs TB PPDU transmission by using some of the N resource subunits, and N is an integer greater than or equal to 1; and the first device sends the TB PPDU to the second device on some of the N resource subunits based on the first indication information. It can be learned that, in the technical solution of this application, the first device may send the TB PPDU to the second device on the some of the N resource subunits based on the first indication information. In other words, the second device indicates that the first device is allowed to perform TB PPDU transmission on a resource subunit; and when the resource subunit is idle, the second device may perform transmission of the TB PPDU on the resource subunit. In this way, the first device performs transmission on the some of the N resource subunits, thereby improving spectral utilization. For example, one of the N resource subunits is an RU smaller than 996 tones or an MRU smaller than 996 tones, and the first indication information indicates that the second device is allowed to perform TB PPDU transmission on the resource subunit. When the resource subunit is idle, the second device may perform transmission on the resource subunit. In this way, the first device performs transmission on the some of the N resource subunits, thereby improving spectral utilization. For example, there is no MU-MIMO transmission on the N resource subunits, and the first indication information separately indicates that the first device is allowed to perform TB PPDU transmission on each of the N resource subunits when the first device performs TB PPDU transmission by using the some of the N resource subunits. In this case, when any resource subunit in the N resource subunits is idle, the second device may perform TB PPDU transmission on the any resource subunit. In this way, the first device performs transmission on the some of the N resource subunits, thereby improving spectral utilization.

Figure 15:
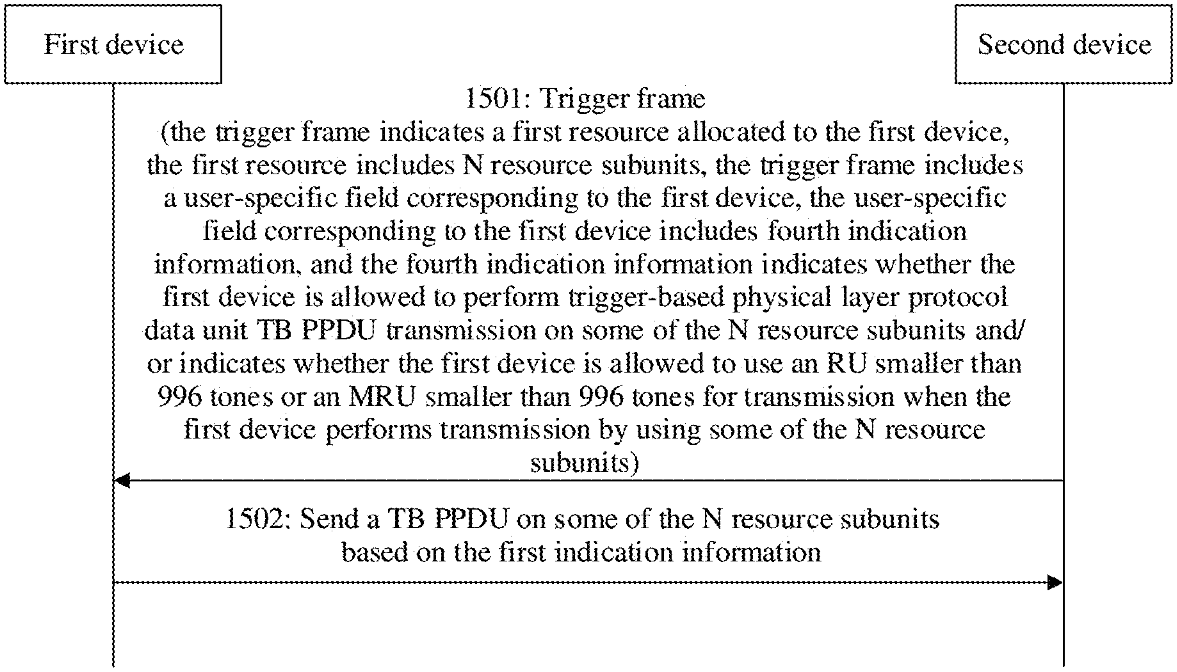
FIG. 15 is another schematic flowchart of an example PPDU transmission method according to an embodiment of this application.

FIG. 15 is another schematic diagram of an embodiment of a PPDU transmission method according to an embodiment of this application. As shown in FIG. 15, the PPDU transmission method includes the following steps.

1501: A second device sends a trigger frame to a first device, where the trigger frame indicates a first resource allocated to the first device, the first resource includes N resource subunits, the trigger frame includes a user-specific field corresponding to the first device, the user-specific field corresponding to the first device includes fourth indication information, and the fourth indication information indicates whether the first device is allowed to perform TB PPDU transmission on some of the N resource subunits and/or indicates whether the first device is allowed to use an RU smaller than 996 tones or an MRU smaller than 996 tones for transmission when the first device performs transmission by using some of the N resource subunits. Correspondingly, the first device receives the trigger frame from the second device.

N is an integer greater than or equal to 1. For related descriptions of the N resource subunits, refer to related descriptions of the embodiment shown in FIG. 12.

Specifically, the second device separately indicates, by using each user-specific field in the trigger frame, whether a device corresponding to the user-specific field is allowed to perform TB PPDU transmission on some of the N resource subunits, and/or whether the device corresponding to the user-specific field is allowed to use an RU smaller than 996 tones or an MRU smaller than 996 tones for transmission when the device corresponding to the user-specific field performs transmission by using some of resource subunits that are allocated to the device corresponding to the user-specific field.

Optionally, the fourth indication information may be a user-specific field b25 of the trigger frame and some or all bits in trigger-dependent user information of a user-specific field (including a special user-specific field) shown in FIG. 13A and FIG. 13B. For example, some or all of these bits may be used to carry the fourth indication information.

The following describes a process of indication of the fourth indication information.

Optionally, if there is no MU-MIMO transmission on the N resource subunits, the fourth indication information indicates that the first device is allowed to perform TB PPDU transmission on some of the N resource subunits. It is assumed that, at least two devices are scheduled in at least one second frequency-domain subblock in a first frequency-domain subblock in which at least one of the N resource subunits is located, and RUs or MRUs allocated to the at least two devices correspond to different frequency ranges, where the first frequency-domain subblock includes at least one second frequency-domain subblock, and a bandwidth of each second frequency-domain subblock is 80 MHz. Therefore, it can be learned that the RUs or MRUs allocated to the at least two devices are RUs smaller than 996 tones or MRUs smaller than 996 tones. In this case, the fourth indication information further indicates that the first device is not allowed to use an RU smaller than 996 tones or an MRU smaller than 996 tones for transmission. For related descriptions of the first frequency-domain subblock and the second frequency-domain subblock, refer to related descriptions of the embodiment shown in FIG. 12.

For example, the N resource subunits include a 996+484-tone MRU. There is no MU-MIMO transmission on the 996+484-tone MRU. A 996-tone RU in the 996+484-tone MRU is located in a $1^{st}$ second frequency-domain subblock, a 484-tone RU in the 996+484-tone MRU is located in a $2^{nd}$ second frequency-domain subblock, and a bandwidth of each second frequency-domain subblock is 80 MHz. The 484-tone RU in the 996+484-tone MRU is a $1^{st}$ 484-tone RU in the $2^{nd}$ second frequency-domain subblock, and a $2^{nd}$ 484-tone RU in the $2^{nd}$ second frequency-domain subblock is allocated to a STA 2. To ensure that values of U-SIGs sent by different STAs are the same, a STA 1 (namely, the first device) cannot perform transmission on the $1^{st}$ 484-tone RU, and the STA 2 cannot perform transmission on the $2^{nd}$ 484-tone RU. Therefore, the fourth indication information indicates that the first device is allowed to perform TB PPDU transmission on some of the N resource subunits, and indicates that the first device is not allowed to use an RU smaller than 996 tones or an MRU smaller than 996 tones for transmission when the first device performs transmission by using some of the N resource subunits.

In some implementations, if there is MU-MIMO transmission on the N resource subunits, the fourth indication information indicates that the first device is not allowed to perform TB PPDU transmission on some of the N resource subunits. Optionally, the fourth indication information indicates that the first device is not allowed to use an RU smaller than 996 tones or an MRU smaller than 996 tones for transmission when the first device performs transmission by using some of the N resource subunits.

For example, the N resource subunits include a 996+484-tone MRU, and there is MU-MIMO transmission on the 996+484-tone MRU. In this case, the fourth indication information indicates that the first device is not allowed to perform TB PPDU transmission on some of the N resource subunits.

The following describes several possible indication manners of the fourth indication information.

Indication manner 1: The fourth indication information includes a first bit and a second bit. The first bit indicates whether the first device is allowed to perform TB PPDU transmission on some of the N resource subunits. The second bit indicates whether the first device is allowed to use an RU smaller than 996 tones or an MRU smaller than 996 tones for transmission when the first device performs transmission by using some of the N resource subunits.

In the indication manner 1, the second device separately indicates, by using two bits in each user-specific field in the trigger frame, whether the first device is allowed to perform TB PPDU transmission on some of the N resource subunits, and whether the first device is allowed to use an RU smaller than 996 tones or an MRU smaller than 996 tones for transmission when the first device performs transmission by using some of the N resource subunits.

For example, the first bit is “1”, representing that the first device is allowed to perform TB PPDU transmission on some of the N resource subunits; or the first bit is “0”, representing that the first device is not allowed to perform TB PPDU transmission on some of the N resource subunits.

For example, the second bit is “1”, representing that the first device is allowed to use an RU smaller than 996 tones or an MRU smaller than 996 tones for transmission when the first device performs transmission by using some of the N resource subunits; or the second bit is “0”, representing that the first device is not allowed to use an RU smaller than 996 tones or an MRU smaller than 996 tones for transmission when the first device performs transmission by using some of the N resource subunits.

In the foregoing indication manner 1, the first device may determine, based on the first bit, whether the first device is allowed to perform TB PPDU transmission on some of the N resource subunits. However, the first device cannot learn, based on the first bit, whether the first device is allowed to use an RU smaller than 996 tones or an MRU smaller than 996 tones for transmission when the first device performs transmission by using some of the N resource subunits. For example, the first bit indicates that the first device is allowed to perform TB PPDU transmission on some of the N resource subunits. Specifically, there are the following two possible cases.

1. The first device is allowed to perform TB PPDU transmission on some of the N resource subunits, but the first device is not allowed to use an RU smaller than 996 tones or an MRU smaller than 996 tones for transmission when the first device performs transmission by using some of the N resource subunits.

2. The first device is allowed to perform TB PPDU transmission on some of the N resource subunits, and the first device is allowed to use an RU smaller than 996 tones or an MRU smaller than 996 tones for transmission when the first device performs transmission by using some of the N resource subunits.

Therefore, the first device may further determine, with reference to the second bit, whether the first device is allowed to use an RU smaller than 996 tones or an MRU smaller than 996 tones for transmission when the first device performs transmission by using some of the N resource subunits.

Indication manner 2: The fourth indication information includes a first bit sequence, and the first bit sequence indicates any one of the following:

the first device is not allowed to perform TB PPDU transmission on some of the N resource subunits; or the first device is allowed to perform TB PPDU transmission on some of the N resource subunits, but the first device is not allowed to use an RU smaller than 996 tones or an MRU smaller than 996 tones for transmission when the first device performs transmission by using some of the N resource subunits; or the first device is allowed to perform TB PPDU transmission on some of the N resource subunits, and the first device is allowed to use an RU smaller than 996 tones or an MRU smaller than 996 tones for transmission when the first device performs transmission by using some of the N resource subunits.

For example, the first bit sequence includes two bits, and the first bit sequence is “00”, representing that the first device is not allowed to perform TB PPDU transmission on some of the N resource subunits; or the first bit sequence is “01”, representing that the first device is allowed to perform TB PPDU transmission on some of the N resource subunits, but the first device is not allowed to use an RU smaller than 996 tones or an MRU smaller than 996 tones for transmission when the first device performs transmission by using some of the N resource subunits; or the first bit sequence is “10”, representing that the first device is allowed to perform TB PPDU transmission on some of the N resource subunits, and the first device is allowed to use an RU smaller than 996 tones or an MRU smaller than 996 tones for transmission.

Indication manner 3: If the first device is not allowed to use an RU smaller than 996 tones or an MRU smaller than 996 tones for transmission when the first device performs transmission by using some of the N resource subunits, the fourth indication information includes a third bit, where the third bit indicates whether the first device is allowed to perform TB PPDU transmission on some of the N resource subunits.

In the indication manner 3, each user-specific field in the trigger frame has one bit to indicate whether the first device is allowed to perform TB PPDU transmission on some of the N resource subunits.

Indication manner 4: If the second device ensures that only one device is scheduled in each 80 MHz bandwidth included in the TB PPDU bandwidth, the fourth indication information includes a fourth bit, where the fourth bit indicates that the first device is allowed to perform TB PPDU transmission on some of the N resource subunits. In the indication manner 4, each user-specific field in the trigger frame has one bit to indicate that the first device is allowed to perform TB PPDU transmission on some of the N resource subunits.

In the indication manner 4, the first device may use an RU smaller than 996 tones or an MRU smaller than 996 tones for transmission when the first device performs transmission by using some of the N resource subunits. The TB PPDU bandwidth is a bandwidth used by the second device to schedule the first device.

1502: The first device sends a TB PPDU to the second device on some of the N resource subunits based on the fourth indication information.

Specifically, the first device determines, based on the fourth indication information, that the first device is allowed to perform TB PPDU transmission on some of the N resource subunits, and that the first device is allowed to use an RU smaller than 996 tones or an MRU smaller than 996 tones for transmission when the first device performs transmission by using some of the N resource subunits. For example, one of the N resource subunits includes at least one RU or MRU. The first device determines whether each of the at least one RU or MRU is idle, and the first device performs TB PPDU transmission on an idle RU or MRU in the at least one RU or MRU. This is similar for another resource subunit.

For example, the first resource includes a 996+484+242-tone MRU, the first resource includes two resource subunits, a $1^{st}$ resource subunit is a 996-tone RU in a 996+484-tone RU, and a $2^{nd}$ resource subunit is a 484-tone RU and a 242-tone RU in the 996+484-tone RU. The first device determines, based on the fourth indication information, that the first device is allowed to perform TB PPDU transmission on some of the N resource subunits, and that the first device is allowed to use an RU smaller than 996 tones or an MRU smaller than 996 tones for transmission when the first device performs transmission by using some of the N resource subunits. When the 996-tone RU in the 996+484+242-tone MRU is idle, the 484-tone RU in the 996+484+242-tone MRU is busy, and the 242-tone RU in the 996+484+242-tone MRU is idle, the first device may perform transmission on the 996-tone RU and the 242-tone RU in the 996+484+242-tone MRU, but not on the 484-tone RU in the 996+484+242-tone MRU.

It needs to be noted that, if the fourth indication information in the step 1501 separately indicates that the first device is not allowed to perform TB PPDU transmission on some of the N resource subunits and that the first device is not allowed to use an RU smaller than 996 tones or an MRU smaller than 996 tones for transmission when the first device performs transmission by using some of the N resource subunits, the first device may determine whether each 20 MHz subchannel in a frequency range corresponding to the first resource is idle: If yes, the first device sends the TB PPDU to the second device on the first resource; or if no, the first device does not perform transmission on the first resource, that is, does not send the TB PPDU.

Optionally, in the step 1502, the TB PPDU may be an EHT TB PPDU.

In some implementations, the TB PPDU includes indication information, where the indication information indicates a transmission status of the first device on the first resource. For an indication manner of the indication information, a location of the indication information in the TB PPDU, and relationships between values of bits in the indication information and bits in the U-SIG Disregard and Validate field in the trigger frame, refer to related descriptions in the embodiment shown in FIG. 12.

It needs to be noted that, if the first device determines, based on the fourth indication information and busy/idle conditions of RUs or MRUs included in the first resource, not to perform transmission on the first resource, the first device does not send the TB PPDU.

In this embodiment of this application, the first device receives the trigger frame from the second device, where the trigger frame indicates the first resource allocated to the first device, the first resource includes the N resource subunits, the trigger frame includes the user-specific field corresponding to the first device, the user-specific field corresponding to the first device includes the fourth indication information, and the fourth indication information indicates whether the first device is allowed to perform TB PPDU transmission on some of the N resource subunits and/or indicates whether the first device is allowed to use an RU smaller than 996 tones or an MRU smaller than 996 tones for transmission when the first device performs transmission by using some of the N resource subunits. The first device sends the TB PPDU to the second device on some of the N resource subunits based on the fourth indication information. It can be learned that, in the technical solution of this application, the first device sends the TB PPDU to the second device on some of the N resource subunits based on the fourth indication information. In other words, the second device indicates, by using the fourth indication information, that the first device is allowed to perform TB PPDU transmission on some of the N resource subunits, and/or that the first device is allowed to use an RU smaller than 996 tones or an MRU smaller than 996 tones for transmission when the first device performs transmission by using some of the N resource subunits. In this way, the first device may perform transmission on some of the N resource subunits, thereby improving spectral utilization. For example, one of the N resource subunits is an RU smaller than 996 tones or an MRU smaller than 996 tones, and the fourth indication information indicates that the first device is allowed to perform TB PPDU transmission on some of the N resource subunits, and indicates that the first device is allowed to use an RU smaller than 996 tones or an MRU smaller than 996 tones for transmission when the first device performs transmission by using some of the N resource subunits. When the resource subunit is idle, the second device may perform transmission on the resource subunit. In this way, the second device may perform transmission on some of the N resource subunits, thereby improving spectral utilization. For example, there is no MU-MIMO transmission on the N resource subunits, and the fourth indication information indicates that the first device is allowed to perform TB PPDU transmission on some of the N resource subunits, and indicates that the first device is allowed to use an RU smaller than 996 tones or an MRU smaller than 996 tones for transmission when the first device performs transmission by using some of the N resource subunits. In this case, when any resource subunit in the N resource subunits is idle, the second device may perform TB PPDU transmission on the any resource subunit. In this way, the second device may perform transmission on some of the N resource subunits, thereby improving spectral utilization.

Figure 16:
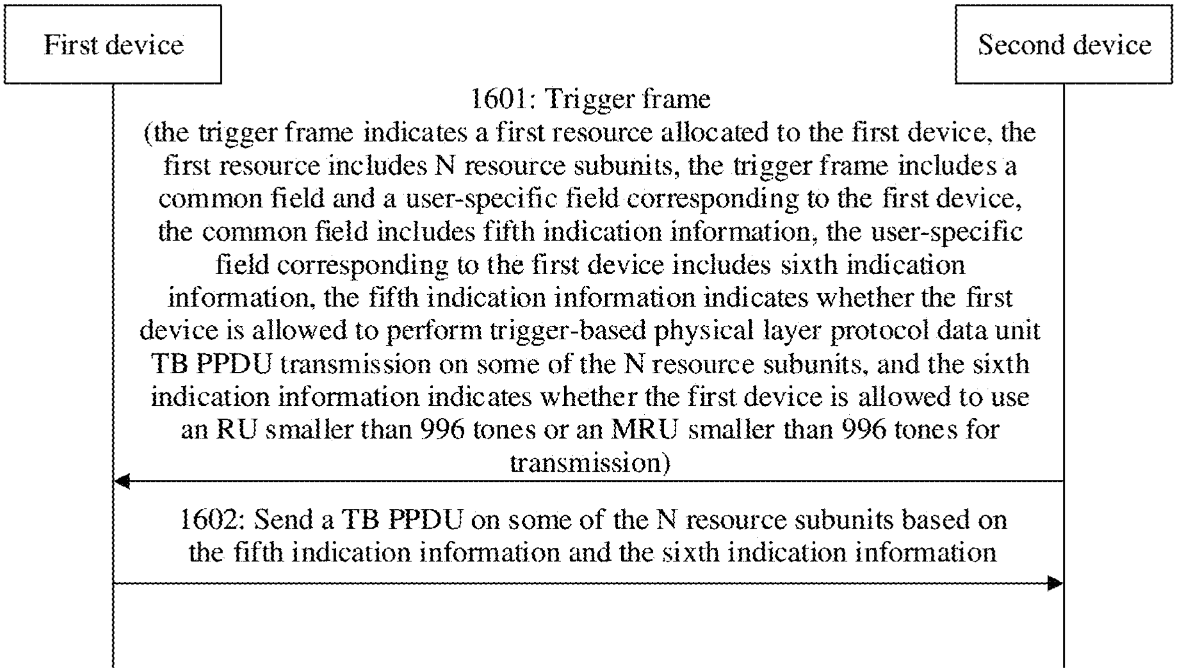
FIG. 16 is still another schematic flowchart of an example PPDU transmission method according to an embodiment of this application.

FIG. 16 is still another schematic diagram of an embodiment of a PPDU transmission method according to an embodiment of this application. As shown in FIG. 16, the PPDU transmission method includes the following steps.

1601: A second device sends a trigger frame to a first device, where the trigger frame indicates a first resource allocated to the first device, the first resource includes N resource subunits, the trigger frame includes a common field and a user-specific field corresponding to the first device, the common field includes fifth indication information, the user-specific field corresponding to the first device includes sixth indication information, the fifth indication information indicates whether the first device is allowed to perform TB PPDU transmission on some of the N resource subunits, and the sixth indication information indicates whether the first device is allowed to use an RU smaller than 996 tones or an MRU smaller than 996 tones for transmission when the first device performs transmission by using some of the N resource subunits. Correspondingly, the first device receives the trigger frame from the second device.

N is an integer greater than or equal to 1. For related descriptions of the N resource subunits, refer to related descriptions of the embodiment shown in FIG. 12.

For example, the second device is an AP, and the first device is a STA 1. The AP allocates resources to a plurality of STAs (including the STA 1) by using the trigger frame. If resources allocated to any two of the plurality of STAs are not shared (that is, there is no MU-MIMO transmission on the resources allocated to the any two STAs), the AP may indicate, by using the fifth indication information in the common field, that the first device is allowed to perform TB PPDU transmission on some of the N resource subunits; or if resources allocated to any two of the plurality of STAs are the same (that is, there is MU-MIMO transmission on the resources allocated to the any two STAs), the AP may indicate, by using the fifth indication information in the common field, that the first device is not allowed to perform TB PPDU transmission on some of the N resource subunits.

In some implementations, if the fifth indication information indicates that the first device is not allowed to perform TB PPDU transmission on some of the N resource subunits, the sixth indication information indicates that the first device is not allowed to use an RU smaller than 996 tones or an MRU smaller than 996 tones for transmission when the first device performs transmission by using some of the N resource subunits.

In another possible implementation, the fifth indication information indicates that the first device is allowed to perform TB PPDU transmission on some of the N resource subunits. It is assumed that, at least two devices are scheduled in at least one second frequency-domain subblock in a first frequency-domain subblock in which at least one of the N resource subunits is located, and RUs or MRUs allocated to the at least two devices correspond to different frequency ranges, where a bandwidth of the second frequency-domain subblock is 80 MHz. Therefore, it can be learned that the RUs or MRUs allocated to the at least two devices are RUs smaller than 996 tones or MRUs smaller than 996 tones. In this case, the sixth indication information indicates that the first device is not allowed to use an RU smaller than 996 tones or an MRU smaller than 996 tones for transmission.

1602: The first device sends a TB PPDU to the second device on some of the N resource subunits based on the fifth indication information and the sixth indication information.

Specifically, the first device determines, based on the fifth indication information and the sixth indication information, that the first device is allowed to perform transmission by using some of the N resource subunits and that the first device is allowed to use an RU smaller than 996 tones or an MRU smaller than 996 tones for transmission when the first device performs transmission by using some of the N resource subunits. For example, one of the N resource subunits includes at least one RU or MRU. The first device determines whether each of the at least one RU or MRU is idle, and the first device performs TB PPDU transmission on an idle RU or MRU in the at least one RU or MRU. This is similar for another resource subunit.

Optionally, in the step 1602, the TB PPDU may be an EHT TB PPDU.

In some implementations, the TB PPDU includes indication information, where the indication information indicates a transmission status of the first device on the first resource. For an indication manner of the indication information, a location of the indication information in the TB PPDU, and relationships between values of bits in the indication information and bits in the U-SIG Disregard and Validate field in the trigger frame, refer to related descriptions in the embodiment shown in FIG. 12.

In this embodiment of this application, the first device receives the trigger frame from the second device, where the trigger frame indicates the first resource allocated to the first device, the first resource includes the N resource subunits, the trigger frame includes the common field and the user-specific field corresponding to the first device, the common field includes the fifth indication information, the user-specific field corresponding to the first device includes the sixth indication information, the fifth indication information indicates whether the first device is allowed to perform TB PPDU transmission on some of the N resource subunits, and the sixth indication information indicates whether the first device is allowed to use an RU smaller than 996 tones or an MRU smaller than 996 tones for transmission when the first device performs transmission by using some of the N resource subunits; and the first device sends the TB PPDU to the second device on some of the N resource subunits based on the fifth indication information and the sixth indication information. It can be learned that, in the technical solution of this application, the first device sends the TB PPDU to the second device on some of the N resource subunits based on the fifth indication information. In other words, the second device indicates, by using the fifth indication information, that the first device is allowed to perform TB PPDU transmission on some of the N resource subunits; and/or indicates that the first device is allowed to use an RU smaller than 996 tones or an MRU smaller than 996 tones for transmission when the first device performs transmission by using some of the N resource subunits. In this way, the second device may perform transmission on some of the N resource subunits, thereby improving spectral utilization.

This application further provides some possible implementations in which the first device determines whether an RU smaller than 996 tones or an MRU smaller than 996 tones included in the N resource subunits can be used for transmission. The following provides descriptions with reference to the embodiments shown in FIG. 17 to FIG. 20.

Figure 17:
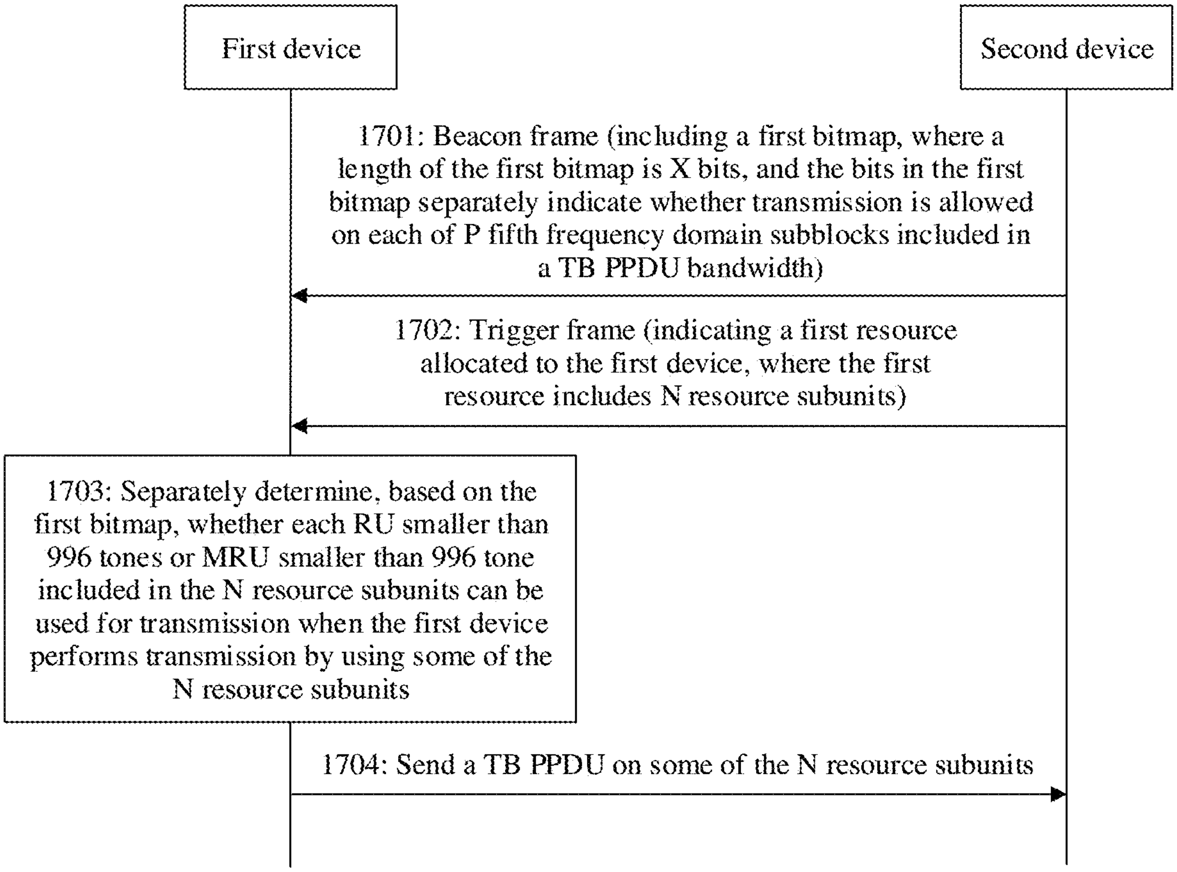
FIG. 17 is yet another schematic flowchart of an example PPDU transmission method according to an embodiment of this application.

FIG. 17 is yet another schematic diagram of an embodiment of a PPDU transmission method according to an embodiment of this application. As shown in FIG. 17, the PPDU transmission method includes the following steps.

1701: A first device receives a beacon frame from a second device, where the beacon frame includes a first bitmap, a length of the first bitmap is X bits, the bits in the first bitmap separately indicate whether transmission is allowed on each of P fifth frequency-domain subblocks included in a TB PPDU bandwidth; and correspondingly, the second device receives the beacon frame from the first device.

The TB PPDU bandwidth is a bandwidth used by the second device to schedule the first device. A bandwidth of each of the P fifth frequency-domain subblocks is 20 MHz. X is an integer greater than or equal to 1, P is greater than or equal to 1 and less than or equal to X, and X is an integer greater than or equal to 1.

Optionally, X may be a preset quantity of fifth frequency-domain subblocks included in a maximum TB PPDU bandwidth. The preset maximum TB PPDU bandwidth is a maximum bandwidth used by an AP to schedule a STA as specified in the 802.11be standard.

For example, the preset maximum TB PPDU bandwidth may be 320 MHz, and then the length of the first bitmap may be 16 bits. When the TB PPDU bandwidth is the preset maximum TB PPDU bandwidth, P is equal to 16.

In some embodiments, the bits in the first bitmap may indicate, in ascending order or descending order of frequencies of N fifth frequency-domain subblocks included in the TB PPDU bandwidth, whether transmission is allowed on each of the N fifth frequency-domain subblocks included in the TB PPDU bandwidth.

Specifically, the first device periodically sends a beacon frame, where the beacon frame includes the bitmap. If the beacon frame indicates that a fifth frequency-domain subblock (namely, a 20 MHz subchannel) is not allowed for transmission, the fifth frequency-domain subblock is punctured in a next beacon interval, that is, the fifth frequency-domain subblock is not to be allocated to any STA.

1702: The first device receives a trigger frame from the second device, where the trigger frame indicates a first resource allocated to the first device, and the first resource includes N resource subunits.

N is an integer greater than or equal to 1, the N resource subunits include at least one RU or MRU, the at least one RU or MRU is located in M second frequency-domain subblocks, M is greater than or equal to 1 and less than or equal to a quantity of second frequency-domain subblocks included in the TB PPDU bandwidth, the TB PPDU bandwidth is a bandwidth used by the second device to schedule the first device, and a bandwidth of the second frequency-domain subblock is 80 MHz. For more descriptions of the N resource subunits, refer to related descriptions of the embodiment shown in FIG. 12.

The at least one RU or MRU includes at least one RU smaller than 996 tones or MRU smaller than 996 tones.

1703: The first device separately determines, based on the first bitmap, whether each of the at least one RU smaller than 996 tones or MRU smaller than 996 tones included in the N resource subunits can be used for transmission when the first device performs transmission by using some of the N resource subunits.

The following describes the step 1703 by using an example in which the first device determines whether at least one RU smaller than 996 tones or MRU smaller than 996 tones allocated to the first device in an $i^{th}$ second frequency-domain subblock in the M second frequency-domain subblocks can be used for transmission. A process of determining whether an RU smaller than 996 tones or an MRU smaller than 996 tones allocated to the first device in another second frequency-domain subblock can be used for transmission is similar.

Optionally, if a first condition is met, the first device determines that the at least one RU smaller than 996 tones or MRU smaller than 996 tones allocated to the first device in the $i^{th}$ second frequency-domain subblock can be used for transmission when the first device performs transmission by using some of the N resource subunits; or if a second condition is met, the first device determines that the at least one RU smaller than 996 tones or MRU smaller than 996 tones allocated to the first device in the $i^{th}$ second frequency-domain subblock cannot be used for transmission when the first device performs transmission by using some of the N resource subunits.

Herein, i is an integer greater than or equal to 1 and less than or equal to M.

The first condition includes: In the $i^{th}$ second frequency-domain subblock, no RU or MRU is allocated except the at least one RU smaller than 996 tones or MRU smaller than 996 tones allocated to the first device, and the second device allows the first device to perform transmission on some of the N resource subunits.

The first device determines, based on the beacon frame, that in a specific 80 MHz bandwidth, transmission is not allowed on a 20 MHz subchannel corresponding to an RU or MRU other than the RU smaller than 996 tones or MRU smaller than 996 tones allocated to the first device. In a next beacon interval, the 20 MHz subchannel corresponding to the another RU or MRU is punctured, that is, not to be allocated to any device. In other words, the first device determines, based on the beacon frame, that in a specific 80 MHz bandwidth, an RU or MRU, other than the RU smaller than 996 tones or MRU smaller than 996 tones allocated to the first device, is not allocated to another device. Therefore, if the second device allows the first device to perform transmission on some of the N resource subunits, the first device determines that the RU smaller than 996 tones or MRU smaller than 996 tones can be used for transmission when the first device performs transmission by using some of the N resource subunits.

The second condition includes: In the $i^{th}$ second frequency-domain subblock, an RU or MRU, other than the RU smaller than 996 tones or MRU smaller than 996 tones allocated to the first device, is allocated to a third device; or the first device cannot determine whether an RU or MRU, other than the RU smaller than 996 tones or MRU smaller than 996 tones allocated to the first device, in the second frequency-domain subblock is allocated to a third device.

When the second condition is met, even if the second device allows the first device to perform transmission on some of the N resource subunits, the first device cannot perform transmission by using the at least one RU smaller than 996 tones or MRU smaller than 996 tones allocated to the first device in the $i^{th}$ second frequency-domain subblock. The third device herein may be understood as another device instead of the first device, for example, another STA.

1704: The first device sends a TB PPDU to the second device on some of the N resource subunits, where the some resource subunits include an idle RU smaller than 996 tones or an idle MRU smaller than 996 tones that can be used for transmission.

If a specific RU smaller than 996 tones or MRU smaller than 996 tones can be used for transmission and the RU smaller than 996 tones or MRU smaller than 996 tones is idle, the first device may send the TB PPDU on the RU smaller than 996 tones or MRU smaller than 996 tones.

In the solution shown in FIG. 17, the trigger frame sent by the second device to the first device does not need to carry indication information that indicates whether the first device is allowed to use an RU smaller than 996 tones or an MRU smaller than 996 tones for TB PPDU transmission when the first device performs transmission by using some of the N resource subunits.

Figure 18:
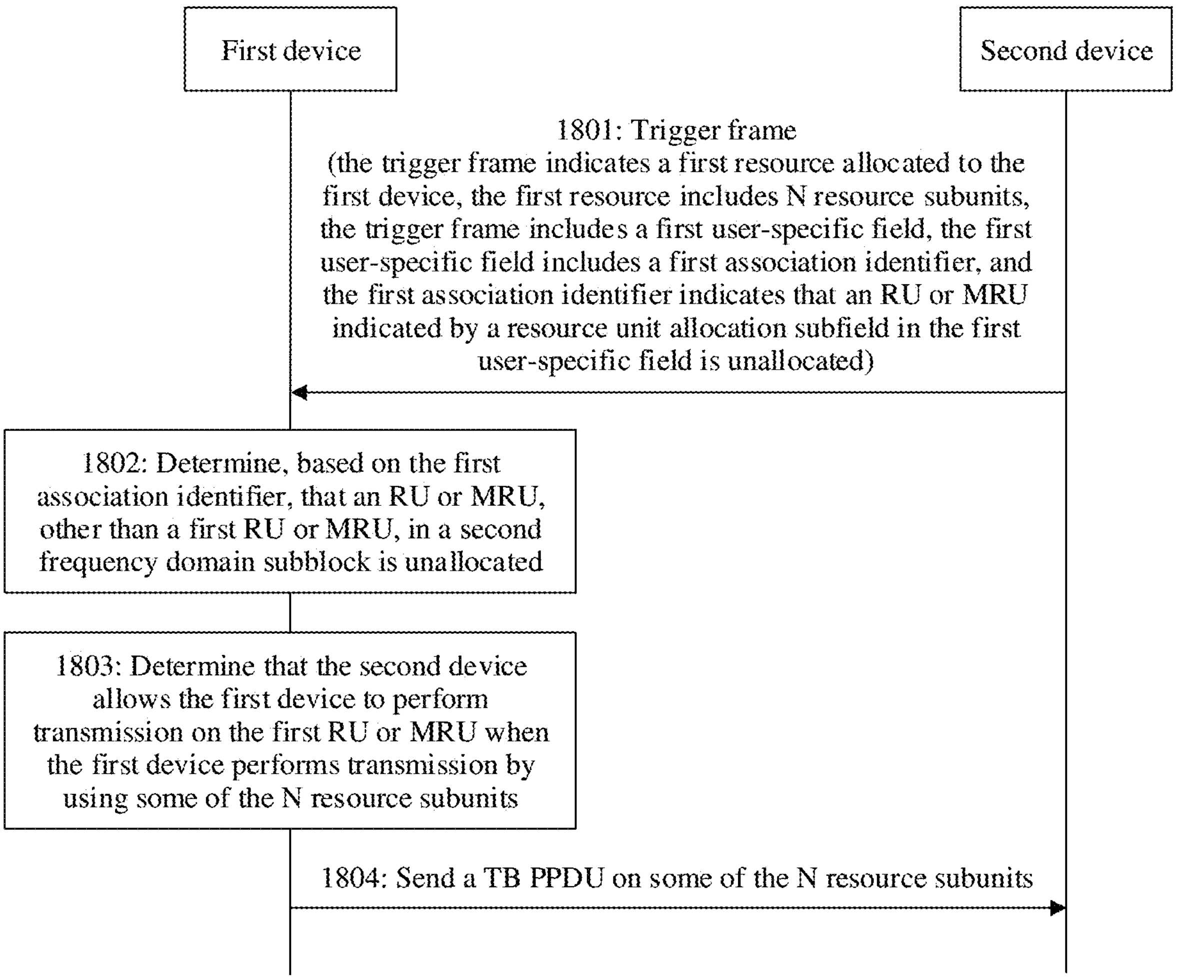
FIG. 18 is still yet another schematic flowchart of an example PPDU transmission method according to an embodiment of this application.

FIG. 18 is still yet another schematic diagram of an embodiment of a PPDU transmission method according to an embodiment of this application. As shown in FIG. 18, the PPDU transmission method includes the following steps.

1801: A first device receives a trigger frame from a second device, where the trigger frame indicates a first resource allocated to the first device, the first resource includes N resource subunits, the trigger frame includes a first user-specific field, the first user-specific field includes a first association identifier, and the first association identifier indicates that an RU or MRU indicated by a resource unit allocation subfield in the first user-specific field is unallocated.

The N resource subunits include at least one RU or MRU. For related descriptions of the N resource subunits, refer to related descriptions of the embodiment shown in FIG. 12. The at least one RU or MRU includes a first RU or MRU. The first RU or MRU is an RU or MRU smaller than 996 tones, the first RU or MRU is located in a second frequency-domain subblock, and a bandwidth of the second frequency-domain subblock is 80 MHz.

Figure 19A:
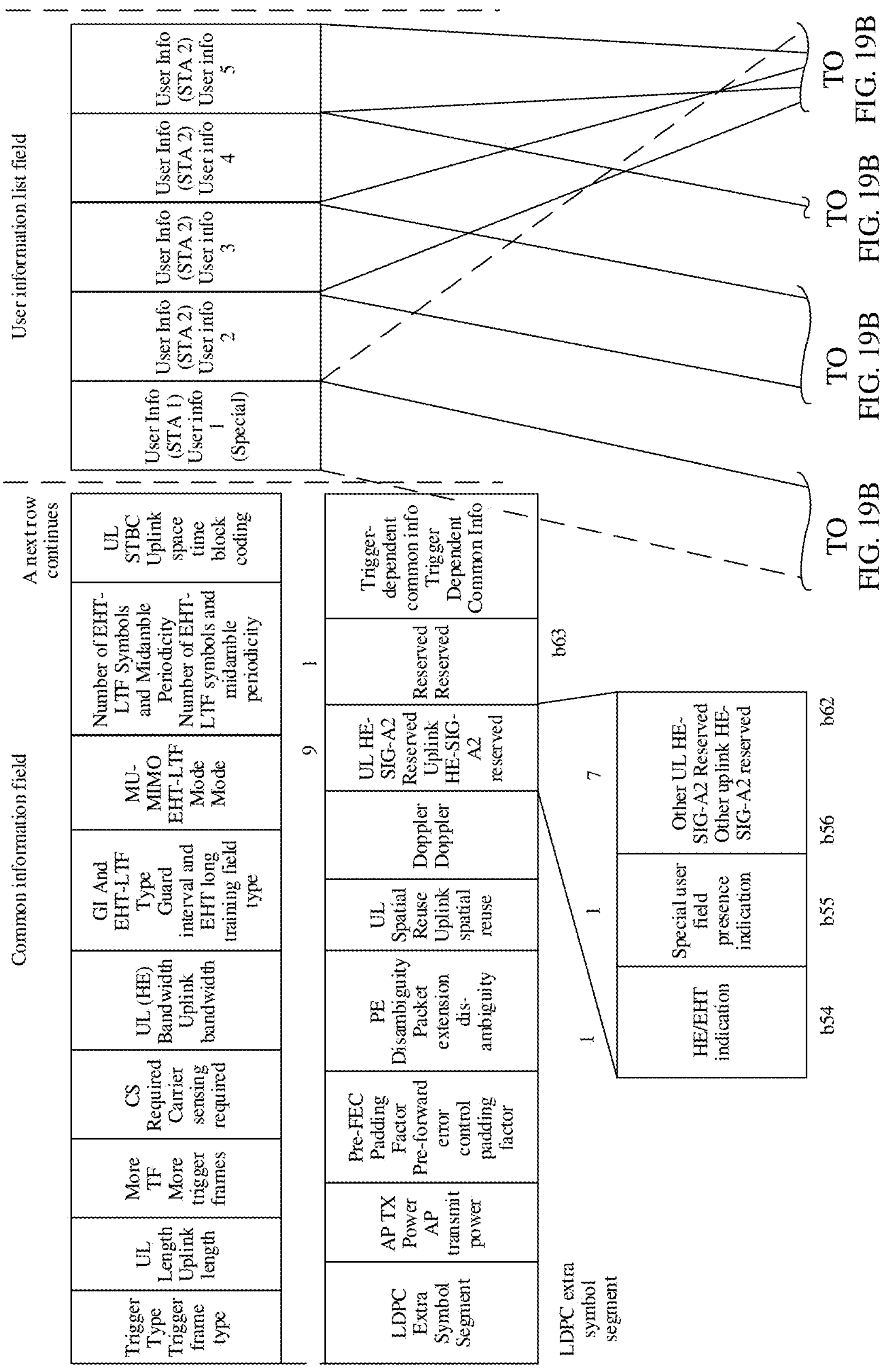
FIG. 19A, FIG. 19B, and FIG. 19C are schematic diagrams of another example frame format of a trigger frame according to an embodiment of this application.
Figure 19B:
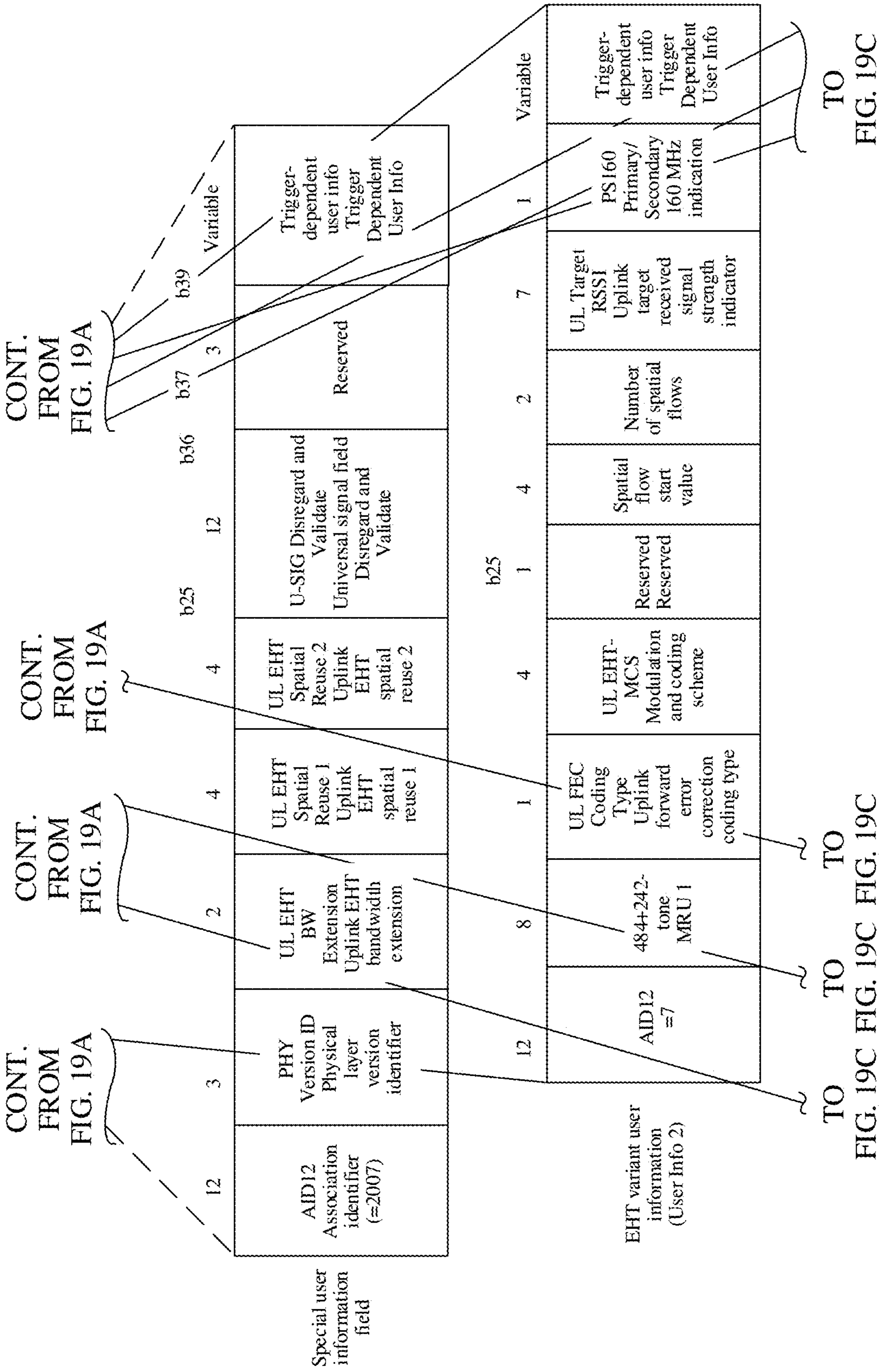
Figure 19C:
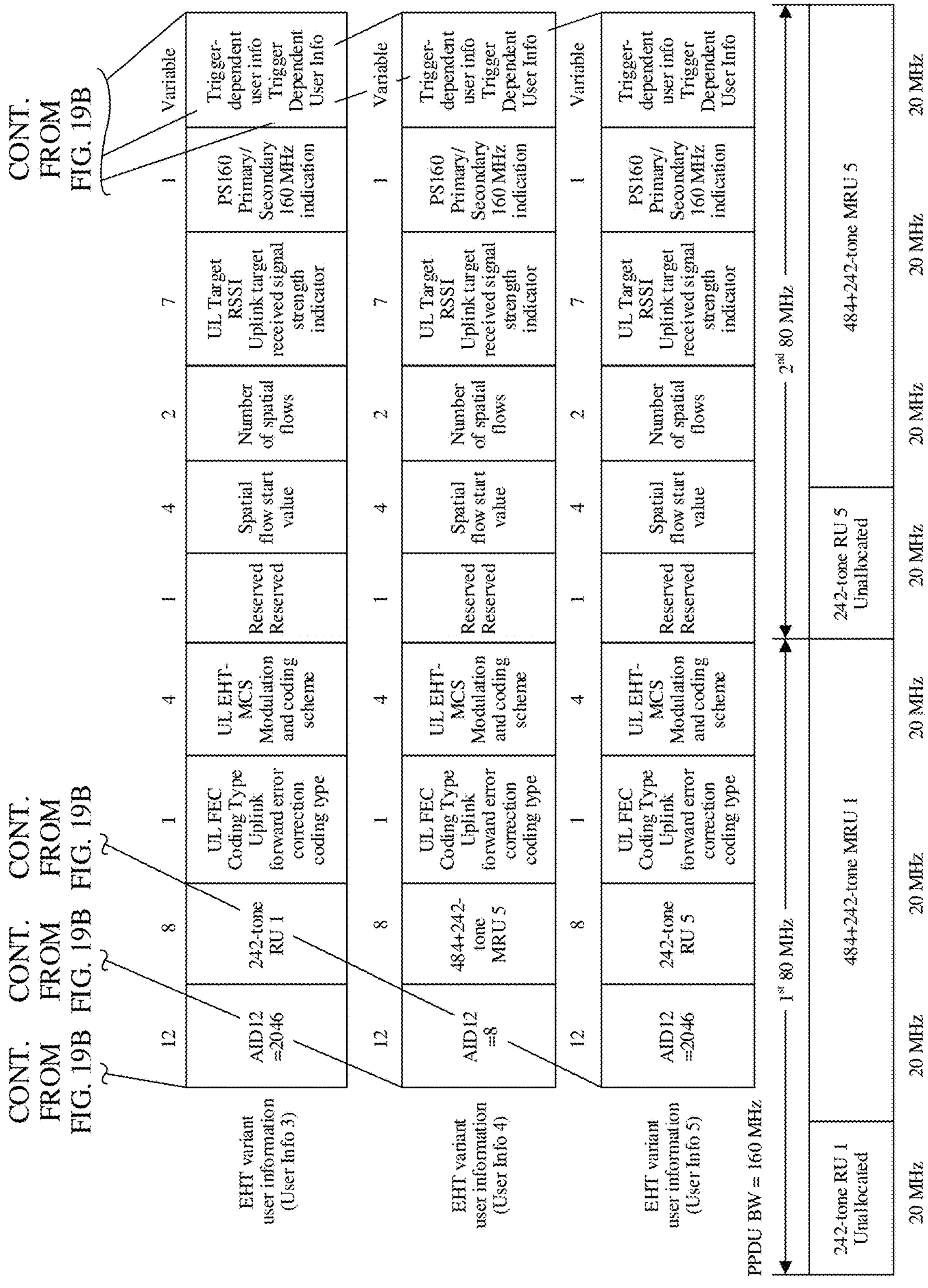

For example, as shown in FIG. 19A, FIG. 19B, and FIG. 19C, the first device corresponds to user information 2, and a 484+242-tone MRU 1 of a $1^{st}$ 80 MHz bandwidth in a TB PPDU bandwidth of 160 MHz is allocated to the first device.

The first RU or MRU is the 484+242-tone MRU 1 of the $1^{st}$ 80 MHz bandwidth. The first user-specific field is an EHT variant user information field of user information 3. It can be learned from FIG. 19A, FIG. 19B, and FIG. 19C that, AID12 is equal to 2046 in the EHT variant user information field of the user information 3, representing that an RU or MRU indicated by a resource unit allocation subfield in the EHT variant user information field of the user information 3 is unallocated, that is, a 242-tone RU 1 is unallocated.

Optionally, the trigger frame further includes a second user-specific field, the second user-specific field includes a second association identifier, and the second association identifier indicates that an RU or MRU indicated by a resource unit allocation subfield in the second user-specific field is unallocated. The following describes the technical solution of this application by using an example in which the trigger frame includes the first user-specific field.

For example, as shown in FIG. 19A, FIG. 19B, and FIG. 19C, the second user-specific field is an EHT variant user information field of user information 5. It can be learned from FIG. 19A, FIG. 19B, and FIG. 19C that, AID12 is equal to 2046 in the EHT variant user information field of the user information 5, representing that an RU or MRU indicated by a resource unit allocation subfield in the EHT variant user information field of the user information 5 is unallocated, that is, a 242-tone RU 5 is unallocated.

1802: The first device determines, based on the first association identifier, that an RU or MRU, other than the first RU or MRU, in the second frequency-domain subblock is unallocated.

The first device determines, based on the first association identifier, that the RU or MRU, other than the first RU or the MRU, in the second frequency-domain subblock belongs to an RU or MRU indicated by a resource unit allocation subfield in a user-specific field corresponding to a third device. Therefore, the first device may determine that each RU or MRU, other than the first RU or MRU allocated to the first device, in the second frequency-domain subblock is unallocated.

For example, as shown in FIG. 19A, FIG. 19B, and FIG. 19C, the first device corresponds to user information 2, and a 484+242-tone MRU 1 of a $1^{st}$ 80 MHz bandwidth in a TB PPDU bandwidth of 160 MHz is allocated to the first device. The first RU or MRU is the 484+242-tone MRU 1 of the $1^{st}$ 80 MHz bandwidth. The first user-specific field is an EHT variant user information field of user information 3. It can be learned from FIG. 19A, FIG. 19B, and FIG. 19C that, AID12 is equal to 2046 in the EHT variant user information field of the user information 3, representing that an RU or MRU indicated by a resource unit allocation subfield in the EHT variant user information field of the user information 3 is unallocated, that is, a 242-tone RU 1 is unallocated. Therefore, the first device may determine, based on AID12=2046 in the EHT variant user information field of the user information 3, that an RU (namely, the 242-tone RU 1 of the $1^{st}$80 MHz bandwidth) other than the 484+242-tone MRU 1 of the $1^{st}$ 80 MHz bandwidth is unallocated.

1803: The first device determines that the first RU or MRU can be used for transmission when the first device performs transmission by using some of the N resource subunits.

It can be learned from the step 1803 that, the first device determines that each RU or MRU, other than the first RU or MRU allocated to the first device, in the second frequency-domain subblock is unallocated. Therefore, the first device determines that the first RU or MRU can be used for transmission when the first device performs transmission by using some of the N resource subunits.

1804: The first device sends a TB PPDU to the first device on some of the N resource subunits, where the some resource subunits include the first RU or MRU.

If the first RU or MRU is idle, the first device may send the TB PPDU on the first RU or MRU.

It needs to be noted that, the embodiment shown in FIG. 18 shows only a process in which the first device determines whether the first RU or MRU can be used for transmission. A process in which the first device determines another RU or MRU smaller than 996 tones allocated to the first device is also applicable.

Figure 20:
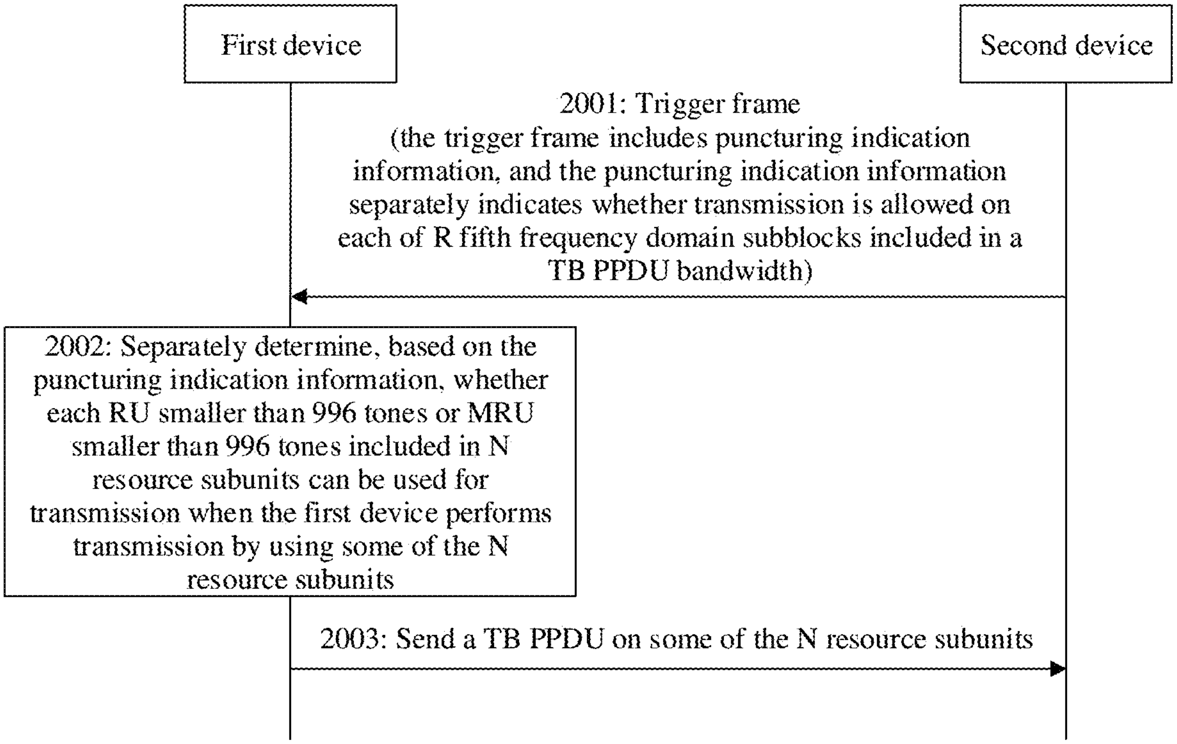
FIG. 20 is a further schematic flowchart of an example PPDU transmission method according to an embodiment of this application.

FIG. 20 is a further schematic diagram of an embodiment of a PPDU transmission method according to an embodiment of this application. As shown in FIG. 20, the PPDU transmission method includes the following steps.

2001: A first device receives a trigger frame from a second device, where the trigger frame includes puncturing indication information, and the puncturing indication information separately indicates whether transmission is allowed on each of R fifth frequency-domain subblocks included in a TB PPDU bandwidth.

The TB PPDU bandwidth may be a bandwidth used by the second device to schedule the first device, or may be a preset maximum TB PPDU bandwidth. A bandwidth of each of the R fifth frequency-domain subblocks is 20 MHz, and R is greater than or equal to 1 and less than or equal to a quantity of the fifth frequency-domain subblocks included in the TB PPDU bandwidth. The preset maximum TB PPDU bandwidth is a maximum bandwidth used by an AP to schedule a STA as specified in a communication standard.

For example, the TB PPDU bandwidth is 320 MHz, and the R fifth frequency-domain subblocks include 16 fifth frequency-domain subblocks. The puncturing indication information may include 16 bits to separately indicate whether transmission is allowed on each of the R fifth frequency-domain subblocks included in the TB PPDU bandwidth.

Optionally, the puncturing indication information may be located in a user-specific field for a special association identifier. For example, the special association identifier is "2043", and the special association identifier is reserved according to a standard and is an association identifier not to be allocated to any device.

The trigger frame indicates a first resource allocated to the first device, the first resource includes N resource subunits, and N is an integer greater than or equal to 1.

The N resource subunits include at least one RU or MRU, the at least one RU or MRU is located in M second frequency-domain subblocks, M is greater than or equal to 1 and less than or equal to a quantity of second frequency-domain subblocks included in the bandwidth that is used by the second device to schedule the first device, and a bandwidth of the second frequency-domain subblock is 80 MHz. For more descriptions of the N resource subunits, refer to related descriptions of the embodiment shown in FIG. 12.

The at least one RU or MRU includes at least one RU smaller than 996 tones or MRU smaller than 996 tones.

2002: The first device separately determines, based on the puncturing indication information, whether the RU smaller than 996 tones or MRU smaller than 996 tones included in the N resource subunits can be used for transmission when the first device performs transmission by using some of the N resource subunits.

The following describes the step 2002 by using an example in which the first device determines whether at least one RU smaller than 996 tones or MRU smaller than 996 tones allocated to the first device in an $i^{th}$ second frequency-domain subblock in the M second frequency-domain subblocks can be used for transmission. A process of determining whether an RU smaller than 996 tones or an MRU smaller than 996 tones allocated to the first device in another second frequency-domain subblock can be used for transmission is similar.

Optionally, if a first condition is met, the first device determines that the at least one RU smaller than 996 tones or MRU smaller than 996 tones allocated to the first device in the $i^{th}$ second frequency-domain subblock can be used for transmission when the first device performs transmission by using some of the N resource subunits.

Herein, i is an integer greater than or equal to 1 and less than or equal to M.

The first condition includes: In the $i^{th}$ second frequency-domain subblock, no RU or MRU is allocated except the at least one RU smaller than 996 tones or MRU smaller than 996 tones allocated to the first device, and the second device allows the first device to perform transmission on some of the N resource subunits.

The first device determines, based on the puncturing indication information, that in a specific 80 MHz bandwidth, transmission is not allowed on any RU other than the at least one RU smaller than 996 tones or MRU smaller than 996 tones allocated to the first device. If the second device allows the first device to perform transmission on some of the N resource subunits, the first device determines that the at least one RU smaller than 996 tones or MRU smaller than 996 tones allocated to the first device in the $i^{th}$ second frequency-domain subblock can be used for transmission when the first device performs transmission by using some of the N resource subunits.

It needs to be noted that, if transmission is allowed on another RU, other than the RU smaller than 996 tones or MRU smaller than 996 tones allocated to the first device, in the $i^{th}$ second frequency-domain subblock, the first device cannot perform TB PPDU transmission by using the at least one RU smaller than 996 tones or MRU smaller than 996 tones allocated to the first device in the $i^{th}$ second frequency-domain subblock, even if the second device allows the first device to perform transmission on some of the N resource subunits.

2003: The first device sends a TB PPDU to the second device on some of the N resource subunits, where the some resource subunits include an idle RU smaller than 996 tones or an idle MRU smaller than 996 tones that can be used for transmission.

If an RU smaller than 996 tones or an MRU smaller than 996 tones can be used for transmission and the RU smaller than 996 tones or MRU smaller than 996 tones is idle, the first device may perform transmission on the RU smaller than 996 tones or MRU smaller than 996 tones.

Figure 21:
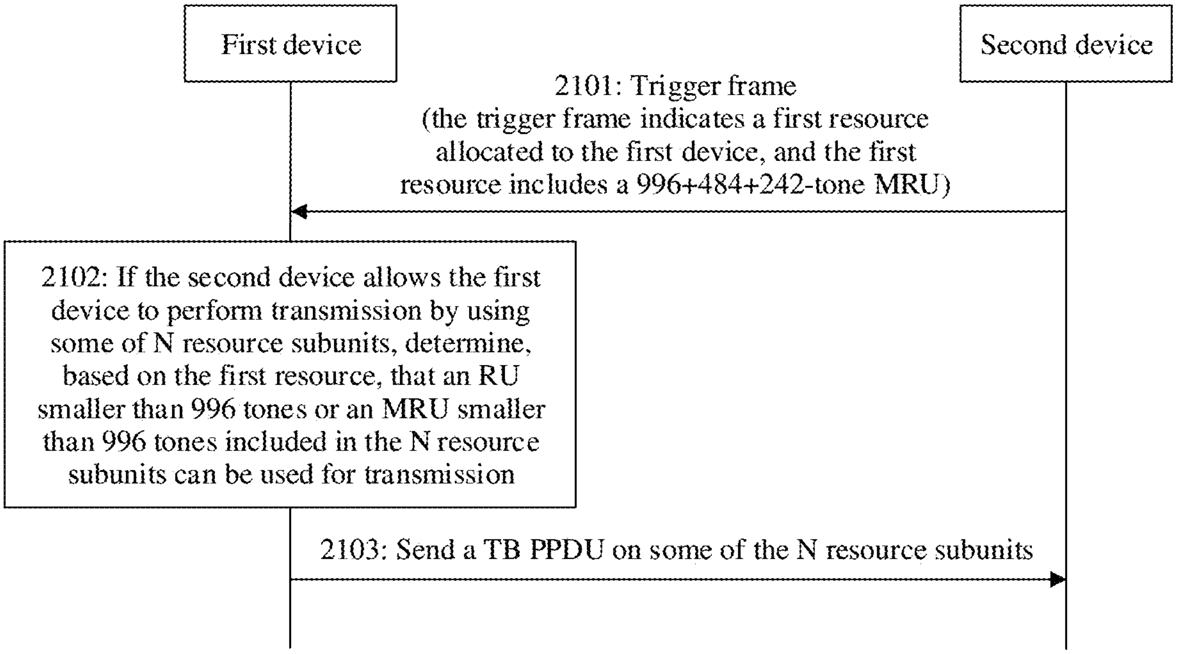
FIG. 21 is a still further schematic flowchart of an example PPDU transmission method according to an embodiment of this application.

FIG. 21 is a still further schematic diagram of an embodiment of a PPDU transmission method according to an embodiment of this application. As shown in FIG. 21, the PPDU transmission method includes the following steps.

2101: A first device receives a trigger frame from a second device, where the trigger frame indicates a first resource allocated to the first device, and the first resource is a 996+484+242-tone MRU.

The first resource may include N resource subunits. For related descriptions of the N resource subunits, refer to related descriptions of the embodiment shown in FIG. 12.

2102: If the second device allows the first device to perform transmission by using some of the N resource subunits, the first device determines, based on the first resource, that an RU smaller than 996 tones or an MRU smaller than 996 tones included in the N resource subunits can be used for transmission when the first device performs transmission by using some of the N resource subunits.

Specifically, currently according to a standard, a 996+484+242-tone MRU is an MRU size that can be used only in non-OFDMA transmission. If a 996+484+242-tone MRU is allocated to the first device in a bandwidth of 160 MHz, this implicitly indicates that the second device does not allocate another RU in the bandwidth of 160 MHz to another device. If the second device allows the first device to perform transmission by using some of the N resource subunits, the second device may determine, based on the first resource, that the first device is allowed by default to use an RU smaller than 996 tones or an MRU smaller than 996 tones for transmission when the first device performs transmission by using some of the N resource subunits.

2103: The first device sends a TB PPDU to the second device on some of the N resource subunits, where the some resource subunits include an idle RU smaller than 996 tones or an idle MRU smaller than 996 tones that can be used for transmission.

If an RU smaller than 996 tones or an MRU smaller than 996 tones can be used for transmission and the RU smaller than 996 tones or MRU smaller than 996 tones is idle, the first device may perform transmission on the RU smaller than 996 tones or MRU smaller than 996 tones.

In the technical solutions shown in FIG. 17, FIG. 18, FIG. 20, and FIG. 21, the first device cannot determine whether there is MU-MIMO transmission on the first resource allocated to the first device. Therefore, in the embodiments shown in FIG. 17, FIG. 18, FIG. 20, and FIG. 21, the second device still needs to indicate, to the first device, whether the first device is allowed to perform transmission on some of the N first resource subunits.

Figure 22:
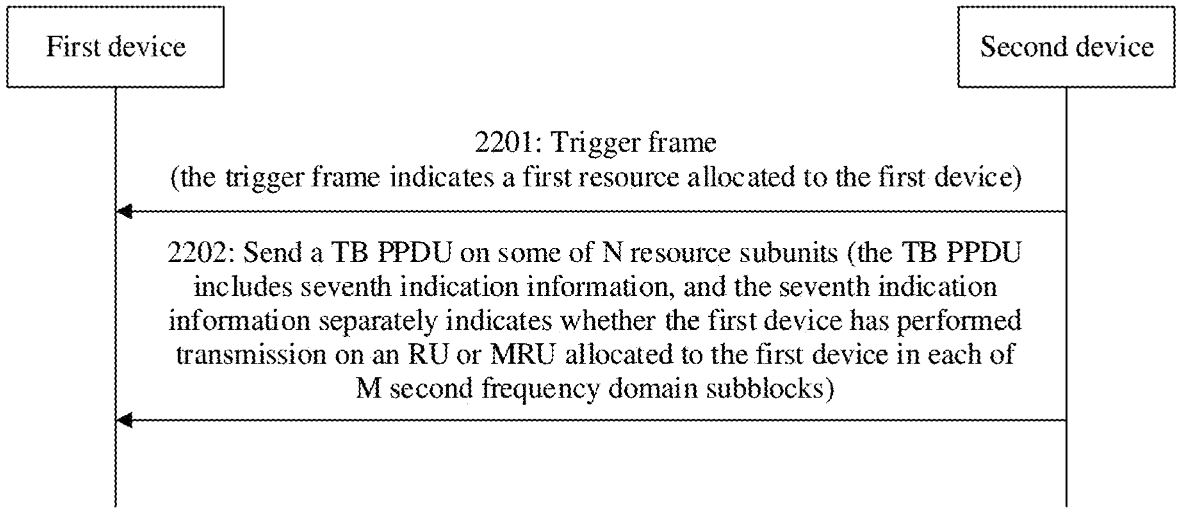
FIG. 22 is a yet further schematic flowchart of an example PPDU transmission method according to an embodiment of this application.

FIG. 22 is a yet further schematic diagram of an embodiment of a PPDU transmission method according to an embodiment of this application. As shown in FIG. 22, the PPDU transmission method includes the following steps.

2201: A first device receives a trigger frame from a second device, where the trigger frame indicates a first resource allocated to the first device.

The first resource includes N resource subunits, N is an integer greater than or equal to 1, the N resource subunits include at least one RU or MRU, and the at least one RU or MRU is located in M second frequency-domain subblocks. For related descriptions of the N resource subunits and the M second frequency-domain subblocks, refer to the related descriptions of the embodiment shown in FIG. 12.

2202: The first device sends a TB PPDU to the second device on some of the N resource subunits.

The TB PPDU includes seventh indication information, the seventh indication information separately indicates whether the first device has performed transmission on an RU or MRU allocated to the first device in each of the M second frequency-domain subblocks, M is an integer greater than or equal to 1, and a bandwidth of the second frequency-domain subblock is 80 MHz.

Values of bits in the seventh indication information include at least one of the following:

if the first device has performed transmission on an RU or MRU allocated to the first device in a second frequency-domain subblock, a bit corresponding to the second frequency-domain subblock in the seventh indication information is duplication of a bit corresponding to the second frequency-domain subblock in a U-SIG Disregard and Validate field in the trigger frame; or if the first device does not perform transmission on an RU or MRU allocated to the first device in a second frequency-domain subblock, a bit corresponding to the second frequency-domain subblock in the seventh indication information is negation of a bit corresponding to the second frequency-domain subblock in a U-SIG Disregard and Validate field in the trigger frame; or if the first resource is not located in a third frequency-domain subblock, a bit corresponding to the third frequency-domain subblock in the seventh indication information is duplication of a bit corresponding to the third frequency-domain subblock in a universal signal U-SIG Disregard and Validate field in the trigger frame, the third frequency-domain subblock and the M second frequency-domain subblocks are frequency-domain subblocks included in a TB PPDU bandwidth, the TB PPDU bandwidth is a bandwidth used by the second device to schedule the first device, and a bandwidth of the third frequency-domain subblock is greater than or equal to 80 MHz, for example, the TB PPDU bandwidth is 320 MHz, including four 80 MHz bandwidths, the M second frequency-domain subblocks are a $1^{st}$ 80 MHz bandwidth, a $2^{nd}$ 80 MHz bandwidth, and a $3^{rd}$ 80 MHz bandwidth, and the third frequency-domain subblock is a $4^{th}$ 80 MHz bandwidth; or if a preset maximum TB PPDU bandwidth includes a fourth frequency-domain subblock and a TB PPDU bandwidth does not include the fourth frequency-domain subblock, a bit corresponding to the fourth frequency-domain subblock in the seventh indication information is duplication of a bit corresponding to the fourth frequency-domain subblock in a universal signal U-SIG Disregard and Validate field in the trigger frame, the TB PPDU bandwidth is a bandwidth used by the second device to schedule the first device, the TB PPDU bandwidth is less than the preset maximum TB PPDU bandwidth, and a bandwidth of the fourth frequency-domain subblock is greater than or equal to 80 MHz. For example, the TB PPDU bandwidth is 160 MHz, including a $1^{st}$ 80 MHz bandwidth and a $2^{nd}$ 80 MHz bandwidth, the preset maximum TB PPDU bandwidth is 320 MHz, including four 80 MHz bandwidths: a $1^{st}$ 80 MHz bandwidth, a $2^{nd}$ 80 MHz bandwidth, a $3^{rd}$ 80 MHz bandwidth, and a $4^{th}$ 80 MHz bandwidth, and the fourth frequency-domain subblock may be understood as the $3^{rd}$ 80 MHz bandwidth and the $4^{th}$ 80 MHz bandwidth.

The preset maximum TB PPDU bandwidth is a maximum bandwidth used by an AP to schedule a STA as specified in a communication standard. For example, according to the 802.11be standard, the preset maximum TB PPDU bandwidth is 320 MHz.

In some implementations, the universal signal U-SIG Disregard and Validate field in the trigger frame includes four bits, which are respectively bits corresponding to the four second frequency-domain subblocks (where a bandwidth of each second frequency-domain subblock is 80 MHz, and frequencies of the four second frequency-domain subblocks are in ascending order) included in the preset maximum TB PPDU bandwidth (320 MHz).

It needs to be noted that, if the first device performs transmission on all RUs or MRUs included in the first resource, the bits included in the seventh indication information are duplication of the bits corresponding to the four 80 MHz bandwidths in the universal signal U-SIG Disregard and Validate field in the trigger frame.

The following provides description with reference to a specific example. It needs to be noted that, in the following example, the seventh indication information includes four bits; and the U-SIG Disregard and Validate subfield in the trigger frame includes four bits, and its value is "1 1 1 1" by default.

In a possible implementation, the trigger frame further includes eighth indication information, and the eighth indication information indicates whether the first device is allowed to perform TB PPDU transmission on some of the N resource subunits.

For example, the TB PPDU bandwidth is 160 z, and is divided into two 80 MHz bandwidths. A frequency of a $1^{st}$ 80 MHz bandwidth is less than a frequency of a $2^{nd}$ 80 MHz bandwidth. The $1^{st}$ 80 MHz bandwidth corresponds to one 996-tone RU, and the $2^{nd}$ 80 MHz bandwidth corresponds to two 484-tone RUs. The second device is an AP, and the first device is a STA 1. The AP allocates a 996+484-tone MRU to the STA 1, and the other 484-tone RU is unallocated. The AP indicates, in the trigger frame, that transmission is allowed on some 80 MHz bandwidths in the TB PPDU bandwidth. For a transmission status of the STA 1, refer to Table 9 below. The eighth indication information is a value of an RU transmission indication field in Table 9 below.

TABLE 9

| Busy/Idle condition of the 996-tone RU | Busy/Idle condition of the 484-tone RU | Value of the RU transmission indication field (bitmap) | Meaning of the RU transmission indication field |
|---|---|---|---|
| Idle | Idle | Duplication of the value of the U-SIG Disregard and Validate subfield in the trigger frame (for example, 1 1 1 1) | Transmission on all RUs (transmission on the 996 + 484-tone MRU) |
| Idle | Busy | 1 0 1 1 (The TB PPDU bandwidth is 160 MHz, a bit corresponding to the $1^{st}$ 80 MHz bandwidth is duplication of a bit corresponding to the $1^{st}$ 80 MHz bandwidth in the U-SIG Disregard and Validate subfield in the trigger frame, and a bit corresponding to the $2^{nd}$ 80 | Transmission on only the 996-tone RU |

TABLE 9-continued

| Busy/Idle condition of the 996-tone RU | Busy/Idle condition of the 484-tone RU | Value of the RU transmission indication field (bitmap) | Meaning of the RU transmission indication field |
|---|---|---|---|
| | | MHz bandwidth is negation of a bit corresponding to the 2nd 80 MHz bandwidth in the U-SIG Disregard and Validate subfield in the trigger frame. There is no transmission in the 3rd 80 MHz bandwidth and the 4th 80 MHz bandwidth. Therefore, a bit corresponding to the 3rd 80 MHz bandwidth is duplication of a bit corresponding to the 3rd 80 MHz bandwidth in the U-SIG Disregard and Validate subfield in the trigger frame, and a bit corresponding to the 4th 80 MHz bandwidth is duplication of a bit corresponding to the 4th 80 MHz bandwidth in the U-SIG Disregard and Validate subfield in the trigger frame.) | |
| Busy | Idle | No U-SIG | No transmission |
| Busy | Busy | No U-SIG | No transmission |

It can be learned from Table 9 that, when the 996-tone RU in the 996+484-tone MRU is busy and the 484-tone RU in the 996+484-tone MRU is idle, the STA 1 cannot perform transmission on the 484-tone RU. This is because, in the 2nd 80 MHz bandwidth, except that the 484-tone RU is allocated to the STA 1, the STA 1 cannot determine whether another RU of the 2nd 80 MHz bandwidth is allocated to another device. If another RU of the 2nd 80 MHz bandwidth is allocated to another device, a value of a U-SIG sent by the another device may be duplicated from the value (namely, 1 1 1 1) in the U-SIG Disregard and Validate field in the trigger frame. However, as shown in Table 9, when the 996-tone RU in the 996+484-tone MRU is busy and the 484-tone RU in the 996+484-tone MRU is idle, a value of a U-SIG sent by the STA 1 is “0 1 1 1”. Consequently, content of U-SIGs on different 20 MHz subchannels in the 2nd 80 MHz bandwidth vary. Therefore, the STA 1 cannot perform transmission on the 484-tone RU.

In another possible implementation, the trigger frame further includes ninth indication information, and the ninth indication information separately indicates whether the first device is allowed to perform TB PPDU transmission on each of the N resource subunits when the first device performs TB PPDU transmission by using some of the N resource subunits.

For example, the TB PPDU bandwidth is 160 MHz, and is divided into two 80 MHz bandwidths. A frequency of a 1st 80 MHz bandwidth is less than a frequency of a 2nd 80 MHz bandwidth. The 1st 80 MHz bandwidth corresponds to one 996-tone RU, and the 2nd 80 MHz bandwidth corresponds to two 484-tone RUs. The second device is an AP, and the first device is a STA 1. The AP allocates a 996+484-tone MRU to the STA 1, and the other 484-tone RU is unallocated. The AP indicates, in the trigger frame, that transmission is allowed on some resource units included in the 1st 80 MHz bandwidth and transmission is allowed on some resource units included in the 2nd 80 MHz bandwidth. For a transmission status of the STA 1, refer to the previous Table 7. Values of bits in the first indication information are a value of the RU transmission indication field in Table 7. It can be learned that, in the technical solution of this application, when the second device indicates that the first device is allowed to perform transmission on a resource subunit (where the resource subunit includes at least one RU smaller than 996 tones or MRU smaller than 996 tones) in the N resource subunits, and the at least one RU smaller than 996 tones or MRU smaller than 996 tones is idle, the first device may perform transmission on the RU smaller than 996 tones or MRU smaller than 996 tones. In this way, the first device may perform transmission by using an RU smaller than 996 tones or an MRU smaller than 996 tones, thereby improving spectral utilization.

In this embodiment of this application, the first device receives the trigger frame from the second device, where the trigger frame indicates the first resource allocated to the first device; and the first device sends the TB PPDU to the second device. The TB PPDU includes the first indication information. The first indication information separately indicates whether the first device has performed transmission on an RU or MRU allocated to the first device in each of the M second frequency-domain subblocks, and M is an integer greater than or equal to 1. If the first device has performed transmission on an RU or MRU allocated to the first device in a second frequency-domain subblock, a bit corresponding to the second frequency-domain subblock in the first indication information is duplication of a bit corresponding to the second frequency-domain subblock in the U-SIG Disregard and Validate field in the trigger frame; or if the first device does not perform transmission on an RU or MRU allocated to the first device in a second frequency-domain subblock, a bit corresponding to the second frequency-domain subblock in the first indication information is negation of a bit corresponding to the second frequency-domain subblock in the U-SIG Disregard and Validate field in the trigger frame; or if the first resource is not located in a third frequency-domain subblock, a bit corresponding to the third frequency-domain subblock in the first indication information is duplication of a bit corresponding to the third frequency-domain subblock in the universal signal U-SIG Disregard and Validate field in the trigger frame, the third frequency-domain subblock and the M second frequency-domain subblocks are frequency-domain subblocks included in a TB PPDU bandwidth, and the TB PPDU bandwidth is a bandwidth used by the second device to schedule the first device; or if a preset maximum TB PPDU bandwidth includes a fourth frequency-domain subblock and a TB PPDU bandwidth does not include the fourth frequency-domain subblock, a bit corresponding to the fourth frequency-domain subblock in the first indication information is duplication of a bit corresponding to the fourth frequency-domain subblock in the universal signal U-SIG Disregard and Validate field in the trigger frame, the TB PPDU bandwidth is a bandwidth used by the second device to schedule the first device, and the TB PPDU bandwidth is less than the preset maximum TB PPDU bandwidth. It can be learned that, a bit in the first indication information is either duplication of a corresponding bit in the U-SIG Disregard and Validate field in the trigger frame or negation of the corresponding bit in the U-SIG Disregard and Validate field in the trigger frame, so that the implementation logic of the solution is simpler.

Figure 23:
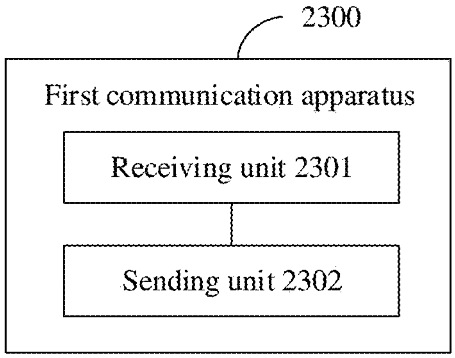
FIG. 23 is a schematic diagram of a structure of an example first communication apparatus according to an embodiment of this application.

The following describes a first communication apparatus provided in an embodiment of this application. Refer to FIG. 23. FIG. 23 is a schematic diagram of a structure of an example first communication apparatus according to an embodiment of this application. The first communication apparatus 2300 may be configured to perform steps performed by the first device in the embodiments shown in FIG. 12, FIG. 15, FIG. 16, and FIG. 22. For details, refer to related descriptions in the foregoing method embodiments.

The first communication apparatus 2300 includes a receiving unit 2301 and a sending unit 2302. The sending unit 2302 is configured to perform sending operations performed by the first device in the foregoing method embodiments, and the receiving unit 2301 is configured to perform receiving operations performed by the first device in the foregoing method embodiments.

In an example, the first communication apparatus 2300 may be configured to perform actions performed by the first device in the embodiment shown in FIG. 12, and the first communication apparatus 2300 specifically includes:

the receiving unit 2301, configured to receive a trigger frame from a second communication apparatus, where the trigger frame indicates a first resource allocated to the first communication apparatus, the first resource includes N resource subunits, the trigger frame includes first indication information, the first indication information separately indicates whether the first communication apparatus is allowed to perform trigger-based physical layer protocol data unit (TB PPDU) transmission on each of the N resource subunits when the first communication apparatus performs TB PPDU transmission by using some of the N resource subunits, and N is an integer greater than or equal to 1; and the sending unit 2302, configured to send a TB PPDU to the second communication apparatus on some of the N resource subunits based on the first indication information.

In an example, the first communication apparatus 2300 may be configured to perform actions performed by the first device in the embodiment shown in FIG. 15, and the first communication apparatus 2300 specifically includes:

the receiving unit 2301, configured to receive a trigger frame from a second communication apparatus, where the trigger frame indicates a first resource allocated to the first communication apparatus, the first resource includes N resource subunits, N is an integer greater than or equal to 1, the trigger frame includes a user-specific field corresponding to the first communication apparatus, the user-specific field corresponding to the first communication apparatus includes fourth indication information, and the fourth indication information indicates whether the first communication apparatus is allowed to perform TB PPDU transmission on some of the N resource subunits and/or indicates whether the first communication apparatus is allowed to use an RU smaller than 996 subcarriers or an MRU smaller than 996 subcarriers for transmission when the first communication apparatus performs transmission by using some of the N resource subunits; and the sending unit 2302, configured to send a TB PPDU to the second communication apparatus on some of the N resource subunits based on the fourth indication information.

In an example, the first communication apparatus 2300 may be configured to perform actions performed by the first device in the embodiment shown in FIG. 16, and the first communication apparatus 2300 specifically includes:

the receiving unit 2301, configured to receive a trigger frame from a second communication apparatus, where the trigger frame indicates a first resource allocated to the first communication apparatus, the first resource includes N resource subunits, N is an integer greater than or equal to 1, the trigger frame includes a common field and a user-specific field corresponding to the first communication apparatus, the common field includes fifth indication information, the user-specific field corresponding to the first communication apparatus includes sixth indication information, the fifth indication information indicates whether the first communication apparatus is allowed to perform TB PPDU transmission on some of the N resource subunits, and the sixth indication information indicates whether the first communication apparatus is allowed to use an RU smaller than 996 subcarriers or an MRU smaller than 996 subcarriers for transmission when the first communication apparatus performs transmission on some of the N resource subunits; and the sending unit 2302, configured to send a TB PPDU to the second communication apparatus on some of the N resource subunits based on the fifth indication information and the sixth indication information.

In an example, the first communication apparatus 2300 may be configured to perform actions performed by the first device in the embodiment shown in FIG. 22, and the first communication apparatus 2300 specifically includes:

the receiving unit 2301, configured to receive a trigger frame from a second communication apparatus, where the trigger frame indicates a first resource allocated to the first communication apparatus, the first resource includes N resource subunits, N is an integer greater than or equal to 1, the N resource subunits include at least one RU or MRU, the at least one RU or MRU is located in M second frequency-domain subblocks, and M is an integer greater than or equal to 1; and the sending unit 2302, configured to send a TB PPDU to the second communication apparatus on some of the N resource subunits, where the TB PPDU includes seventh indication information, the seventh indication information separately indicates whether the first communication apparatus has performed transmission on an RU or MRU allocated to the first communication apparatus in each of the M second frequency-domain subblocks, and values of bits included in the seventh indication information include at least one of the following: If the first communication apparatus has performed transmission on an RU or MRU allocated to the first communication apparatus in a second frequency-domain subblock, a bit corresponding to the second frequency-domain subblock in the seventh indication information is duplication of a bit corresponding to the second frequency-domain subblock in a U-SIG Disregard and Validate field in the trigger frame; or if the first communication apparatus does not perform transmission on an RU or MRU allocated to the first communication apparatus in a second frequency-domain subblock, a bit corresponding to the second frequency-domain subblock in the seventh indication information is negation of a bit corresponding to the second frequency-domain subblock in a U-SIG Disregard and Validate field in the trigger frame; or if the first resource is not located in a third frequency-domain subblock, a bit corresponding to the third frequency-domain subblock in the seventh indication information is duplication of a bit corresponding to the third frequency-domain subblock in a universal signal U-SIG Disregard and Validate field in the trigger frame, the third frequency-domain subblock and the M second frequency-domain subblocks are frequency-domain subblocks included in a TB PPDU bandwidth, and the TB PPDU bandwidth is a bandwidth used by the second communication apparatus to schedule the first communication apparatus; or if a preset maximum TB PPDU bandwidth includes a fourth frequency-domain subblock and a TB PPDU bandwidth does not include the fourth frequency-domain subblock, a bit corresponding to the fourth frequency-domain subblock in the seventh indication information is duplication of a bit corresponding to the fourth frequency-domain subblock in a universal signal U-SIG Disregard and Validate field in the trigger frame, the TB PPDU bandwidth is a bandwidth used by the second communication apparatus to schedule the first communication apparatus, and the TB PPDU bandwidth is less than the preset maximum TB PPDU bandwidth.

Figure 24:
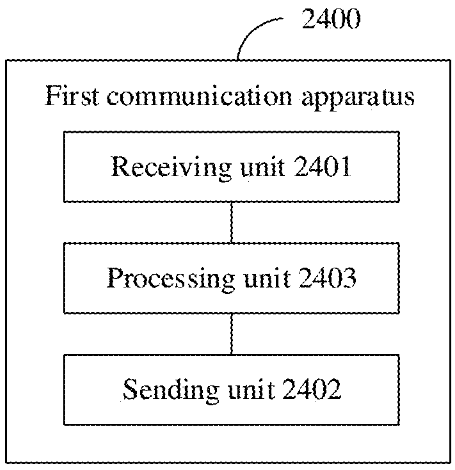
FIG. 24 is another schematic diagram of a structure of an example first communication apparatus according to an embodiment of this application.

The following describes a first communication apparatus provided in an embodiment of this application. Refer to FIG. 24. FIG. 24 is a schematic diagram of a structure of an example first communication apparatus according to an embodiment of this application. The first communication apparatus 2400 may be configured to perform steps performed by the first device in the embodiments shown in FIG. 17, FIG. 18, FIG. 20, and FIG. 21. For details, refer to related descriptions in the foregoing method embodiments.

The first communication apparatus 2400 includes a receiving unit 2401, a sending unit 2402, and a processing unit 2403. The sending unit 2402 is configured to perform sending operations performed by the first device in the foregoing method embodiments, the receiving unit 2401 is configured to perform receiving operations performed by the first device in the foregoing method embodiments, and the processing unit 2403 is configured to perform processing operations performed by the first device in the foregoing method embodiments.

In an example, the first communication apparatus 2400 may be configured to perform actions performed by the first device in the embodiment shown in FIG. 17, and the first communication apparatus 2400 specifically includes:

the receiving unit 2401, configured to receive a beacon frame from a second communication apparatus, where the beacon frame includes a first bitmap, a length of the first bitmap is X bits, the bits in the first bitmap separately indicate whether transmission is allowed on each of P fifth frequency-domain subblocks included in a TB PPDU bandwidth, the TB PPDU bandwidth is a bandwidth used by the second communication apparatus to schedule the first communication apparatus, P is greater than or equal to 1 and less than or equal to X, and X is an integer greater than or equal to 1; and receive a trigger frame from the second communication apparatus, where the trigger frame indicates a first resource allocated to the first communication apparatus, the first resource includes N resource subunits, the N resource subunits include at least one RU smaller than 996 subcarriers or MRU smaller than 996 subcarriers, and N is an integer greater than or equal to 1;

the processing unit 2403, configured to separately determine, based on the first bitmap, whether each of the at least one RU smaller than 996 subcarriers or MRU smaller than 996 subcarriers included in the N resource subunits can be used for transmission when the first communication apparatus performs transmission by using some of the N resource subunits; and the sending unit 2402, configured to send a TB PPDU to the second communication apparatus on some of the N resource subunits, where the some resource subunits include an idle RU smaller than 996 subcarriers or an idle MRU smaller than 996 subcarriers that can be used for transmission.

In an example, the first communication apparatus 2400 may be configured to perform actions performed by the first device in the embodiment shown in FIG. 18, and the first communication apparatus 2400 specifically includes:

the receiving unit 2401, configured to receive a trigger frame from a second communication apparatus, where the trigger frame indicates a first resource allocated to the first communication apparatus, the first resource includes N resource subunits, N is an integer greater than or equal to 1, the trigger frame includes a first user-specific field, the first user-specific field includes a first association identifier, and the first association identifier indicates that an RU or MRU indicated by a resource unit allocation subfield in the first user-specific field is unallocated;

the processing unit 2403, configured to: determine, based on the first association identifier, that an RU or MRU, other than a first RU or MRU, in a second frequency-domain subblock is unallocated; and determine that the first RU or MRU can be used for transmission when the first communication apparatus performs transmission by using some of the N resource subunits; and the sending unit 2402, configured to send a TB PPDU to the second communication apparatus on some of the N resource subunits, where the some resource subunits include the first RU or MRU.

In an example, the first communication apparatus 2400 may be configured to perform actions performed by the first device in the embodiment shown in FIG. 20, and the first communication apparatus 2400 specifically includes:

the receiving unit 2401, configured to receive a trigger frame from a second communication apparatus, where the trigger frame indicates a first resource allocated to the first communication apparatus, the first resource includes N resource subunits, N is an integer greater than or equal to 1, the trigger frame includes puncturing indication information, the puncturing indication information separately indicates whether transmission is allowed on each of R fifth frequency-domain subblocks included in a TB PPDU bandwidth, the TB PPDU bandwidth may be a bandwidth used by the second communication apparatus to schedule the first communication apparatus, or may be a preset maximum TB PPDU bandwidth, and R is greater than or equal to 1 and less than or equal to a quantity of the fifth frequency-domain subblocks included in the TB PPDU bandwidth;

the processing unit 2403, configured to separately determine, based on the puncturing indication information, whether an RU smaller than 996 subcarriers or an MRU smaller than 996 subcarriers included in the N resource subunits can be used for transmission when the first communication apparatus performs transmission by using some of the N resource subunits; and the sending unit 2402, configured to send a TB PPDU to the second communication apparatus on some of the N resource subunits, where the some resource subunits include an idle RU smaller than 996 subcarriers or an idle MRU smaller than 996 subcarriers that can be used for transmission.

In an example, the first communication apparatus 2400 may be configured to perform actions performed by the first device in the embodiment shown in FIG. 21, and the first communication apparatus 2400 specifically includes:

the receiving unit 2401, configured to receive a trigger frame from a second communication apparatus, where the trigger frame indicates a first resource allocated to the first communication apparatus, the first resource includes N resource subunits, the N resource subunits include a 996+484+242-tone MRU, and N is an integer greater than or equal to 1;

the processing unit 2403, configured to: if the second communication apparatus allows the first communication apparatus to perform transmission by using some of the N resource subunits, determine, based on the first resource, that an RU smaller than 996 tones or an MRU smaller than 996 tones included in the N resource subunits can be used for transmission when the first communication apparatus performs transmission by using some of the N resource subunits; and the sending unit 2402, configured to send a TB PPDU to the second communication apparatus on some of the N resource subunits, where the some resource subunits include an idle RU smaller than 996 tones or an idle MRU smaller than 996 tones that can be used for transmission.

Figure 25:
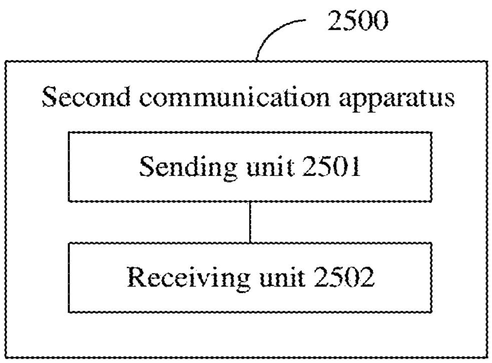
FIG. 25 is a schematic diagram of a structure of an example second communication apparatus according to an embodiment of this application.

The following describes a second communication apparatus provided in an embodiment of this application. Refer to FIG. 25. FIG. 25 is a schematic diagram of a structure of an example second communication apparatus according to an embodiment of this application. The second communication apparatus 2500 may be configured to perform steps performed by the second device in the embodiments shown in FIG. 12, FIG. 15, FIG. 16, FIG. 17, FIG. 18, FIG. 20, FIG. 21, and FIG. 22. For details, refer to related descriptions in the foregoing method embodiments.

The second communication apparatus 2500 includes a sending unit 2501 and a receiving unit 2502. The sending unit 2501 is configured to perform sending operations performed by the second device in the foregoing method embodiments, and the receiving unit 2502 is configured to perform receiving operations performed by the second device in the foregoing method embodiments.

In an example, the second communication apparatus 2500 may be configured to perform actions performed by the second device in the embodiment shown in FIG. 12, and the second communication apparatus 2500 specifically includes:

the sending unit 2501, configured to send a trigger frame to a first communication apparatus, where the trigger frame indicates a first resource allocated to the first communication apparatus, the first resource includes N resource subunits, the trigger frame includes first indication information, the first indication information separately indicates whether the first communication apparatus is allowed to perform TB PPDU transmission on each of the N resource subunits when the first communication apparatus performs transmission by using some of the N resource subunits, and N is an integer greater than or equal to 1; and the receiving unit 2502, configured to receive, from the first communication apparatus, a TB PPDU sent on some of the N resource subunits.

In an example, the second communication apparatus 2500 may be configured to perform actions performed by the second device in the embodiment shown in FIG. 15, and the sending unit 2501 is configured to perform the step 1501 in the embodiment shown in FIG. 15, and the receiving unit 2502 is configured to perform the step 1502 in the embodiment shown in FIG. 15.

In an example, the second communication apparatus 2500 may be configured to perform actions performed by the second device in the embodiment shown in FIG. 16, and the second communication apparatus 2500 specifically includes:

the sending unit 2501, configured to send a trigger frame to a first communication apparatus, where the trigger frame indicates a first resource allocated to the first communication apparatus, the first resource includes N resource subunits, N is an integer greater than or equal to 1, the trigger frame includes a user-specific field corresponding to the first communication apparatus, the user-specific field corresponding to the first communication apparatus includes fourth indication information, and the fourth indication information indicates whether the first communication apparatus is allowed to perform TB PPDU transmission on some of the N resource subunits and/or indicates whether the first communication apparatus is allowed to use an RU smaller than 996 subcarriers or an MRU smaller than 996 subcarriers for transmission when the first communication apparatus performs transmission by using some of the N resource subunits; and the receiving unit 2502, configured to receive, from the first communication apparatus, a TB PPDU sent on some of the N resource subunits. The second communication apparatus 2500 specifically includes:

In an example, the second communication apparatus 2500 may be configured to perform actions performed by the second device in the embodiment shown in FIG. 17, and the second communication apparatus 2500 specifically includes:

the sending unit, configured to send a trigger frame to a first communication apparatus, where the trigger frame indicates a first resource allocated to the first communication apparatus, the first resource includes N resource subunits, N is an integer greater than or equal to 1, the trigger frame includes a common field and a user-specific field corresponding to the first communication apparatus, the common field includes fifth indication information, the user-specific field corresponding to the first communication apparatus includes sixth indication information, the fifth indication information indicates whether the first communication apparatus is allowed to perform TB PPDU transmission on some of the N resource subunits, and the sixth indication information indicates whether the first communication apparatus is allowed to use an RU smaller than 996 subcarriers or an MRU smaller than 996 subcarriers for transmission when the first communication apparatus performs transmission on some of the N resource subunits; and the receiving unit, configured to receive, from the first communication apparatus, a TB PPDU sent on some of the N resource subunits.

In an example, the second communication apparatus 2500 may be configured to perform actions performed by the second device in the embodiment shown in FIG. 18, and the second communication apparatus 2500 specifically includes:

the sending unit 2501, configured to send a beacon frame to a first communication apparatus, where the beacon frame includes a first bitmap, a length of the first bitmap is X bits, the bits in the first bitmap separately indicate whether transmission is allowed on each of P fifth frequency-domain subblocks included in a TB PPDU bandwidth, the TB PPDU bandwidth is a bandwidth used by the second communication apparatus to schedule the first communication apparatus, P is greater than or equal to 1 and less than or equal to X, and X is an integer greater than or equal to 1; and send a trigger frame to the first communication apparatus, where the trigger frame indicates a first resource allocated to the first communication apparatus, the first resource includes N resource subunits, the N resource subunits include at least one RU smaller than 996 subcarriers or MRU smaller than 996 subcarriers, and N is an integer greater than or equal to 1; and the receiving unit 2502, configured to receive, from the first communication apparatus, a TB PPDU sent on some of the N resource subunits, where the some resource subunits include an idle RU smaller than 996 subcarriers or an idle MRU smaller than 996 subcarriers that can be used for transmission.

In an example, the second communication apparatus 2500 may be configured to perform actions performed by the second device in the embodiment shown in FIG. 20, and the second communication apparatus 2500 specifically includes:

the sending unit 2501, configured to send a trigger frame to a first communication apparatus, where the trigger frame indicates a first resource allocated to the first communication apparatus, the first resource includes N resource subunits, N is an integer greater than or equal to 1, the trigger frame includes a first user-specific field, the first user-specific field includes a first association identifier, and the first association identifier indicates that an RU or MRU indicated by a resource unit allocation subfield in the first user-specific field is unallocated; and the receiving unit 2502, configured to receive, from the first communication apparatus, a TB PPDU sent on some of the N resource subunits, where the some resource subunits include the first RU or MRU.

In an example, the second communication apparatus 2500 may be configured to perform actions performed by the second device in the embodiment shown in FIG. 21, and the second communication apparatus 2500 specifically includes:

the sending unit 2501, configured to send a trigger frame to a first communication apparatus, where the trigger frame indicates a first resource allocated to the first communication apparatus, the first resource includes N resource subunits, N is an integer greater than or equal to 1, the trigger frame includes puncturing indication information, the puncturing indication information separately indicates whether transmission is allowed on each of R fifth frequency-domain subblocks included in a TB PPDU bandwidth, the TB PPDU bandwidth may be a bandwidth used by the second communication apparatus to schedule the first communication apparatus or may be a preset maximum TB PPDU bandwidth, and R is greater than or equal to 1 and less than or equal to a quantity of the fifth frequency-domain subblocks included in the TB PPDU bandwidth; and the receiving unit 2502, configured to receive, from the first communication apparatus, a TB PPDU sent on some of the N resource subunits, where the some resource subunits include an idle RU smaller than 996 tones or an idle MRU smaller than 996 tones that can be used for transmission.

In an example, the second communication apparatus 2500 may be configured to perform actions performed by the second device in the embodiment shown in FIG. 22, and the second communication apparatus 2500 specifically includes:

the sending unit 2501, configured to send a trigger frame to a first communication apparatus, where the trigger frame indicates a first resource allocated to the first communication apparatus, the first resource includes N resource subunits, N is an integer greater than or equal to 1, the N resource subunits include at least one RU or MRU, the at least one RU or MRU is located in M second frequency-domain subblocks, and M is an integer greater than or equal to 1; and the receiving unit 2502, configured to receive, from the first communication apparatus, a TB PPDU sent on some of the N resource subblocks, where the TB PPDU includes seventh indication information, the seventh indication information separately indicates whether the first communication apparatus has performed transmission on an RU or MRU allocated to the first communication apparatus in each of the M second frequency-domain subblocks, and values of bits included in the seventh indication information include at least one of the following: If the first communication apparatus has performed transmission on an RU or MRU allocated to the first communication apparatus in a second frequency-domain subblock, a bit corresponding to the second frequency-domain subblock in the seventh indication information is duplication of a bit corresponding to the second frequency-domain subblock in a U-SIG Disregard and Validate field in the trigger frame; or if the first communication apparatus does not perform transmission on an RU or MRU allocated to the first communication apparatus in a second frequency-domain subblock, a bit corresponding to the second frequency-domain subblock in the seventh indication information is negation of a bit corresponding to the second frequency-domain subblock in a U-SIG Disregard and Validate field in the trigger frame; or if the first resource is not located in a third frequency-domain subblock, a bit corresponding to the third frequency-domain subblock in the seventh indication information is duplication of a bit corresponding to the third frequency-domain subblock in a universal signal U-SIG Disregard and Validate field in the trigger frame, the third frequency-domain subblock and the M second frequency-domain subblocks are frequency-domain subblocks included in a TB PPDU bandwidth, and the TB PPDU bandwidth is a bandwidth used by the second communication apparatus to schedule the first communication apparatus; or if a preset maximum TB PPDU bandwidth includes a fourth frequency-domain subblock and a TB PPDU bandwidth does not include the fourth frequency-domain subblock, a bit corresponding to the fourth frequency-domain subblock in the seventh indication information is duplication of a bit corresponding to the fourth frequency-domain subblock in a universal signal U-SIG Disregard and Validate field in the trigger frame, the TB PPDU bandwidth is a bandwidth used by the second communication apparatus to schedule the first communication apparatus, and the TB PPDU bandwidth is less than the preset maximum TB PPDU bandwidth.

Figure 26:
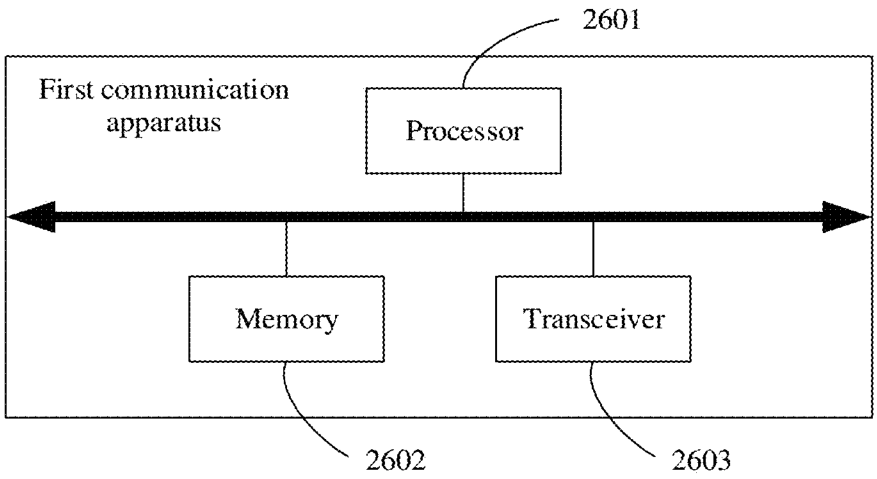
FIG. 26 is still another schematic diagram of a structure of an example first communication apparatus according to an embodiment of this application.

An embodiment of this application further provides a first communication apparatus. Refer to FIG. 26. FIG. 26 is another schematic diagram of a structure of an example first communication apparatus according to an embodiment of this application. The first communication apparatus may be configured to perform steps performed by the first device in the embodiments shown in FIG. 12, FIG. 15, FIG. 16, FIG. 17, FIG. 18, FIG. 20, FIG. 21, and FIG. 22. For details, refer to related descriptions in the foregoing method embodiments.

The first communication apparatus includes a processor 2601, a memory 2602, and a transceiver 2603.

The processor 2601, the memory 2602, and the transceiver 2603 are separately connected by using a bus, and the memory stores computer instructions.

Optionally, the receiving unit 2301 and the sending unit 2302 shown in FIG. 23 may be specifically the transceiver 2603. Therefore, specific implementation of the transceiver 2603 is not described again.

Optionally, the receiving unit 2401 and the sending unit 2302 shown in FIG. 24 may be specifically the transceiver 2603. Therefore, specific implementation of the transceiver 2603 is not described again. The processing unit 2403 shown in FIG. 24 may be specifically the processor 2601. Therefore, specific implementation of the processor 2601 is not described again.

Figure 27:
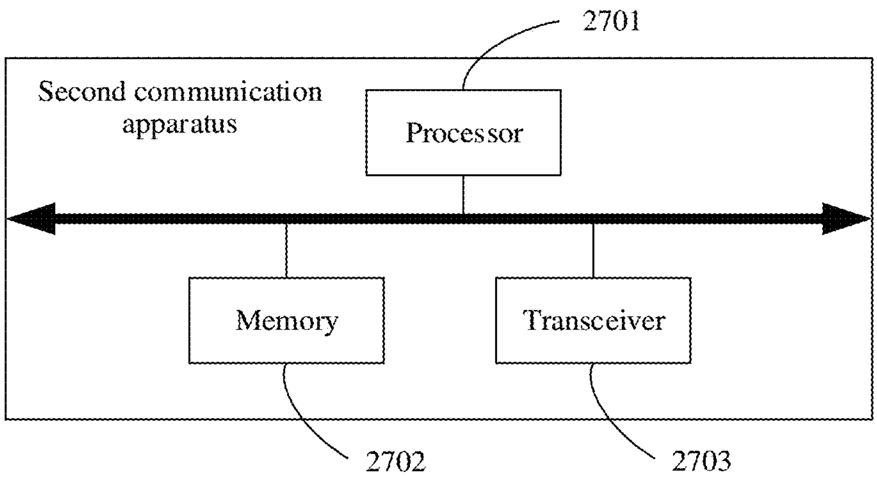
FIG. 27 is another schematic diagram of a structure of an example second communication apparatus according to an embodiment of this application.

An embodiment of this application further provides a second communication apparatus. Refer to FIG. 27. FIG. 27 is another schematic diagram of a structure of an example second communication apparatus according to an embodiment of this application. The second communication apparatus may be configured to perform steps performed by the second device in the embodiments shown in FIG. 12, FIG. 15, FIG. 16, FIG. 17, FIG. 18, FIG. 20, FIG. 21, and FIG. 22. For details, refer to related descriptions in the foregoing method embodiments.

The second communication apparatus includes a processor 2701, a memory 2702, and a transceiver 2703.

The processor 2701, the memory 2702, and the transceiver 2703 are separately connected by using a bus, and the memory stores computer instructions.

Optionally, the sending unit 2501 and the receiving unit 2501 shown in FIG. 25 may be specifically the transceiver 2703. Therefore, specific implementation of the transceiver 2703 is not described again.

This application further provides another communication system. The communication system includes a first device and a second device. The first device is configured to perform steps performed by the first device in the embodiments shown in FIG. 12, FIG. 15, FIG. 16, FIG. 17, FIG. 18, FIG. 20, FIG. 21, and FIG. 22. The second device is configured to perform steps performed by the second device in the embodiments shown in FIG. 12, FIG. 15, FIG. 16, FIG. 17, FIG. 18, FIG. 20, FIG. 21, and FIG. 22.

An embodiment of this application provides a computer program product including instructions. When the computer program product runs on a computer, the computer is enabled to perform any one of the implementations in FIG. 12, FIG. 15, FIG. 16, FIG. 17, FIG. 18, FIG. 20, FIG. 21, and FIG. 22.

An embodiment of this application provides a computer readable storage medium, including computer instructions. When the instructions are run on a computer, the computer is enabled to perform any one of the implementations in FIG. 12, FIG. 15, FIG. 16, FIG. 17, FIG. 18, FIG. 20, FIG. 21, and FIG. 22.

An embodiment of this application provides a chip apparatus, including a processor, configured to invoke a computer program or computer instructions in a memory, to enable the processor to perform any one of the implementations in FIG. 12, FIG. 15, FIG. 16, FIG. 17, FIG. 18, FIG. 20, FIG. 21, and FIG. 22.

Optionally, the chip apparatus further includes the memory, and the memory is configured to store the computer program, the computer instructions, or the like. The chip apparatus includes a chip, or may include a chip and another discrete component.

Optionally, the processor is coupled to the memory through an interface.

It may be clearly understood by persons skilled in the art that, for the purpose of convenient and brief description, for detailed working processes of the foregoing systems, apparatuses, and units, refer to corresponding processes in the foregoing method embodiments.

In the embodiments provided in this application, it needs to be understood that the disclosed systems, apparatuses, and methods may be implemented in other manners. For example, the described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. Indirect couplings or communication connections between the apparatuses or units may be implemented in electronic, mechanic, or in another form.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in the embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to a conventional technology, or all or some of the technical solutions may be implemented in the form of a software product. The computer software product is stored in a storage medium and includes several instructions for instructing a computer device (which may be a personal computer, a server, or a network device, or the like) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application rather than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in embodiments of this application.

What is claimed is:

1. A physical layer protocol data unit (PPDU) transmission method, comprising:

receiving, by a first device, a trigger frame from a second device, wherein the trigger frame indicates a first resource allocated to the first device, the first resource comprises N resource subunits, the trigger frame comprises first indication information, the first indication information separately indicates whether the first device is allowed to perform trigger-based physical layer protocol data unit (TB PPDU) transmission on each of the N resource subunits when the first device performs TB PPDU transmission by using some of the N resource subunits, and N is a positive integer; and sending, by the first device, a TB PPDU to the second device on some of the N resource subunits based on the first indication information, wherein the first resource comprises at least one resource unit (RU); and the TB PPDU comprises third indication information, and the third indication information separately indicates whether the first device has performed TB PPDU transmission on each of the at least one RU.

2. The method according to claim 1, wherein a resource subunit in the N resource subunits is located in a first frequency-domain subblock, and the first frequency-domain subblock comprises at least one second frequency-domain subblock.

3. A first communication apparatus, comprising:

a receiver, configured to receive a trigger frame from a second communication apparatus, wherein the trigger frame indicates a first resource allocated to the first communication apparatus, the first resource comprises N resource subunits, the trigger frame comprises first indication information, the first indication information separately indicates whether the first communication apparatus is allowed to perform TB PPDU transmission on each of the N resource subunits when the first communication apparatus performs trigger-based physical layer protocol data unit (TB PPDU) transmission by using some of the N resource subunits, and N is a positive integer; and a transmitter, configured to send a TB PPDU to the second communication apparatus on some of the N resource subunits based on the first indication information, wherein the first resource comprises at least one resource unit (RU); and the TB PPDU comprises third indication information, and the third indication information separately indicates whether the first communication apparatus has performed TB PPDU transmission on each of the at least one RU.

4. The first communication apparatus according to claim 3, wherein a resource subunit in the N resource subunits is located in a first frequency-domain subblock, and the first frequency-domain subblock comprises at least one second frequency-domain subblock.

5. The first communication apparatus according to claim 4, wherein, when a first condition is met, the first indication information indicates that the first communication apparatus is not allowed to perform TB PPDU transmission on a resource subunit when the first communication apparatus performs transmission by using some of the N resource subunits; and the first condition comprises at least one of the following:

more than one device is scheduled in at least one second frequency-domain subblock in the first frequency-domain subblock to perform TB PPDU transmission; or when the first communication apparatus performs transmission by using some of the N resource subunits, the second communication apparatus does not support transmission on a resource unit (RU) or multiple-resource unit (MRU) smaller than 996 subcarriers.

6. The first communication apparatus according to claim 5, wherein that more than one device is scheduled in at least one second frequency-domain subblock in the first frequency-domain subblock to perform TB PPDU transmission comprises:

more than one device is scheduled in at least one second frequency-domain subblock in the first frequency-domain subblock, to perform multiple user-multiple input multiple output (MU-MIMO) transmission by using a resource unit (RU) or multiple-resource unit (MRU) larger than or equal to 996 subcarriers; or more than one device is scheduled in at least one second frequency-domain subblock in the first frequency-domain subblock, to perform MU-MIMO transmission by using a resource unit (RU) or multiple-resource unit (MRU) smaller than 996 subcarriers.

7. The first communication apparatus according to claim 3, wherein the first resource comprises at least one resource unit (RU) or multiple-resource unit (MRU) smaller than 996 subcarriers.

8. The first communication apparatus according to claim 4, wherein the first resource comprises at least one resource unit (RU) or multiple-resource unit (MRU), the at least one RU or MRU is an RU or MRU allocated to the first communication apparatus in M second frequency-domain subblocks, and M is a positive integer; and the TB PPDU comprises second indication information, the second indication information separately indicates whether the first communication apparatus has performed transmission on an RU or MRU allocated to the first communication apparatus in each of the M second frequency-domain subblocks, and M is a positive integer.

9. The first communication apparatus according to claim 8, wherein when the first communication apparatus has performed transmission on an RU or MRU allocated to the first communication apparatus in a second frequency-domain subblock, a bit corresponding to the second frequency-domain subblock in the second indication information is duplication of a bit corresponding to the second frequency-domain subblock in a universal signal (U-SIG) Disregard and Validate field in the trigger frame; or when the first communication apparatus does not perform transmission on an RU or MRU allocated to the first communication apparatus in a second frequency-domain subblock, a bit corresponding to the second frequency-domain subblock in the second indication information is negation of a bit corresponding to the second frequency-domain subblock in a universal signal U-SIG Disregard and Validate field in the trigger frame; or when the first resource is not located in a third frequency-domain subblock, a bit corresponding to the third frequency-domain subblock in the second indication information is duplication of a bit corresponding to the third frequency-domain subblock in a universal signal (U-SIG) Disregard and Validate field in the trigger frame, the third frequency-domain subblock and the M second frequency-domain subblocks are frequency-domain subblocks comprised in a TB PPDU bandwidth, and the TB PPDU bandwidth is a bandwidth used by the second communication apparatus to schedule the first communication apparatus; or when a preset maximum TB PPDU bandwidth comprises a fourth frequency-domain subblock and a TB PPDU bandwidth does not comprise the fourth frequency-domain subblock, a bit corresponding to the fourth frequency-domain subblock in the second indication information is duplication of a bit corresponding to the fourth frequency-domain subblock in a universal signal (U-SIG) Disregard and Validate field in the trigger frame, the TB PPDU bandwidth is a bandwidth used by the second communication apparatus to schedule the first communication apparatus, and the TB PPDU bandwidth is less than the preset maximum TB PPDU bandwidth.

10. The first communication apparatus according to claim 3, wherein when the first communication apparatus has performed transmission on an RU in the first resource, a bit corresponding to the RU in the third indication information is duplication of a bit corresponding to the RU in a universal signal field (U-SIG) Disregard and Validate field in the trigger frame; or when the first communication apparatus does not perform transmission on an RU in the first resource, a bit corresponding to the RU in the third indication information is negation of a bit corresponding to the RU in a U-SIG Disregard and Validate field in the trigger frame; or when a bit corresponding to an RU in the first resource in the third indication information is duplication or negation of a bit of the RU in the first resource in a U-SIG Disregard and Validate field in the trigger frame, bits other than the bit corresponding to the RU in the first resource in the third indication information are duplication of bits other than the bit of the RU in the first resource in the U-SIG Disregard and Validate field in the trigger frame.

11. A second communication apparatus, comprising:

a transmitter, configured to send a trigger frame to a first communication apparatus, wherein the trigger frame indicates a first resource allocated to the first communication apparatus, the first resource comprises N resource subunits, the trigger frame comprises first indication information, the first indication information separately indicates whether the first communication apparatus is allowed to perform trigger-based physical layer protocol data unit (TB PPDU) transmission on each of the N resource subunits when the first communication apparatus performs transmission by using some of the N resource subunits, and N is a positive integer; and a receiver, configured to receive, from the first communication apparatus, a TB PPDU sent on some of the N resource subunits, wherein the first resource comprises at least one resource unit (RU); and the TB PPDU comprises third indication information, and the third indication information separately indicates whether the first communication apparatus has performed TB PPDU transmission on each of the at least one RU.

12. The second communication apparatus according to claim 11, wherein a resource subunit in the N resource subunits is located in a first frequency-domain subblock, and the first frequency-domain subblock comprises at least one second frequency-domain subblock.

13. The second communication apparatus according to claim 12, wherein when a first condition is met, the first indication information indicates that the first communication apparatus is not allowed to perform TB PPDU transmission on a resource subunit when the first communication apparatus performs transmission by using some of the N resource subunits; and the first condition comprises at least one of the following:

more than one device is scheduled in at least one second frequency-domain subblock in the first frequency-domain subblock to perform TB PPDU transmission; or when the first communication apparatus performs transmission by using some of the N resource subunits, the second communication apparatus does not support transmission on a resource unit (RU) or multiple-resource unit (MRU) smaller than 996 subcarriers.

14. The second communication apparatus according to claim 13, wherein that more than one device is scheduled in at least one second frequency-domain subblock in the first frequency-domain subblock to perform TB PPDU transmission comprises:

more than one device is scheduled in at least one second frequency-domain subblock in the first frequency-domain subblock, to perform multiple user-multiple input multiple output (MU-MIMO) transmission by using a resource unit (RU) or multiple-resource unit (MRU) larger than or equal to 996 subcarriers; or more than one device is scheduled in at least one second frequency-domain subblock in the first frequency-domain subblock, to perform MU-MIMO transmission by using a resource unit (RU) or multiple-resource unit (MRU) smaller than 996 subcarriers.

15. The second communication apparatus according to claim 11, wherein the first resource comprises at least one resource unit (RU) or multiple-resource unit (MRU) smaller than 996 subcarriers.

16. The second communication apparatus according to claim 12, wherein the first resource comprises at least one resource unit (RU) or multiple-resource unit (MRU), the at least one RU or MRU is an RU or MRU allocated to the first communication apparatus in M second frequency-domain subblocks, and M is a positive integer; and the TB PPDU comprises second indication information, the second indication information separately indicates whether the first communication apparatus has performed transmission on an RU or MRU allocated to the first communication apparatus in each of the M second frequency-domain subblocks, and M is a positive integer.

17. The second communication apparatus according to claim 16, wherein when the first communication apparatus has performed transmission on an RU or MRU allocated to the first communication apparatus in a second frequency-domain subblock, a bit corresponding to the second frequency-domain subblock in the second indication information is duplication of a bit corresponding to the second frequency-domain subblock in a universal signal (U-SIG) Disregard and Validate field in the trigger frame; or when the first communication apparatus does not perform transmission on an RU or MRU allocated to the first communication apparatus in a second frequency-domain subblock, a bit corresponding to the second frequency-domain subblock in the second indication information is negation of a bit corresponding to the second frequency-domain subblock in a universal signal (U-SIG) Disregard and Validate field in the trigger frame; or when the first resource is not located in a third frequency-domain subblock, a bit corresponding to the third frequency-domain subblock in the second indication information is duplication of a bit corresponding to the third frequency-domain subblock in a universal signal (U-SIG) Disregard and Validate field in the trigger frame, the third frequency-domain subblock and the M second frequency-domain subblocks are frequency-domain subblocks comprised in a TB PPDU bandwidth, and the TB PPDU bandwidth is a bandwidth used by the second communication apparatus to schedule the first communication apparatus; or when a preset maximum TB PPDU bandwidth comprises a fourth frequency-domain subblock and a TB PPDU bandwidth does not comprise the fourth frequency-domain subblock, a bit corresponding to the fourth frequency-domain subblock in the second indication information is duplication of a bit corresponding to the fourth frequency-domain subblock in a universal signal (U-SIG) Disregard and Validate field in the trigger frame, the TB PPDU bandwidth is a bandwidth used by the second communication apparatus to schedule the first communication apparatus, and the TB PPDU bandwidth is less than the preset maximum TB PPDU bandwidth.

18. The second communication apparatus according to claim 11, wherein when the first communication apparatus has performed transmission on an RU in the first resource, a bit corresponding to the RU in the third indication information is duplication of a bit corresponding to the RU in a universal signal field (U-SIG) Disregard and Validate field in the trigger frame; or when the first communication apparatus does not perform transmission on an RU in the first resource, a bit corresponding to the RU in the third indication information is negation of a bit corresponding to the RU in a U-SIG Disregard and Validate field in the trigger frame; or when a bit corresponding to an RU in the first resource in the third indication information is duplication or negation of a bit of the RU in the first resource in a U-SIG Disregard and Validate field in the trigger frame, bits other than the bit corresponding to the RU in the first resource in the third indication information are duplication of bits other than the bit of the RU in the first resource in the U-SIG Disregard and Validate field in the trigger frame.

* * * * *